United States Patent
Saito et al.

(10) Patent No.: US 12,468,132 B2
(45) Date of Patent: Nov. 11, 2025

(54) ZOOM LENS AND IMAGING APPARATUS

(71) Applicant: FUJIFILM Corporation, Tokyo (JP)

(72) Inventors: Hiroki Saito, Saitama (JP); Tatsuyuki Ogino, Saitama (JP); Masato Kondo, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 17/812,655

(22) Filed: Jul. 14, 2022

(65) Prior Publication Data
US 2023/0043840 A1    Feb. 9, 2023

(30) Foreign Application Priority Data
Jul. 27, 2021    (JP) ................. 2021-122747

(51) Int. Cl.
G02B 15/14    (2006.01)
G02B 13/00    (2006.01)
G02B 15/16    (2006.01)

(52) U.S. Cl.
CPC ....... *G02B 15/1461* (2019.08); *G02B 13/004* (2013.01); *G02B 13/0045* (2013.01);
(Continued)

(58) Field of Classification Search
None
See application file for complete search history.

(56) References Cited

U.S. PATENT DOCUMENTS

2007/0242365 A1* 10/2007 Kushida ......... G02B 15/145129
359/676
2013/0093940 A1*  4/2013 Matsumura .... G02B 15/145113
359/557
(Continued)

FOREIGN PATENT DOCUMENTS

CN    202049279 U    11/2011
JP    2013-254160 A  12/2013
(Continued)

OTHER PUBLICATIONS

"Notice of Reasons for Refusal" Office Action issued in JP 2021-122747; mailed by the Japanese Patent Office on Feb. 4, 2025.

*Primary Examiner* — Darryl J Collins
(74) *Attorney, Agent, or Firm* — Studebaker Brackett PLLC

(57) ABSTRACT

A zoom lens consisting of, in order from an object side to an image side: a first lens group that has a positive refractive power; a second lens group that has a negative refractive power; and a subsequent group that has a plurality of lens groups, wherein: the zoom lens includes an aperture stop at a position closer to the image side than a lens surface closest to the image side in the second lens group, a lens group closest to the image side in the subsequent group includes at least one negative lens of which an object side lens surface is a concave surface being in contact with air, during zooming, a spacing between the first lens group and the second lens group changes, a spacing between the second lens group and the subsequent group changes, and spacings between all adjacent lens groups in the subsequent group change.

30 Claims, 20 Drawing Sheets

(52) U.S. Cl.
CPC .... *G02B 13/009* (2013.01); *G02B 15/144113* (2019.08); *G02B 15/145113* (2019.08); *G02B 15/16* (2013.01)

(56) References Cited

U.S. PATENT DOCUMENTS

| | | | |
|---|---|---|---|
| 2013/0250424 A1* | 9/2013 | Sato | G02B 9/34 |
| | | | 359/687 |
| 2013/0308034 A1* | 11/2013 | Ogata | G02B 9/60 |
| | | | 348/335 |
| 2014/0177065 A1 | 6/2014 | Adachi | |
| 2016/0252712 A1* | 9/2016 | Uchida | G02B 15/1461 |
| | | | 359/557 |
| 2019/0025560 A1* | 1/2019 | Okuoka | G02B 15/1461 |
| 2019/0064491 A1* | 2/2019 | Sugita | G02B 15/1461 |
| 2019/0196143 A1 | 6/2019 | Okada | |
| 2020/0142167 A1* | 5/2020 | Kikuchi | G02B 15/1461 |
| 2020/0174235 A1* | 6/2020 | Kikuchi | G02B 15/173 |
| 2020/0174236 A1* | 6/2020 | Kikuchi | G02B 15/145105 |
| 2020/0264413 A1* | 8/2020 | Yamanaka | G02B 15/173 |
| 2021/0132345 A1* | 5/2021 | Nishioka | G02B 15/1461 |
| 2022/0035124 A1* | 2/2022 | Yoshinaga | G02B 15/1461 |
| 2022/0260814 A1* | 8/2022 | Kitada | G02B 7/14 |

FOREIGN PATENT DOCUMENTS

| | | |
|---|---|---|
| JP | 2014-126678 A | 7/2014 |
| JP | 2019-113609 A | 7/2019 |
| JP | 2020-071439 A | 5/2020 |
| JP | 2020-101736 A | 7/2020 |
| JP | 2020-144207 A | 9/2020 |

* cited by examiner

ZOOM LENS AND IMAGING APPARATUS

CROSS-REFERENCE TO RELATED APPLICATIONS

The present application claims priority under 35 U.S.C. § 119 to Japanese Patent Application No. 2021-122747, filed on Jul. 27, 2021. The above application is hereby expressly incorporated by reference, in its entirety, into the present application.

BACKGROUND

Technical Field

The technique of the present disclosure relates to a zoom lens and an imaging apparatus.

Related Art

As a zoom lens applicable to an imaging apparatus such as a digital camera and a video camera, for example, a lens system described in JP2019-113609A is known.

In recent years, there has been a demand for a zoom lens having a small size and a light weight while achieving a high zoom ratio.

SUMMARY

The present disclosure has been made in view of the above circumstances, and an object of the present invention is to provide a zoom lens having a small size and a light weight while achieving a high zoom ratio, and an imaging apparatus comprising the zoom lens.

According to a first aspect of the present disclosure, there is provided a zoom lens consisting of, in order from an object side to an image side: a first lens group that has a positive refractive power, a second lens group that has a negative refractive power, and a subsequent group that has a plurality of lens groups. The zoom lens includes an aperture stop at a position closer to the image side than a lens surface closest to the image side in the second lens group. A lens group closest to the image side in the subsequent group includes at least one negative lens of which an object side lens surface is a concave surface being in contact with air. During zooming, a spacing between the first lens group and the second lens group changes, a spacing between the second lens group and the subsequent group changes, and spacings between all adjacent lens groups in the subsequent group change. During zooming, lens spacings inside the first lens group, the second lens group, and the plurality of lens groups in the subsequent group are unchanged. Assuming that a focal length of a whole system at a wide angle end in a state in which an infinite distance object is in focus is fw, a distance on an optical axis from a lens surface closest to the object side in the first lens group to a paraxial entrance pupil position at the wide angle end in a state in which the infinite distance object is in focus is Denw, and a sign of Denw is positive in a case where the paraxial entrance pupil position is closer to the image side than the lens surface closest to the object side in the first lens group, and is negative in a case where the paraxial entrance pupil position is closer to the object side than the lens surface closest to the object side in the first lens group, Conditional Expression (1) is satisfied, which is represented by $$0.7 < fw/Denw < 1.5 \qquad (1).$$

In the first aspect, assuming that a distance on the optical axis from a paraxial exit pupil position to an image plane at the wide angle end in a state in which the infinite distance object is in focus is Dexw, and a sign of Dexw is positive in a case where the paraxial exit pupil position is closer to the object side than the image plane, and is negative in a case where the paraxial exit pupil position is closer to the image side than the image plane, it is preferable to satisfy Conditional Expression (2), which is represented by $$0.25 < fw/Dexw < 1 \qquad (2).$$

In the first aspect, assuming that a distance on the optical axis from the lens surface closest to the object side in the first lens group to a lens surface closest to the image side in the first lens group is D1, and a sum of a back focal length in terms of an air conversion distance and a distance on the optical axis from the lens surface closest to the object side in the first lens group to a lens surface closest to the image side in the subsequent group, at a telephoto end in a state in which the infinite distance object is in focus is TLt, it is preferable to satisfy Conditional Expression (3), which is represented by $$0.01 < D1/TLt < 0.1 \qquad (3).$$

In the first aspect, assuming that a focal length of the whole system at a telephoto end in a state in which the infinite distance object is in focus is ft, it is preferable to satisfy Conditional Expression (4), which is represented by $$4.9 < ft/fw < 12 \qquad (4).$$

In the first aspect, it is preferable that the subsequent group includes at least one Lx lens of which an image side lens surface is a convex surface being in contact with air. Assuming that a lateral magnification in an A optical system, which minimizes an absolute value of an inverse of a lateral magnification at the wide angle end in a case where the aperture stop is used as an object point in a state in which the infinite distance object is in focus, in at least one optical system configured to range from a lens surface adjacent to the image side of the aperture stop to an image side lens surface of the Lx lens is βA, it is preferable to satisfy Conditional Expression (5), which is represented by $$-0.5 < \beta A < 0.5 \qquad (5).$$

In the first aspect, assuming that a height of an on-axis marginal ray on a lens surface closest to the image side in the A optical system from the optical axis at a telephoto end in a state in which the infinite distance object is in focus is HAt, and a height of the on-axis marginal ray in the aperture stop from the optical axis at the telephoto end in a state in which the infinite distance object is in focus is HSt, it is preferable to satisfy Conditional Expression (6), which is represented by $$0.73 < HAt/HSt < 2.3 \qquad (6).$$

In the first aspect, assuming that a focal length of the whole system at a telephoto end in a state in which the infinite distance object is in focus is ft, and a combined focal length from a lens surface closest to the object side in the subsequent group to a lens surface closest to the image side in the A optical system at the telephoto end in a state in which the infinite distance object is in focus is fpAt, it is preferable to satisfy Conditional Expression (7), which is represented by $$3 < ft/fpAt < 15 \qquad (7).$$

In the first aspect, assuming that a height of an on-axis marginal ray on a lens surface closest to the image side in the A optical system from the optical axis at a telephoto end in a state in which the infinite distance object is in focus is HAt, and a height of a principal ray with a maximum image height on the lens surface closest to the image side in the A optical system from the optical axis at the wide angle end in a state in which the infinite distance object is in focus is HAw, it is preferable to satisfy Conditional Expression (8), which is represented by $$0.35 < HAt/HAw < 1.6 \tag{8}$$

In the first aspect, it is preferable that the subsequent group includes a lens surface, which is a concave surface being in contact with air and which is image side surface, between a lens surface closest to the image side in the A optical system and a lens surface which is a concave surface being in contact with air and which is an object side surface included in the lens group closest to the image side in the subsequent group.

In the first aspect, assuming that a distance on the optical axis from the aperture stop to a lens surface closest to the image side in the A optical system at a telephoto end in a state in which the infinite distance object is in focus is DSAt, and a sum of a back focal length in terms of an air conversion distance and a distance on the optical axis from the aperture stop to a lens surface closest to the image side in the subsequent group, at the telephoto end in a state in which the infinite distance object is in focus is DSLt, it is preferable to satisfy Conditional Expression (9), which is represented by $$0.1 < DSAt/DSLt < 0.54 \tag{9}$$

In the first aspect, assuming that a spacing on the optical axis between a lens surface closest to the image side in the A optical system and a lens surface adjacent to the image side of the lens surface closest to the image side in the A optical system at a telephoto end in a state in which the infinite distance object is in focus is dA, and a maximum image height at the telephoto end is Yt, it is preferable to satisfy Conditional Expression (10), which is represented by $$0.015 < dA/Yt < 0.35 \tag{10}$$

In the first aspect, assuming that a sum of a back focal length at an air conversion distance and a distance on the optical axis from the lens surface closest to the object side in the first lens group to a lens surface closest to the image side in the subsequent group at a telephoto end in a state in which the infinite distance object is in focus is TLt, and a focal length of the whole system at the telephoto end in a state in which the infinite distance object is in focus is ft, it is preferable to satisfy Conditional Expression (11), which is represented by $$0.65 < TLt/ft < 1.5 \tag{11}$$

In the first aspect, it is preferable that the first lens group includes a negative lens and a positive lens, in order from a position closest to the object side to the image side.

In the first aspect, assuming that a back focal length in terms of an air conversion distance at the wide angle end in a state in which the infinite distance object is in focus is BFw, and a maximum image height at the wide angle end is Yw, it is preferable to satisfy Conditional Expression (12), which is represented by $$0.38 < BFw/Yw < 1.5 \tag{12}$$

In the first aspect, assuming that an Abbe number of a lens closest to the object side in the first lens group based on a d line is ν1, it is preferable to satisfy Conditional Expression (13), which is represented by $$10 < \nu 1 < 50 \tag{13}$$

In the first aspect, assuming that a refractive index of a lens closest to the object side in the first lens group at a d line is N1, it is preferable to satisfy Conditional Expression (14), which is represented by $$1.7 < N1 < 2.3 \tag{14}$$

In the first aspect, assuming that a refractive index of a negative lens closest to the object side at a d line among negative lenses included in the second lens group is N2n, it is preferable to satisfy Conditional Expression (15), which is represented by $$1.6 < N2n < 2.2 \tag{15}$$

In the first aspect, assuming that a refractive index of a positive lens that has a strongest refractive power at a d line among positive lenses included in the second lens group is N2p, it is preferable to satisfy Conditional Expression (16), which is represented by $$1.65 < N2p < 2 \tag{16}$$

In the first aspect, assuming that an Abbe number of a negative lens closest to the image side based on a d line among negative lenses included in the subsequent group is νnL, it is preferable to satisfy Conditional Expression (17), which is represented by $$27 < \nu nL < 102 \tag{17}$$

In the first aspect, it is preferable that the subsequent group includes at least one lens group that has a positive refractive power.

In the first aspect, assuming that a sum of a back focal length at an air conversion distance and a distance on the optical axis from the lens surface closest to the object side in the first lens group to a lens surface closest to the image side in the subsequent group at a telephoto end in a state in which the infinite distance object is in focus is TLt, a difference in an optical axis direction between a position at the wide angle end and a position at the telephoto end of a lens group closest to the object side among lens groups that have positive refractive powers and that are included in the subsequent group in a state in which the infinite distance object is in focus is Mp, and a sign of Mp is positive in a case where the lens group closest to the object side moves from the object side to the image side, and is negative in a case where the lens group closest to the object side moves from the image side to the object side, during zooming from the wide angle end to the telephoto end, it is preferable to satisfy Conditional Expression (18), which is represented by $$-0.45 < Mp/TLt < -0.06 \tag{18}$$

In the first aspect, assuming that a focal length of a lens group closest to the object side among lens groups that have positive refractive powers and that are included in the subsequent group in a state in which the infinite distance object is in focus is fp, and a focal length of the second lens group is f2, it is preferable to satisfy Conditional Expression (19), which is represented by $$-4.3 < fp/f2 < -1.1 \tag{19}$$

In the first aspect, assuming that a distance on the optical axis from a lens surface closest to the image side in the first lens group to a lens surface closest to the object side in a lens group closest to the object side among lens groups that have positive refractive powers and that are included in the subsequent group at a telephoto end in a state in which the infinite distance object is in focus is D1pt, and a sum of a back focal length in terms of an air conversion distance and a distance on the optical axis from the lens surface closest to the object side in the first lens group to a lens surface closest to the image side in the subsequent group, at the telephoto end in a state in which the infinite distance object is in focus is TLt, it is preferable to satisfy Conditional Expression (20), which is represented by $$0.2<D1pt/TLt<0.5 \qquad (20).$$

In the first aspect, it is preferable that the subsequent group includes at least one Lx lens of which an image side lens surface is a convex surface being in contact with air. It is preferable that an optical system, which minimizes an absolute value of an inverse of a lateral magnification at a wide angle end in a case where an aperture stop is used as an object point in a state in which the infinite distance object is in focus, in at least one optical system configured to range from a lens surface adjacent to the image side of the aperture stop to an image side lens surface of the Lx lens is an A optical system. Assuming that a combined focal length at the wide angle end in a state in which the infinite distance object is in focus from a lens surface adjacent to the image side of a lens surface closest to the image side in the A optical system to a lens surface closest to the image side in the subsequent group is fBw, it is preferable to satisfy Conditional Expression (21), which is represented by $$-1.6<fw/fBw<-0.25 \qquad (21).$$

In the first aspect, assuming that a maximum half angle of view at the wide angle end in a state in which the infinite distance object is in focus is ωw, and a maximum image height at the wide angle end is Yw, it is preferable to satisfy Conditional Expression (22), which is represented by $$0.97<fw \times \tan \omega w/Yw<1.3 \qquad (22).$$

In the first aspect, it is preferable that the subsequent group includes a focus group that moves along the optical axis during focusing.

In the first aspect, it is preferable that the focus group consists of two or fewer lenses.

In the first aspect, it is preferable that the focus group has a negative refractive power.

In the first aspect, assuming that a focal length of the first lens group is f1, and a focal length of the second lens group is f2, it is preferable to satisfy Conditional Expression (23), which is represented by $$-0.3<f2/f1<-0.05 \qquad (23).$$

According to a second aspect of the present disclosure, there is provided an imaging apparatus comprising the zoom lens according to the first aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~group that has a positive refractive power" in the present specification means that the group has a positive refractive power as a whole. The term "group that has a negative refractive power" means that the group has a negative refractive power as a whole. The term "a lens that has a positive refractive power" and the term "a positive lens" are synonymous. The term "a lens that has a negative refractive power" and the term "negative lens" are synonymous.

The "first lens group", "second lens group", and "plurality of lens groups" in the present specification refer to parts each including at least one lens. The parts are constituents part of the zoom lens and are divided by air spacings that change during zooming. During zooming, the lens groups move or remain stationary, and the mutual spacings between the lenses of one lens group do not change. That is, in the present specification, one lens group is a group in which the spacing between adjacent groups changes during zooming and the total spacing between adjacent lenses does not change within itself. The term "~lens group" is not limited to a configuration consisting of a plurality of lenses, but may consist of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. Unless otherwise specified, the sign of the refractive power and the surface shape of a lens including an aspherical surface are considered in terms of the paraxial region.

In the present specification, the term "whole system" means "zoom lens". The "focal length" used in a conditional expression is a paraxial focal length. Unless otherwise specified, the "distance on the optical axis" used in Conditional Expression is considered as a geometrical length rather than an air conversion length. The "back focal length in terms of the air conversion distance" is the air conversion distance on the optical axis from the lens surface closest to the image side in the zoom lens to the image side focal position of the zoom lens.

The values used in conditional expressions are values in a case where the d line is used as a reference in a state in which the infinite distance object is in focus. The "d line", "C line" and "F line" described in the present specification are emission lines. In the present specification, it is assumed that the d line wavelength is 587.56 nm (nanometers), the C line wavelength is 656.27 nm (nanometers), and the F line wavelength is 486.13 nm (nanometers).

According to the present disclosure, it is possible to provide a zoom lens having a small size and a light weight while achieving a high zoom ratio, and an imaging apparatus comprising the zoom lens.

DETAILED DESCRIPTION

Figure 1:
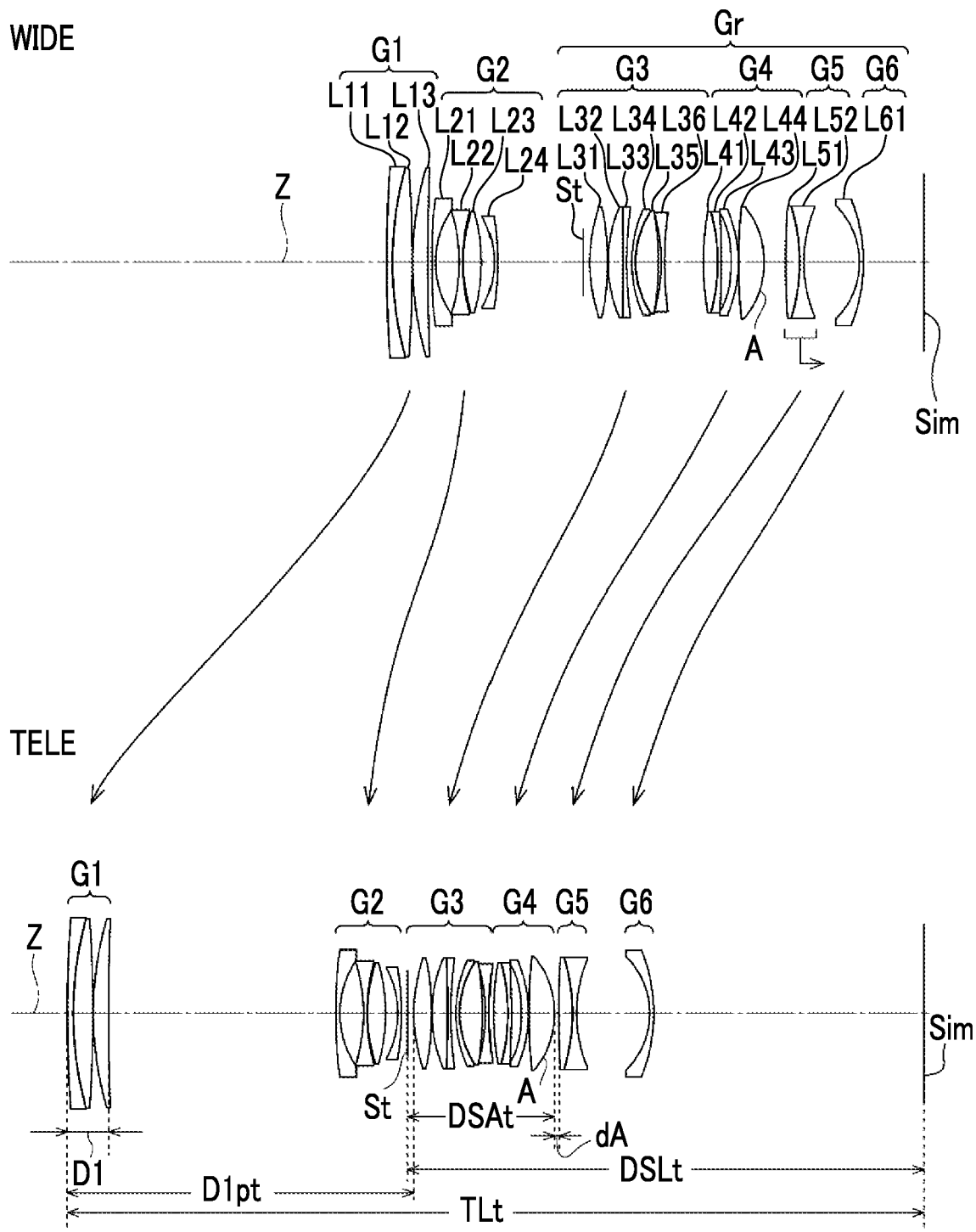
FIG. 1 is a diagram showing a cross-sectional configuration and movement loci of a zoom lens according to an embodiment, the zoom lens corresponding to a zoom lens of Example 1.
Figure 2:
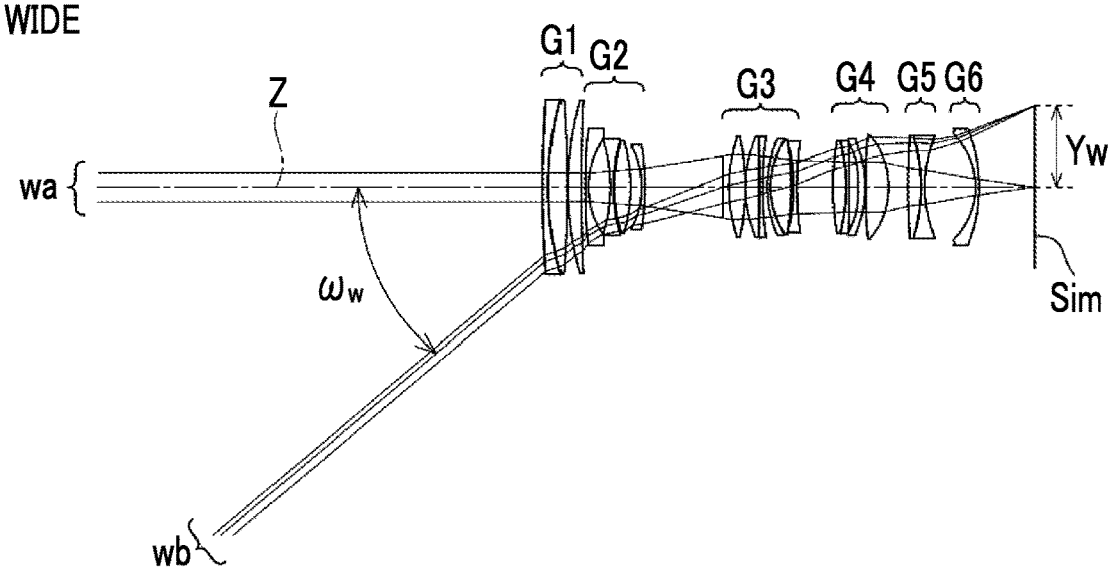
FIG. 2 is a diagram showing a cross-sectional configuration and a luminous flux of the zoom lens shown in FIG. 1.
Figure 2:
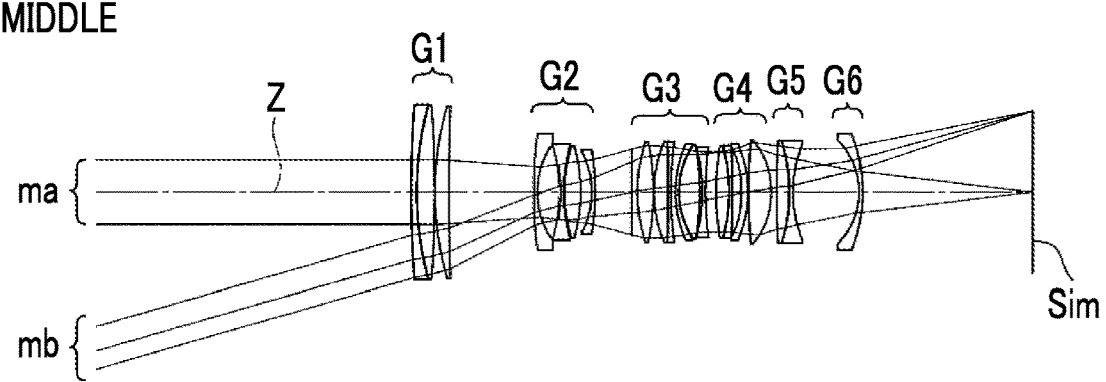
Figure 2:
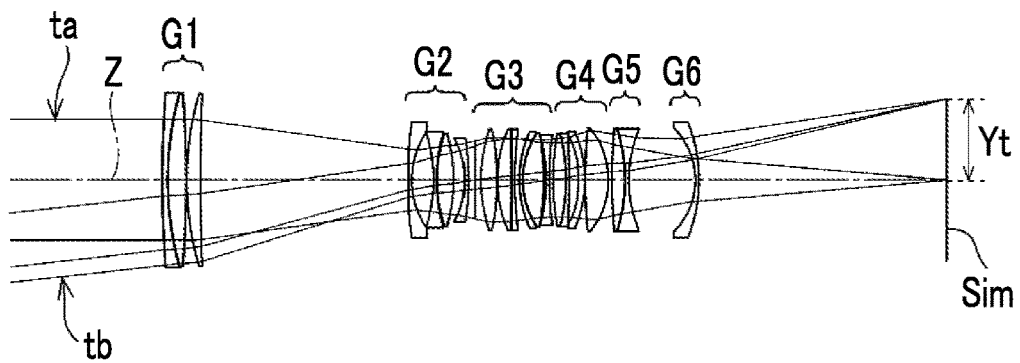

Hereinafter, embodiments of the present disclosure will be described with reference to the accompanying drawings. FIG. 1 is a cross-sectional view of a configuration of a zoom lens according to an embodiment of the present disclosure and a diagram showing movement loci thereof. In FIG. 1, the upper part labeled "WIDE" shows the wide angle end state, and the lower part labeled "TELE" shows the telephoto end state. FIG. 2 is a cross-sectional view showing a configuration and luminous flux in each zooming state of the zoom lens of FIG. 1. In FIG. 2, the top part labeled "WIDE" shows the wide angle end state, the middle part labeled "MIDDLE" shows the middle focal length state, and the lower part labeled "TELE" shows the telephoto end state. Further, FIG. 2 shows luminous flux including on-axis luminous flux wa and luminous flux with the maximum angle of view wb at the wide angle end state, on-axis luminous flux ma and luminous flux with the maximum angle of view mb at the middle focal length state, and on-axis luminous flux to and luminous flux with the maximum angle of view tb at the telephoto end state. FIGS. 1 and 2 show situations where an infinite distance object is in focus, the left side thereof is an object side, and the right side thereof is an image side. The examples shown in FIGS. 1 and 2 correspond to a zoom lens of Example 1 described later.

The zoom lens according to the present embodiment consists of, in order from the object side to the image side: a first lens group G1 that has a positive refractive power, a second lens group G2 that has a negative refractive power, and a subsequent group Gr that has a plurality of lens groups. As an example in FIG. 1, the subsequent group Gr consists of a third lens group G3 that has a positive refractive power, a fourth lens group G4 that has a positive refractive power, a fifth lens group G5 that has a negative refractive power, and a sixth lens group G6 that has a negative refractive power.

In the example shown in FIG. 1, the first lens group G1 consists of three lenses L11 to L13, in order from the object side to the image side. The second lens group G2 consists of four lenses L21 to L24, in order from the object side to the image side. The third lens group G3 consists of an aperture stop St and six lenses L31 to L36, in order from the object side to the image side. The fourth lens group G4 consists of four lenses L41 to L44, in order from the object side to the image side. The fifth lens group G5 consists of two lenses L51 and L52, in order from the object side to the image side. The sixth lens group G6 consists of one lens L61.

The zoom lens according to the present embodiment is configured to include an aperture stop St closer to the image side than the lens surface closest to the image side in the second lens group G2. The aperture stop St in FIGS. 1 and 2 does not indicate a shape and a size thereof, but indicates a position thereof in the optical axis direction.

In the zoom lens according to the present embodiment, during zooming, a spacing between the first lens group G1 and the second lens group G2 changes, a spacing between the second lens group G2 and the subsequent group Gr changes, and spacings between all adjacent lens groups in the subsequent group Gr change. Further, during zooming, the lens spacing inside the plurality of lens groups included in the first lens group G1, the second lens group G2, and the subsequent group Gr is unchanged. That is, in the zoom lens according to the present embodiment, the spacings between all the adjacent lens groups change with each other, and the lens spacings inside the lens groups do not change. In FIG. 1, arrows between the upper and lower parts indicates respective approximate movement loci of the first lens group G1, the second lens group G2, the third lens group G3, the fourth lens group G4, the fifth lens group G5, and the sixth lens group G6, during zooming from the wide angle end to the telephoto end.

As described above, the zoom lens consists of, in order from the object side to the image side, a first lens group G1 that has a positive refractive power, a second lens group G2 that has a negative refractive power, and a subsequent group Gr that has a plurality of lens groups, and includes an aperture stop St closer to the image side than the lens surface closest to the image side in the second lens group G2. During zooming, spacings between all the adjacent lens groups mutually change, and lens spacings inside the lens groups are unchanged. As a result, there is an advantage in achieving a high zoom ratio.

The lens group closest to the image side in the subsequent group Gr includes at least one negative lens of which the object side lens surface is a concave surface being in contact with air. The lens group closest to the image side in the subsequent group Gr includes at least one negative lens of which the object side lens surface is a concave surface being in contact with air. As a result, there is an advantage in achieving reduction in total length of the lens system. In FIG. 1, for example, the sixth lens group G6, which is the lens group closest to the image side in the subsequent group Gr, is a concave surface of which the object side lens surface is in contact with air, and includes a lens L61 that has a negative refractive power.

It is preferable that the first lens group G1 includes a negative lens and a positive lens, in order from the position closest to the object side to the image side. With such a configuration, there is an advantage in suppressing lateral chromatic aberration on the wide angle side. As a result, there is an advantage in suppressing longitudinal chromatic aberration on the telephoto side. In FIG. 1, for example, the first lens group G1 includes a lens L11 that has a negative refractive power and a lens L12 that has a positive refractive power, in order from the position closest to the object side to the image side.

It is preferable that the subsequent group Gr includes at least one lens group that has a positive refractive power. Since the subsequent group Gr includes at least one lens group in which the subsequent group Gr has a positive refractive power, there is an advantage in achieving a high zoom ratio. In FIG. 1, for example, the subsequent group Gr includes a lens group having two positive refractive powers, a third lens group G3 and a fourth lens group G4.

It is preferable that the subsequent group Gr includes a focus group that moves along the optical axis Z during focusing. Here, the focus group consists of at least one lens that moves during focusing. Focusing is performed by moving the focus group. Since the zoom lens includes the focus group in the subsequent group Gr, there is an advantage in suppressing fluctuations in various aberrations that occur during focusing. The right-pointing arrow drawn below the lenses L51 and L52 in FIG. 1 indicates that the lenses L51 and L52 are a focus group that moves toward the image side during focusing from the infinite distance object to the close range object.

It is preferable that the focus group consists of two or fewer lenses. Since the focus group consists of two or fewer lenses of the focus group is advantageous for achieving reduction in weight of the focus group. Further, it is preferable that the focus group has a negative refractive power. Since the focus group has a negative refractive power, there is an advantage in achieving reduction in amount of movement of the focus group during focusing.

Figure 3:
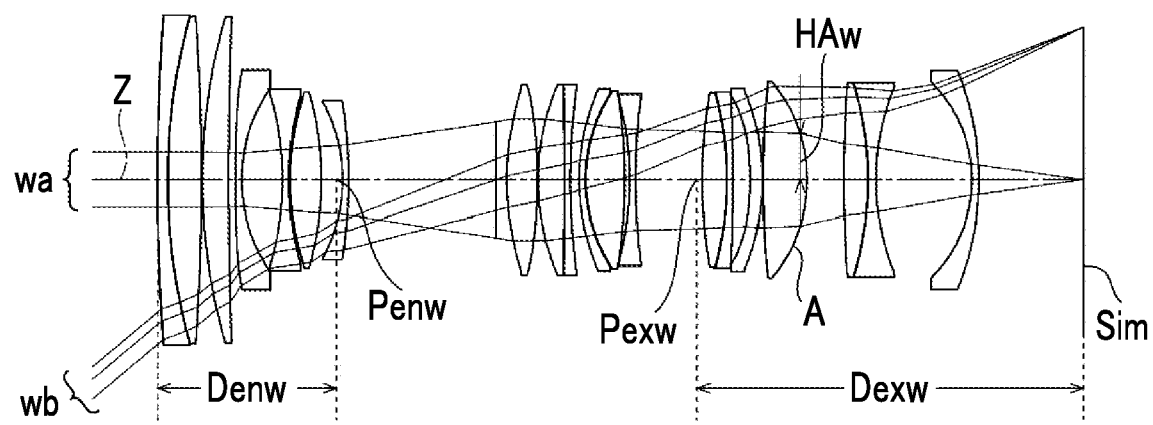
FIG. 3 is a diagram for explaining symbols of each conditional expression.

In the zoom lens according to the present embodiment, assuming that a focal length of a whole system at a wide angle end in a state in which an infinite distance object is in focus is fw and a distance on the optical axis Z from a lens surface closest to the object side in the first lens group to a paraxial entrance pupil position Penw at the wide angle end in a state in which the infinite distance object is in focus is Denw, it is preferable to satisfy Conditional Expression (1). Here, the sign of Denw is positive in a case where the paraxial entrance pupil position Penw is closer to the image side than the lens surface closest to the object side in the first lens group, and is negative in a case where the paraxial entrance pupil position Penw is closer to the object side than the lens surface closest to the object side in the first lens group. FIG. 3 is a cross-sectional view showing a configuration and a luminous flux corresponding to the zoom lens in the wide angle end state of FIGS. 1 and 2, and shows the paraxial entrance pupil position Penw and the distance Denw as an example.

By not allowing the corresponding value of Conditional Expression (1) to be equal to or less than the lower limit, the distance Denw is prevented from becoming excessively large, and the paraxial entrance pupil position Penw can be made closer to the object side. As a result, the height from the optical axis Z in a case where the off-axis ray passes through the first lens group G1 can be lowered, and the diameter increase of the first lens group G1 can be suppressed. Therefore, the size of the first lens group G1 can be reduced. As a result, there is an advantage in achieving reduction in weight. By not allowing the corresponding value of Conditional Expression (1) to be equal to or greater than the upper limit, the rays with the respective image heights are appropriately separated in the first lens group G1. As a result, there is an advantage in correcting lateral chromatic aberration. In order to obtain more favorable characteristics, it is more preferable that the zoom lens satisfies Conditional Expression (1-1), and it is yet more preferable to satisfy Conditional Expression (1-2).

$$0.7 < fw/Denw < 1.5 \tag{1}$$

$$0.83 < fw/Denw < 1.35 \tag{1-1}$$

$$0.94 < fw/Denw < 1.22 \tag{1-2}$$

In the zoom lens according to the present embodiment, assuming that a focal length of a whole system at a wide angle end in a state in which an infinite distance object is in focus is fw and a distance on the optical axis Z from the paraxial exit pupil position Pexw to the image plane Sim at the wide angle end in a state in which the infinite distance object is in focus is Dexw, it is preferable to satisfy Conditional Expression (2). Here, the sign of Dexw is positive in a case where the paraxial exit pupil position Pexw is closer to the object side than the image plane Sim, and is negative in a case where the paraxial exit pupil position Pexw is closer to the image side than the image plane Sim. FIG. 3 shows the paraxial exit pupil position Pexw and the distance Dexw as an example. By not allowing the corresponding value of Conditional Expression (2) to be equal to or less than the lower limit, the total length of the lens system can be shortened. As a result, there is an advantage in achieving reduction in size. By not allowing the corresponding value of Conditional Expression (2) to be equal to or greater than the upper limit, the angle of incidence of the off-axis ray on the image plane Sim can be reduced. As a result, there is an advantage in ensuring the amount of peripheral light. In order to obtain more favorable characteristics, it is more preferable that the zoom lens satisfies Conditional Expression (2-1), and it is yet more preferable to satisfy Conditional Expression (2-2).

$$0.25 < fw/Dexw < 1 \tag{2}$$

$$0.33 < fw/Dexw < 0.6 \tag{2-1}$$

$$0.39 < fw/Dexw < 0.55 \tag{2-2}$$

In the zoom lens according to the present embodiment, assuming that a distance on the optical axis Z from the lens surface closest to the object side in the first lens group G1 to a lens surface closest to the image side in the first lens group G1 is D1, and a sum of a back focal length in terms of an air conversion distance and a distance on the optical axis Z from the lens surface closest to the object side in the first lens group G1 to the lens surface closest to the image side in the subsequent group Gr, at the telephoto end in a state in which the infinite distance object is in focus is TLt, it is preferable to satisfy Conditional Expression (3). The lower part of FIG. 1 shows the distance D1 and the sum TLt as an example. By not allowing the corresponding value of Conditional Expression (3) to be equal to or less than the lower limit, there is an advantage in suppressing longitudinal chromatic aberration on the telephoto side. By not allowing the corresponding value of Conditional Expression (3) to be equal to or greater than the upper limit, the weight of the first lens group G1 can be reduced. As a result, there is an advantage in achieving reduction in weight of the entire lens system. In order to obtain more favorable characteristics, it is more preferable that the zoom lens satisfies Conditional Expression (3-1), and it is yet more preferable to satisfy Conditional Expression (3-2).

$$0.01 < D1/TLt < 0.1 \tag{3}$$

$$0.015 < D1/TLt < 0.07 \tag{3-1}$$

$$0.02 < D1/TLt < 0.053 \tag{3-2}$$

In the zoom lens according to the present embodiment, assuming that a focal length of a whole system at a wide angle end in a state in which an infinite distance object is in focus is fw and a focal length of the whole system at the telephoto end in a state in which the infinite distance object is in focus is ft, it is preferable to satisfy Conditional Expression (4). By not allowing the corresponding value of Conditional Expression (4) to be equal to or less than the lower limit, there is an advantage in achieving an increase in zoom ratio. By not allowing the corresponding value of Conditional Expression (4) to be equal to or greater than the upper limit, the zoom ratio is prevented from becoming excessively high. As a result, there is an advantage in achieving reduction in size of the entire lens system. In order to obtain more favorable characteristics, it is more preferable that the zoom lens satisfies Conditional Expression (4-1), and it is yet more preferable to satisfy Conditional Expression (4-2).

$$4.9 < ft/fw < 12 \tag{4}$$

$$5.7 < ft/fw < 10 \tag{4-1}$$

$$6.2 < ft/fw < 7.5 \tag{4-2}$$

It is preferable that the subsequent group Gr includes at least one Lx lens of which an image side lens surface is a convex surface being in contact with air. Assuming that a lateral magnification in an A optical system, which minimizes an absolute value of an inverse of a lateral magnification at the wide angle end in a case where the aperture stop St is used as an object point in a state in which the infinite distance object is in focus, in at least one optical system configured to range from a lens surface adjacent to the image side of the aperture stop St to the image side lens surface of the Lx lens is βA, it is preferable to satisfy Conditional Expression (5). That is, assuming that the lateral magnification of each optical system configured to range from the lens surface adjacent to the image side of the aperture stop St to the image side lens surface of each Lx lens is βx, an optical system, which minimizes |1/βx|, is the "A optical system", and it is preferable that the lateral magnification βA of the A optical system satisfies Conditional Expression (5). Further, the image side lens surface (that is, the convex surface being in contact with air) of the Lx lens in the A optical system is hereinafter referred to as "A surface A".

For example, in the zoom lens shown in FIG. 1, the Lx lens of which the image side lens surface included in the subsequent group Gr is a convex surface being in contact with air corresponds to six lenses L31, L35, L42, L43, L44, and L61. Among the six optical systems configured to range from the object side lens surface of the lens L31 adjacent to the image side of the aperture stop St to the image side lens surface of each Lx lens, the optical system which minimizes |1/βx| is an optical system configured to range from an object side lens surface of the lens L31 to an image side lens surface of the lens L44. In such a case, the "A optical system" is an optical system configured to range from the object side lens surface of the lens L31 to the image side lens surface of the lens L44, and the A surface A is an image side lens surface of the lens L44 as shown in FIGS. 1 and 3.

By not allowing the corresponding value of Conditional Expression (5) to be equal to or less than the lower limit, it is possible to suppress a decrease in the angle between the principal ray of the off-axis luminous flux passing through the A surface A and the optical axis Z. As a result, it is possible to suppress excessive correction in astigmatism occurring between the A surface A and the image plane Sim. By not allowing the corresponding value of Conditional Expression (5) to be equal to or greater than the upper limit, it is possible to suppress an increase in angle formed by the principal ray of the off-axis luminous flux passing through the A surface A and the optical axis Z. As a result, there is an advantage in correcting astigmatism occurring between the A surface A and the image plane Sim. In order to obtain more favorable characteristics, it is more preferable that the zoom lens satisfies Conditional Expression (5-1), and it is yet more preferable to satisfy Conditional Expression (5-2).

$$-0.5 < 1/\beta A < 0.5 \tag{5}$$

$$-0.4 < 1/\beta A < 0.36 \tag{5-1}$$

$$-0.35 < 1/\beta A < 0.13 \tag{5-2}$$

Figure 4:
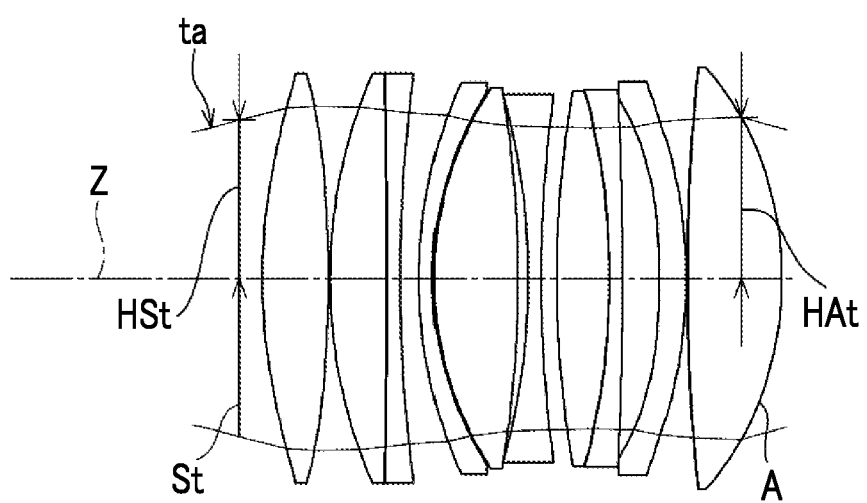
FIG. 4 is a diagram for explaining symbols of each conditional expression.

In the zoom lens according to the present embodiment, assuming that a height of an on-axis marginal ray on a lens surface (that is, the A surface A) closest to the image side in the A optical system from the optical axis Z at the telephoto end in a state in which the infinite distance object is in focus is HAt, and a height of the on-axis marginal ray in the aperture stop St from the optical axis Z at the telephoto end in a state in which the infinite distance object is in focus is HSt, it is preferable to satisfy Conditional Expression (6). FIG. 4 is a partial cross-sectional view showing a configuration corresponding to the zoom lens in the telephoto end state of FIGS. 1 and 2 and an on-axis luminous flux ta, and shows the height HAt and the height HSt as an example. By not allowing the corresponding value of Conditional Expression (6) to be equal to or less than the lower limit, there is an advantage in suppressing spherical aberration on the telephoto side. By not allowing the corresponding value of Conditional Expression (6) to be equal to or greater than the upper limit, it is possible to suppress an increase in diameter of the subsequent group Gr. As a result, there is an advantage in achieving reduction in weight. In order to obtain more favorable characteristics, it is more preferable that the zoom lens satisfies Conditional Expression (6-1), and it is yet more preferable to satisfy Conditional Expression (6-2).

$$0.73 < HAt/HSt < 2.3 \tag{6}$$

$$0.83 < HAt/HSt < 1.6 \tag{6-1}$$

$$0.92 < HAt/HSt < 1.37 \tag{6-2}$$

In the zoom lens according to the present embodiment, assuming that a focal length of the whole system at the telephoto end in a state in which the infinite distance object is in focus is ft, and a combined focal length from a lens surface closest to the object side in the subsequent group Gr to the lens surface (that is, the A surface A) closest to the image side in the A optical system at the telephoto end in a state in which the infinite distance object is in focus is fpAt, it is preferable to satisfy Conditional Expression (7). By not allowing the corresponding value of Conditional Expression (7) to be equal to or less than the lower limit, there is an advantage in ensuring the amount of peripheral light. By not allowing the corresponding value of Conditional Expression (7) to be equal to or greater than the upper limit, there is an advantage in suppressing spherical aberration on the telephoto side. In order to obtain more favorable characteristics, it is more preferable that the zoom lens satisfies Conditional Expression (7-1), and it is yet more preferable to satisfy Conditional Expression (7-2).

$$3 < ft/fpAt < 15 \tag{7}$$

$$4.5 < ft/fpAt < 12 \tag{7-1}$$

$$5.7 < ft/fpAt < 9 \tag{7-2}$$

In the zoom lens according to the present embodiment, assuming that a height of an on-axis marginal ray on the lens surface (that is, the A surface A) closest to the image side in the A optical system from the optical axis Z at the telephoto end in a state in which the infinite distance object is in focus is HAt, and a height of a principal ray with a maximum image height on the lens surface (that is, the A surface A) closest to the image side in the A optical system from the optical axis Z at the wide angle end in a state in which the infinite distance object is in focus is HAw, it is preferable to satisfy Conditional Expression (8). FIG. 3 shows the height HAw as an example. By not allowing the corresponding value of Conditional Expression (8) to be equal to or less than the lower limit, there is an advantage in suppressing astigmatism on the wide angle side. By not allowing the corresponding value of Conditional Expression (8) to be equal to or greater than the upper limit, there is an advantage in suppressing fluctuation in field curvature during zooming. In order to obtain more favorable characteristics, it is more preferable that the zoom lens satisfies Conditional Expression (8-1), and it is yet more preferable to satisfy Conditional Expression (8-2).

$$0.35 < HAt/HAw < 1.6 \tag{8}$$

$$0.65 < HAt/HAw < 1.4 \tag{8-1}$$

$$0.83 < HAt/HAw < 1.25 \tag{8-2}$$

It is preferable that the subsequent group Gr includes a lens surface, which is a concave surface being in contact with air and which is image side surface, between the lens surface (that is, the A surface A) closest to the image side in the A optical system and a lens surface which is a concave surface being in contact with air and which is an object side surface included in the lens group closest to the image side in the subsequent group Gr. By adopting such a configuration, there is an advantage in suppressing astigmatism on the wide angle side while maintaining the reduction in size of the entire lens system. In the example of FIG. 1, the subsequent group Gr includes the image side surface of the lens L52, which is an image side surface is a concave surface being in contact with air, between the image side surface of the lens L44, which is a lens surface (that is, the A surface A) closest to the image side in the A optical system, and the object side surface of the lens L61, which is a concave surface being in contact with air and which is an object side surface included in the sixth lens group G6 closest to the image side in the subsequent group Gr.

In the zoom lens according to the present embodiment, assuming that a distance on the optical axis Z from the aperture stop St to the lens surface (that is, the A surface A) closest to the image side in the A optical system at the telephoto end in a state in which the infinite distance object is in focus is DSAt, and a sum of a back focal length in terms of an air conversion distance and a distance on the optical axis Z from the aperture stop St to the lens surface closest to the image side in the subsequent group Gr, at the telephoto end in a state in which the infinite distance object is in focus is DSLt, it is preferable to satisfy Conditional Expression (9). The lower part of FIG. 1 shows the distance DSAt and the sum DSLt as an example. By not allowing the corresponding value of Conditional Expression (9) to be equal to or less than the lower limit, refraction of the off-axis ray from the A surface A to the image plane Sim can be relaxed. As a result, there is an advantage in suppressing occurrence of various off-axis aberrations. By not allowing the corresponding value of Conditional Expression (9) to be equal to or greater than the upper limit, the luminous flux diameter closer to the image side than the aperture stop St can be made smaller. As a result, there is an advantage in achieving reduction in diameter of the subsequent group Gr. In order to obtain more favorable characteristics, it is more preferable that the zoom lens satisfies Conditional Expression (9-1), and it is yet more preferable to satisfy Conditional Expression (9-2).

$$0.1 < DSAt/DSLt < 0.54 \tag{9}$$

$$0.15 < DSAt/DSLt < 0.4 \tag{9-1}$$

$$0.18 < DSAt/DSLt < 0.32 \tag{9-2}$$

In the zoom lens according to the present embodiment, assuming that a spacing on the optical axis Z between the lens surface (that is, the A surface A) closest to the image side in the A optical system and a lens surface adjacent to the image side of the lens surface (that is, the A surface A) at the telephoto end in a state in which the infinite distance object is in focus is dA, and a maximum image height at the telephoto end is Yt, it is preferable to satisfy Conditional Expression (10). The lower part of FIG. 1 shows the spacing dA as an example, and the lower part of FIG. 2 shows the maximum image height Yt as an example. By not allowing the corresponding value of Conditional Expression (10) to be equal to or less than the lower limit, there is an advantage in achieving reduction in size of the entire lens system. By not allowing the corresponding value of Conditional Expression (10) to be equal to or greater than the upper limit, there is an advantage in suppressing spherical aberration on the telephoto side. In order to obtain more favorable characteristics, it is more preferable that the zoom lens satisfies Conditional Expression (10-1), and it is yet more preferable to satisfy Conditional Expression (10-2).

$$0.015 < dA/Yt < 0.35 \tag{10}$$

$$0.025 < dA/Yt < 0.2 \tag{10-1}$$

$$0.037 < dA/Yt < 0.11 \tag{10-2}$$

In the zoom lens according to the present embodiment, assuming that a sum of a back focal length at an air conversion distance and a distance on the optical axis Z from a lens surface closest to the object side in the first lens group G1 to a lens surface closest to the image side in the subsequent group Gr at the telephoto end in a state in which the infinite distance object is in focus is TLt, and a focal length of the whole system at the telephoto end in a state in which the infinite distance object is in focus is ft, it is preferable to satisfy Conditional Expression (11). By not allowing the corresponding value of Conditional Expression (11) to be equal to or less than the lower limit, there is an advantage in suppressing longitudinal chromatic aberration on the telephoto side. By not allowing the corresponding value of Conditional Expression (11) to be equal to or greater than the upper limit, there is an advantage in achieving reduction in total length of the lens system and to be advantageous in reduction in size. In order to obtain more favorable characteristics, it is more preferable that the zoom lens satisfies Conditional Expression (11-1), and it is yet more preferable to satisfy Conditional Expression (11-2).

$$0.65 < TLt/ft < 1.5 \tag{11}$$

$$0.8 < TLt/ft < 1.4 \tag{11-1}$$

$$0.95 < TLt/ft < 1.27 \tag{11-2}$$

In the zoom lens according to the present embodiment, assuming that a back focal length in terms of an air conversion distance at the wide angle end in a state in which the infinite distance object is in focus is BFw, and a maximum image height at the wide angle end is Yw, it is preferable to satisfy Conditional Expression (12). By not allowing the corresponding value of Conditional Expression (12) to be equal to or less than the lower limit, there is an advantage in ensuring the amount of peripheral light. By not allowing the corresponding value of Conditional Expression (12) to be equal to or greater than the upper limit, there is an advantage in achieving reduction in total length of the lens system and to be advantageous in reduction in size. In order to obtain more favorable characteristics, it is more preferable that the zoom lens satisfies Conditional Expression (12-1), and it is yet more preferable to satisfy Conditional Expression (12-2).

$$0.38 < BFw/Yw < 1.5 \quad (12)$$

$$0.45 < BFw/Yw < 1.2 \quad (12\text{-}1)$$

$$0.59 < BFw/Yw < 0.98 \quad (12\text{-}2)$$

Assuming that an Abbe number of the lens closest to the object side in the first lens group G1 based on the d line is $v1$, it is preferable to satisfy Conditional Expression (13). By not allowing the corresponding value of Conditional Expression (13) to be equal to or less than the lower limit, it is possible to suppress excessive correction of longitudinal chromatic aberration. By not allowing the corresponding value of Conditional Expression (13) to be equal to or greater than the upper limit, there is an advantage in correcting longitudinal chromatic aberration. In order to obtain more favorable characteristics, it is more preferable that the zoom lens satisfies Conditional Expression (13-1), and it is yet more preferable to satisfy Conditional Expression (13-2). In the example of FIG. 1, the lens L11 satisfies Conditional Expression (13).

$$10 < v1 < 50 \quad (13)$$

$$12 < v1 < 40 \quad (13\text{-}1)$$

$$14 < v1 < 27.3 \quad (13\text{-}2)$$

Assuming that a refractive index of the lens closest to the object side in the first lens group G1 at the d line is N1, it is preferable to satisfy Conditional Expression (14). By not allowing the corresponding value of Conditional Expression (14) to be equal to or less than the lower limit, there is an advantage in suppressing astigmatism. By not allowing the corresponding value of Conditional Expression (14) to be equal to or greater than the upper limit, the availability of the lens material is increased, and a material that is easier to manufacture can be used. In order to obtain more favorable characteristics, it is more preferable that the zoom lens satisfies Conditional Expression (14-1), and it is yet more preferable to satisfy Conditional Expression (14-2). In the example of FIG. 1, the lens L11 satisfies Conditional Expression (14).

$$1.7 < N1 < 2.3 \quad (14)$$

$$1.84 < N1 < 2.22 \quad (14\text{-}1)$$

$$1.88 < N1 < 2.16 \quad (14\text{-}2)$$

Assuming that a refractive index of a negative lens closest to the object side at the d line among negative lenses included in the second lens group G2 is N2n, it is preferable to satisfy Conditional Expression (15). By not allowing the corresponding value of Conditional Expression (15) to be equal to or less than the lower limit, the refractive power can be ensured without making the absolute value of the curvature radius of the negative lens excessively small. Therefore, the size of the negative lens in the optical axis direction can be prevented from increasing. As a result, there is an advantage in achieving reduction in weight. By not allowing the corresponding value of Conditional Expression (15) to be equal to or greater than the upper limit, the availability of the lens material is increased, and a material that is easier to manufacture can be used. In order to obtain more favorable characteristics, it is more preferable that the zoom lens satisfies Conditional Expression (15-1), and it is yet more preferable to satisfy Conditional Expression (15-2). In the example of FIG. 1, the lens L21 satisfies Conditional Expression (15).

$$1.6 < N2n < 2.2 \quad (15)$$

$$1.65 < N2n < 2.11 \quad (15\text{-}1)$$

$$1.7 < N2n < 2.05 \quad (15\text{-}2)$$

Assuming that a refractive index of the positive lens that has the strongest refractive power at the d line among the positive lenses included in the second lens group G2 is N2p, it is preferable to satisfy Conditional Expression (16). By not allowing the corresponding value of Conditional Expression (16) to be equal to or less than the lower limit, there is an advantage in suppressing astigmatism. By not allowing the corresponding value of Conditional Expression (16) to be equal to or greater than the upper limit, the availability of the lens material is increased, and a material that is easier to manufacture can be used. In order to obtain more favorable characteristics, it is more preferable that the zoom lens satisfies Conditional Expression (16-1), and it is yet more preferable to satisfy Conditional Expression (16-2). In the example of FIG. 1, the lens L23 satisfies Conditional Expression (16).

$$1.65 < N2p < 2 \quad (16)$$

$$1.71 < N2p < 1.93 \quad (16\text{-}1)$$

$$1.77 < N2p < 1.9 \quad (16\text{-}2)$$

Assuming that an Abbe number of a negative lens closest to the image side based on the d line among negative lenses included in the subsequent group Gr is $vnL$, it is preferable to satisfy Conditional Expression (17). By not allowing the corresponding value of Conditional Expression (17) to be equal to or less than the lower limit, there is an advantage in suppressing lateral chromatic aberration. By not allowing the corresponding value of Conditional Expression (17) to be equal to or greater than the upper limit, it is possible to suppress excessive correction of lateral chromatic aberration. In order to obtain more favorable characteristics, it is more preferable that the zoom lens satisfies Conditional Expression (17-1), and it is yet more preferable to satisfy Conditional Expression (17-2). In the example of FIG. 1, the lens L61 satisfies Conditional Expression (17).

$$27 < vnL < 102 \quad (17)$$

$$50 < vnL < 96 \quad (17\text{-}1)$$

$$70 < vnL < 88 \quad (17\text{-}2)$$

In the zoom lens according to the present embodiment, assuming that a sum of a back focal length at an air conversion distance and a distance on the optical axis Z from a lens surface closest to the object side in the first lens group G1 to a lens surface closest to the image side in the subsequent group Gr at the telephoto end in a state in which the infinite distance object is in focus is TLt, a difference in the direction of the optical axis Z between positions of a lens group closest to the object side at the wide angle end and at the telephoto end among lens groups that have positive refractive powers and that are included in the subsequent group Gr in a state in which the infinite distance object is in focus is Mp, it is preferable to satisfy Conditional Expression (18). Here, the sign of Mp is positive in a case where the lens group closest to the object side moves from the object side to the image side, and is negative in a case where the lens group moves from the image side to the object side, during zooming from the wide angle end to the telephoto end. By not allowing the corresponding value of Conditional Expression (18) to be equal to or less than the lower limit, the absolute value of Mp is prevented from becoming excessively large. Therefore, it is possible to suppress an increase in amount of movement of the lens group closest to the object side among the lens groups that have positive refractive powers and that are included in the subsequent group Gr. As a result, there is an advantage in achieving reduction in size. By not allowing the corresponding value of Conditional Expression (18) to be equal to or greater than the upper limit, the absolute value of Mp is prevented from becoming excessively small. As a result, there is an advantage in achieving a high zoom ratio. In order to obtain more favorable characteristics, it is more preferable that the zoom lens satisfies Conditional Expression (18-1), and it is yet more preferable to satisfy Conditional Expression (18-2). In the example of FIG. 1, a difference in the direction of the optical axis Z between positions of the third lens group G3 which is a lens group closest to the object side at the wide angle end and at the telephoto end among lens groups that have positive refractive powers and that are included in the subsequent group Gr is Mp, Conditional Expression (18) is satisfied.

$$-0.45 < Mp/TLt < -0.06 \tag{18}$$

$$-0.39 < Mp/TLt < -0.12 \tag{18-1}$$

$$-0.33 < Mp/TLt < -0.15 \tag{18-2}$$

In the zoom lens according to the present embodiment, assuming that a focal length of a lens group closest to the object side among lens groups that have positive refractive powers and that are included in the subsequent group Gr in a state in which the infinite distance object is in focus is fp, and a focal length of the second lens group G2 is f2, it is preferable to satisfy Conditional Expression (19). By not allowing the corresponding value of Conditional Expression (19) to be equal to or less than the lower limit, the absolute value of f2 is prevented from becoming excessively small. As a result, there is an advantage in suppressing fluctuations in various aberrations that occur during zooming. By not allowing the corresponding value of Conditional Expression (19) to be equal to or greater than the upper limit, the absolute value of f2 is prevented from becoming excessively large. As a result, there is an advantage in shortening the second lens group G2, and thus there is an advantage in achieving reduction in size. In order to obtain more favorable characteristics, it is more preferable that the zoom lens satisfies Conditional Expression (19-1), and it is yet more preferable to satisfy Conditional Expression (19-2). In the example of FIG. 1, assuming that a focal length of the third lens group G3, which is the lens group closest to the object side among the lens groups that have positive refractive powers and that are included in the subsequent group Gr, is fp, Conditional Expression (19) is satisfied.

$$-4.3 < fp/f2 < -1.1 \tag{19}$$

$$-3.9 < fp/f2 < -1.5 \tag{19-1}$$

$$-3.4 < fp/f2 < -1.95 \tag{19-2}$$

In the zoom lens according to the present embodiment, assuming that a distance on the optical axis Z from a lens surface closest to the image side in the first lens group G1 to a lens surface closest to the object side in a lens group closest to the object side among lens groups that have positive refractive powers and that are included in the subsequent group Gr at the telephoto end in a state in which the infinite distance object is in focus is D1pt, and a sum of a back focal length in terms of an air conversion distance and a distance on the optical axis Z from the lens surface closest to the object side in the first lens group G1 to the lens surface closest to the image side in the subsequent group Gr, at the telephoto end in a state in which the infinite distance object is in focus is TLt, it is preferable to satisfy Conditional Expression (20). The lower part of FIG. 1 shows the distance D1pt and the sum TLt as an example. By not allowing the corresponding value of Conditional Expression (20) to be equal to or less than the lower limit, there is an advantage in achieving reduction in total length of the lens system. By not allowing the corresponding value of Conditional Expression (20) to be equal to or greater than the upper limit, there is an advantage in suppressing spherical aberration on the telephoto side. In order to obtain more favorable characteristics, it is more preferable that the zoom lens satisfies Conditional Expression (20-1), and it is yet more preferable to satisfy Conditional Expression (20-2).

$$0.2 < D1pt/TLt < 0.5 \tag{20}$$

$$0.25 < D1pt/TLt < 0.42 \tag{20-1}$$

$$0.29 < D1pt/TLt < 0.39 \tag{20-2}$$

As described above, in a case where the subsequent group Gr includes at least one Lx lens of which the image side lens surface is a convex surface being in contact with air, an optical system, which minimizes an absolute value of an inverse of a lateral magnification at the wide angle end in a case where an aperture stop St is used as an object point in a state in which the infinite distance object is in focus, in at least one optical system configured to range from a lens surface adjacent to the image side of the aperture stop St to the image side lens surface of the Lx lens is an A optical system. In the zoom lens according to the present embodiment, the focal length of the whole system at the wide angle end in a state in which the infinite distance object is in focus is fw, and a combined focal length at the wide angle end in a state in which the infinite distance object is in focus from a lens surface adjacent to the image side of the lens surface (that is, the A surface A) closest to the image side in the A optical system to a lens surface closest to the image side in the subsequent group Gr is fBw, it is preferable to satisfy Conditional Expression (21). By not allowing the corresponding value of Conditional Expression (21) to be equal to or less than the lower limit, there is an advantage in suppressing astigmatism on the wide angle side. By not allowing the corresponding value of Conditional Expression (21) to be equal to or greater than the upper limit, the negative refractive power from the lens surface adjacent to the image side of the A surface A to the lens surface closest to the image side in the subsequent group Gr can be strengthened. Therefore, the luminous flux diameter from the lens surface closest to the object side in the subsequent group Gr to the A surface A can be reduced. As a result, there is an advantage in achieving reduction in diameter. In order to obtain more favorable characteristics, it is more preferable that the zoom lens satisfies Conditional Expression (21-1), and it is yet more preferable to satisfy Conditional Expression (21-2).

$$-1.6 < fw/fBw < -0.25 \quad (21)$$

$$-1.3 < fw/fBw < -0.37 \quad (21\text{-}1)$$

$$-1.1 < fw/fBw < -0.69 \quad (21\text{-}2)$$

In the zoom lens according to the present embodiment, assuming that a focal length of the whole system at the wide angle end in a state in which the infinite distance object is in focus as fw, a maximum half angle of view at the wide angle end in a state in which the infinite distance object is in focus is ωw, and a maximum image height at the wide angle end is Yw, it is preferable to satisfy Conditional Expression (22). By not allowing the corresponding value of Conditional Expression (22) to be equal to or less than the lower limit, the height of the off-axis ray passing through the lens closest to the object side in the first lens group G1 from the optical axis Z can be lowered on the wide angle side. As a result, there is an advantage in achieving reduction in diameter. By not allowing the corresponding value of Conditional Expression (22) to be equal to or greater than the upper limit, there is an advantage in suppressing various aberrations of the off-axis ray on the wide angle side. In order to obtain more favorable characteristics, it is more preferable that the zoom lens satisfies Conditional Expression (22-1), and it is yet more preferable to satisfy Conditional Expression (22-2).

$$0.97 < fw \times \tan \omega w / Yw < 1.3 \quad (22)$$

$$1 < fw \times \tan \omega w / Yw < 1.19 \quad (22\text{-}1)$$

$$1.02 < fw \times \tan \omega w / Yw < 1.11 \quad (22\text{-}2)$$

Assuming that a focal length of the first lens group G1 is f1 and a focal length of the second lens group G2 is f2, it is preferable that the zoom lens according to the present embodiment satisfies Conditional Expression (23). By not allowing the corresponding value of Conditional Expression (23) to be equal to or less than the lower limit, there is an advantage in achieving a high zoom ratio. By not allowing the corresponding value of Conditional Expression (23) to be equal to or greater than the upper limit, there is an advantage in suppressing fluctuations in various aberrations that occur during zooming. In order to obtain more favorable characteristics, it is more preferable that the zoom lens satisfies Conditional Expression (23-1), and it is yet more preferable to satisfy Conditional Expression (23-2).

$$-0.3 < f2/f1 < -0.05 \quad (23)$$

$$-0.23 < f2/f1 < -0.1 \quad (23\text{-}1)$$

$$-0.19 < f2/f1 < -0.14 \quad (23\text{-}2)$$

The above-mentioned preferable configurations and available configurations including the configurations relating to Conditional Expressions may be any combination, and it is preferable to optionally adopt the configurations in accordance with required specification. It should be noted that Conditional Expressions that the zoom lens of the present disclosure preferably satisfies are not limited to Conditional Expressions described in the form of Expressions, and the lower limits and the upper limits are selected from the preferable, more preferable, and yet more preferable conditional expressions. Conditional Expressions may include all conditional expressions obtained through optional combinations. Further, the example shown in FIG. 1 is an example, and various modifications can be made without departing from the scope of the technique of the present disclosure. For example, the number of lenses constituting each lens group may be different from the number shown in FIG. 1.

For example, a preferred embodiment of the present disclosure is a zoom lens consisting of, in order from the object side to the image side: a first lens group G1 that has a positive refractive power, a second lens group G2 that has a negative refractive power, and a subsequent group Gr that has a plurality of lens groups. The zoom lens includes an aperture stop St at a position closer to the image side than a lens surface closest to the image side in the second lens group G2. A lens group closest to the image side in the subsequent group Gr includes at least one negative lens of which an object side lens surface is a concave surface being in contact with air. During zooming, a spacing between the first lens group G1 and the second lens group G2 changes, a spacing between the second lens group G2 and the subsequent group Gr changes, and spacings between all adjacent lens groups in the subsequent group Gr change. During zooming, lens spacings inside the first lens group G1, the second lens group G2, and the plurality of lens groups are unchanged. Thus, the zoom lens satisfies Conditional Expression (1).

Next, examples of the zoom lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. Regarding the zoom lens of Example 1, Table 1 shows basic lens data, Table 2 shows specifications and variable surface spacings, and Table 3 shows aspherical coefficients thereof.

Table 1 is noted as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of vd shows an Abbe number of each component based on the d line. Table 1 also shows the aperture stop St, and in the column of the surface number of the surface corresponding to the aperture stop St, the surface number and (St) are noted. Further, in a cell of a surface number of a surface corresponding to the A surface A, the surface number and a term of (A) are noted. In Table 1, the sign of the curvature radius of the convex surface facing toward the object side is positive and the sign of the curvature radius of the convex surface facing toward the image side is negative. In Table 1, the symbol DD [ ] is used for each variable surface spacing during zooming, and the object side surface number of the spacing is given in [ ] and is noted in the column of D.

Table 2 shows the zoom magnification Zr, the focal length f of the whole system, the back focal length BF, the F number FNo., the maximum total angle of view 2ω, and the variable surface spacing during zooming. [°] in the cell of 2ω indicates that the unit thereof is a degree. The values shown in Table 2 are values in the case of using the d line as a reference in a state in which the infinite distance object is in focus. In Table 2, the values in the wide angle end state, the middle focal length state, and the telephoto end state are shown in columns labeled WIDE, MIDDLE, and TELE, respectively.

In Table 1, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am (m is an integer of 3 or more) shows numerical values of the aspherical coefficients for each aspherical surface. The "E±n" (n is an integer) in numerical values of the aspherical coefficients of Table 3 indicates "10$^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis and that is in contact with the vertex of the aspherical surface), h is a height (a distance from the optical axis to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | 331.0255 | 1.4086 | 1.96300 | 24.11 |
| 2 | 88.5944 | 4.7137 | 1.53775 | 74.70 |
| 3 | −327.9097 | 0.1002 | | |
| 4 | 84.3684 | 3.6596 | 1.86100 | 37.10 |
| 5 | 661.6761 | DD[5] | | |
| *6 | 270.9414 | 0.9002 | 1.85135 | 40.10 |
| *7 | 24.3655 | 5.6395 | | |
| 8 | −43.1327 | 0.8368 | 1.75500 | 52.32 |
| 9 | 47.5474 | 0.1011 | | |
| 10 | 39.9947 | 4.3384 | 1.82115 | 24.06 |
| 11 | −45.3780 | 2.9388 | | |
| 12 | −23.4967 | 0.8487 | 1.72987 | 57.58 |

TABLE 1-continued

Example 1

| Sn | R | D | Nd | vd |
|---|---|---|---|---|
| 13 | −70.4345 | DD[13] | | |
| 14(St) | ∞ | 1.5007 | | |
| *15 | 39.8220 | 4.2667 | 1.59201 | 67.02 |
| *16 | −73.3593 | 0.0998 | | |
| 17 | 34.6162 | 3.6545 | 1.48749 | 70.24 |
| 18 | −658.8974 | 0.8566 | 1.80440 | 39.59 |
| 19 | 104.1638 | 1.2048 | | |
| 20 | 32.2697 | 0.8448 | 1.95234 | 33.43 |
| 21 | 23.2106 | 0.0998 | | |
| 22 | 23.2106 | 5.3984 | 1.48749 | 70.24 |
| 23 | −75.4665 | 0.6567 | | |
| 24 | −45.2596 | 0.8423 | 1.82200 | 46.62 |
| 25 | 92.5959 | DD[25] | | |
| 26 | 73.5219 | 3.4108 | 1.49700 | 81.54 |
| 27 | −48.3043 | 0.8352 | 1.98326 | 31.02 |
| 28 | −266.5243 | 2.3682 | | |
| *29 | −45.6318 | 1.7351 | 1.78436 | 51.87 |
| *30 | −35.1678 | 0.1021 | | |
| *31 | 158.5781 | 6.0760 | 1.55032 | 75.50 |
| *32(A) | −24.2967 | DD[32] | | |
| 33 | 206.8111 | 3.3459 | 1.97722 | 31.65 |
| 34 | −46.9241 | 0.9709 | 1.77823 | 46.56 |
| 35 | 35.1932 | DD[35] | | |
| 36 | −19.7340 | 0.9490 | 1.49700 | 81.54 |
| 37 | −41.9426 | | | |

TABLE 2

Example 1

| | WIDE | MIDDLE | TELE |
|---|---|---|---|
| Zr | 1.0 | 2.6 | 6.7 |
| f | 27.30 | 71.10 | 184.18 |
| BF | 14.5210 | 44.5024 | 64.6757 |
| FNo. | 3.49 | 4.10 | 5.70 |
| 2ω(°) | 81.2 | 32.8 | 12.8 |
| DD[5] | 0.9373 | 22.3019 | 54.4095 |
| DD[13] | 20.4486 | 9.4941 | 1.4511 |
| DD[25] | 9.2638 | 2.7453 | 0.9930 |
| DD[32] | 5.1589 | 1.3608 | 0.9911 |
| DD[35] | 13.3318 | 17.1299 | 17.4996 |

TABLE 3

Example 1

| Sn | 6 | 7 | 15 | 16 |
|---|---|---|---|---|
| KA | 1.0000000 E+00 | 1.0000000 E+00 | 1.0000000 E+00 | 1.0000000 E+00 |
| A3 | 0.0000000 E+00 | 0.0000000 E+00 | 0.0000000 E+00 | 0.0000000 E+00 |
| A4 | 9.0419287 E−06 | 6.9280608 E−06 | −9.7505425 E−07 | 8.9930512 E−07 |
| A5 | 0.0000000 E+00 | 0.0000000 E+00 | 0.0000000 E+00 | 0.0000000 E+00 |
| A6 | −9.0649172 E−09 | −1.4235140 E−08 | 3.0946976 E−10 | −3.3689655 E−09 |
| A7 | 0.0000000 E+00 | 0.0000000 E+00 | 0.0000000 E+00 | 0.0000000 E+00 |
| A8 | −2.5429857 E−10 | 3.6567591 E−10 | −2.3630929 E−10 | −1.6029722 E−10 |
| A9 | 0.0000000 E+00 | 0.0000000 E+00 | 0.0000000 E+00 | 0.0000000 E+00 |
| A10 | 4.1548506 E−12 | −8.7339529 E−12 | 3.0939260 E−13 | −1.5274232 E−12 |
| A11 | 0.0000000 E+00 | 0.0000000 E+00 | 0.0000000 E+00 | 0.0000000 E+00 |
| A12 | −2.3750206 E−14 | 1.1668810 E−13 | 1.0474635 E−14 | 2.7713383 E−14 |

TABLE 3-continued

| | | Example 1 | | |
|---|---|---|---|---|
| A13 | 0.0000000 E+00 | 0.0000000 E+00 | 0.0000000 E+00 | 0.0000000 E+00 |
| A14 | 6.0966974 E-17 | -6.3540808 E-16 | -1.0562305 E-16 | -1.7792667 E-16 |
| A15 | 0.0000000 E+00 | 0.0000000 E+00 | 0.0000000 E+00 | 0.0000000 E+00 |
| A16 | -5.8637514 E-20 | 1.1868286 E-18 | 2.6098193 E-19 | 3.7349026 E-19 |
| Sn | 29 | 30 | 31 | 32 |
| KA | 1.0000000 E+00 | 1.0000000 E+00 | 1.0000000 E+00 | 1.0000000 E+00 |
| A3 | 0.0000000 E+00 | 0.0000000 E+00 | 0.0000000 E+00 | 0.0000000 E+00 |
| A4 | -6.0401300 E-05 | -2.1622590 E-05 | 3.8571099 E-06 | -1.4361569 E-05 |
| A5 | 0.0000000 E+00 | 0.0000000 E+00 | 0.0000000 E+00 | 0.0000000 E+00 |
| A6 | 6.5749656 E-08 | 9.7578529 E-08 | -1.2779274 E-08 | -1.8187831 E-08 |
| A7 | 0.0000000 E+00 | 0.0000000 E+00 | 0.0000000 E+00 | 0.0000000 E+00 |
| A8 | -9.7342327 E-10 | -6.6836753 E-10 | -1.9275502 E-11 | 1.8786514 E-10 |
| A9 | 0.0000000 E+00 | 0.0000000 E+00 | 0.0000000 E+00 | 0.0000000 E+00 |
| A10 | 1.2276699 E-11 | 9.6679349 E-12 | 1.9236039 E-13 | -1.1113493 E-12 |
| A11 | 0.0000000 E+00 | 0.0000000 E+00 | 0.0000000 E+00 | 0.0000000 E+00 |
| A12 | -4.0370775 E-14 | -3.1010028 E-14 | -6.6536598 E-16 | 2.5875067 E-15 |
| A13 | 0.0000000 E+00 | 0.0000000 E+00 | 0.0000000 E+00 | 0.0000000 E+00 |
| A14 | 0.0000000 E+00 | 0.0000000 E+00 | 7.4538414 E-18 | -1.5934823 E-18 |
| A15 | 0.0000000 E+00 | 0.0000000 E+00 | 0.0000000 E+00 | 0.0000000 E+00 |
| A16 | 0.0000000 E+00 | 0.0000000 E+00 | -2.1415715 E-20 | 1.2905219 E-20 |

Figure 5:
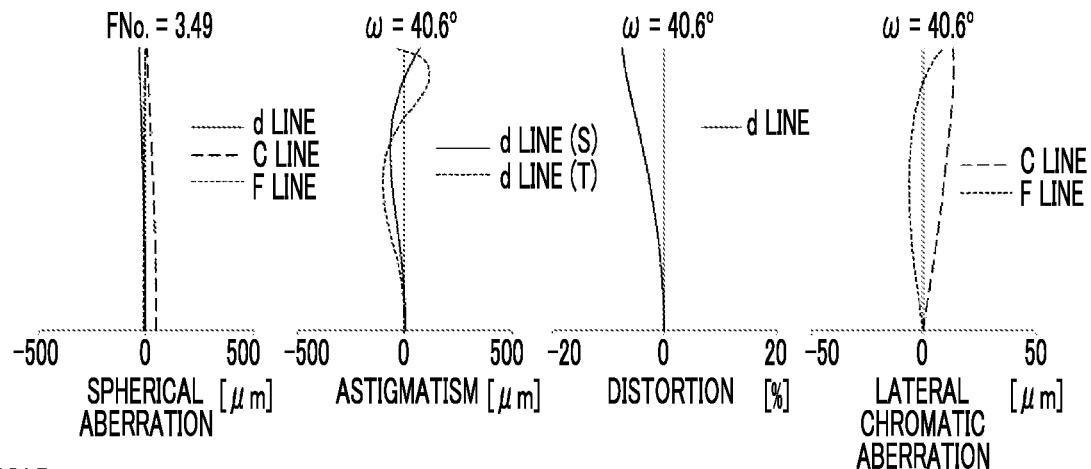
FIG. 5 is a diagram showing aberrations of the zoom lens of Example 1.
Figure 5:
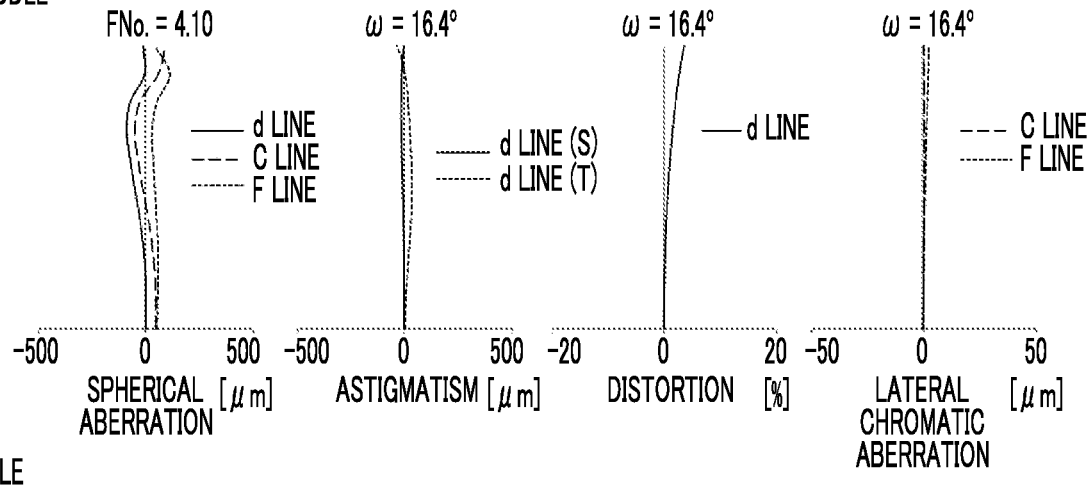
Figure 5:
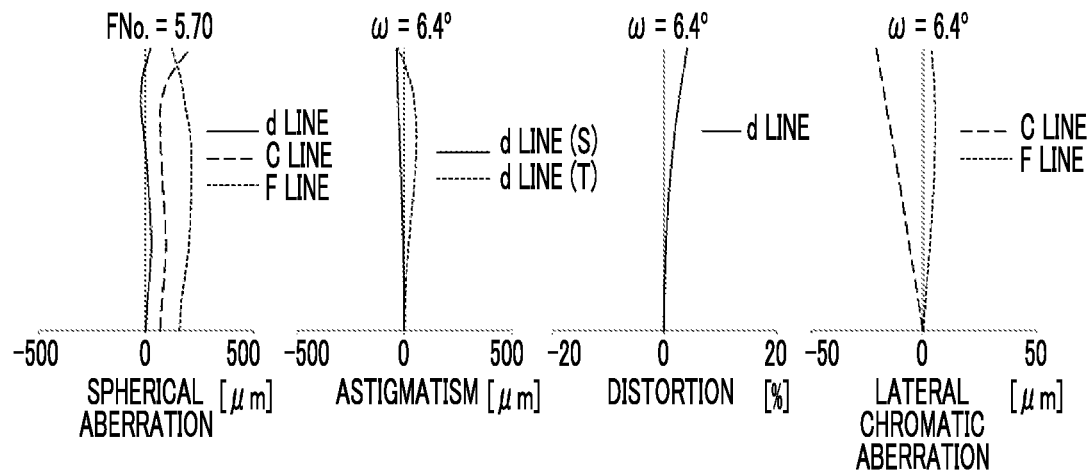

FIG. 5 is a diagram showing aberrations of the zoom lens of Example 1 in a state where the infinite distance object is in focus. FIG. 5 shows, in order from the left, spherical aberration, astigmatism, distortion, and lateral chromatic aberration. In FIG. 5, the upper part labeled "WIDE" shows aberrations in the wide angle end state, the middle part labeled "MIDDLE" shows aberrations in the middle focal length state, and the lower part labeled "TELE" shows aberrations in the telephoto end state. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, the aberrations at the C line and the F line are indicated by the long broken line and the short broken line, respectively. In the spherical aberration diagram, the value of the F number is shown after "FNo.=", and in the other aberration diagrams, the value of the half angle of view is shown after "ω=".

Symbols, meanings, description methods, and illustration methods of the respective data pieces according to Example 1 are the same as those in the following examples unless otherwise specified. Therefore, in the following description, repeated description will not be given.

Example 2

Figure 6:
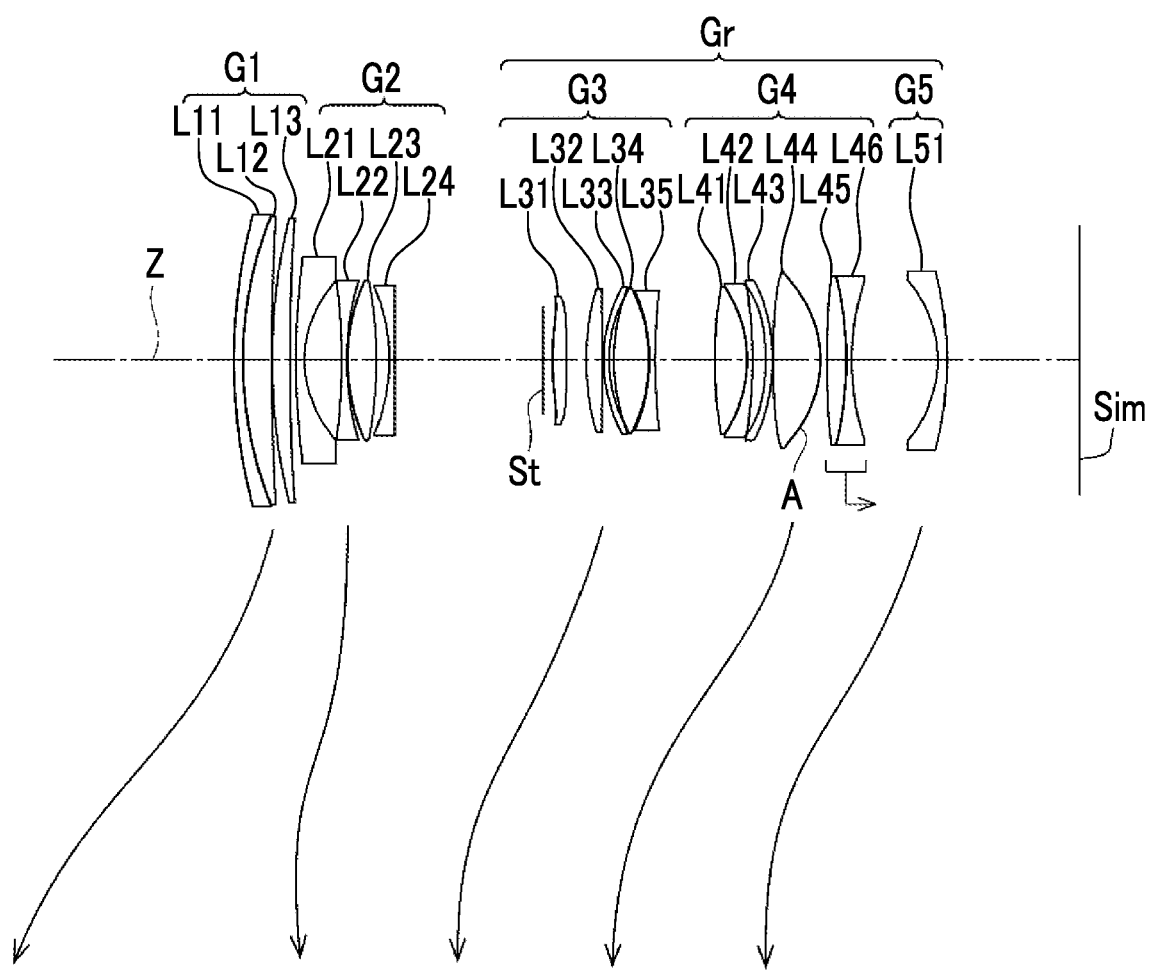
FIG. 6 is a diagram showing a cross-sectional configuration and movement loci of the zoom lens of Example 2.

FIG. 6 is a diagram showing a cross-sectional view of the configuration and movement loci of the zoom lens of Example 2 at the wide angle end in a state where the infinite distance object is in focus. It should be noted that, compared with FIG. 1, FIG. 6 does not show the configuration at the telephoto end, and the point is the same in the following cross-sectional views of Examples 3 to 8. The zoom lens of Example 2 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power, a fourth lens group G4 that has a positive refractive power, and a fifth lens group G5 that has a negative refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of six lenses L41 to L46 in order from the object side to the image side. The fifth lens group G5 consists of one lens L51. The focus group consists of two lenses L45 and L46.

Figure 7:
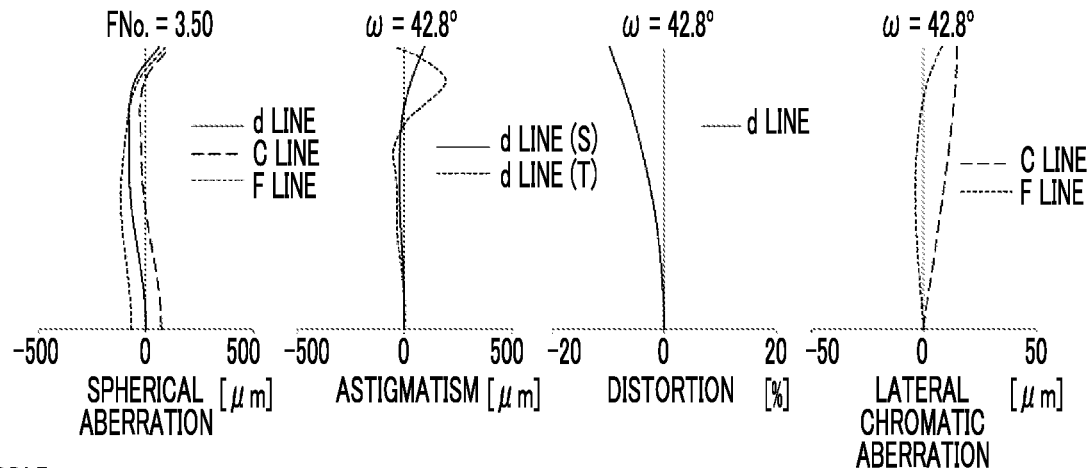
FIG. 7 is a diagram showing aberrations of the zoom lens of Example 2.
Figure 7:
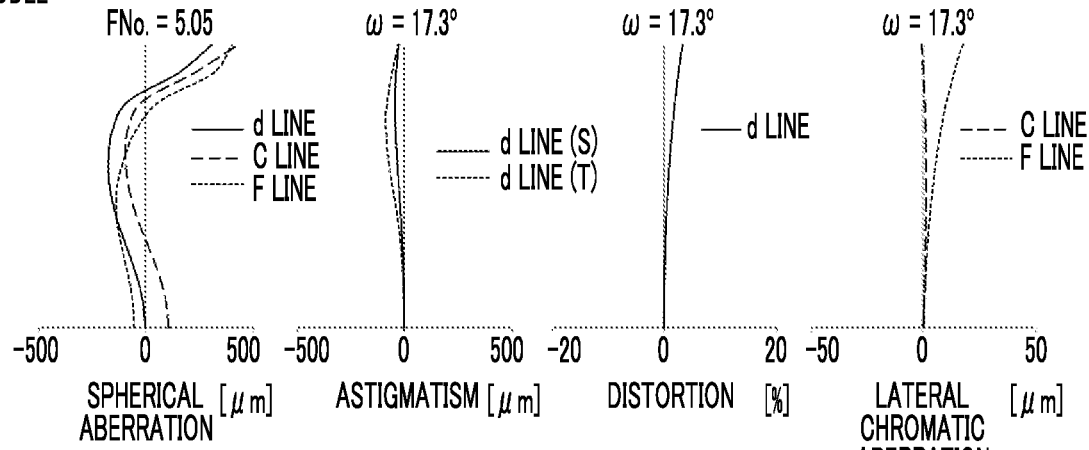
Figure 7:
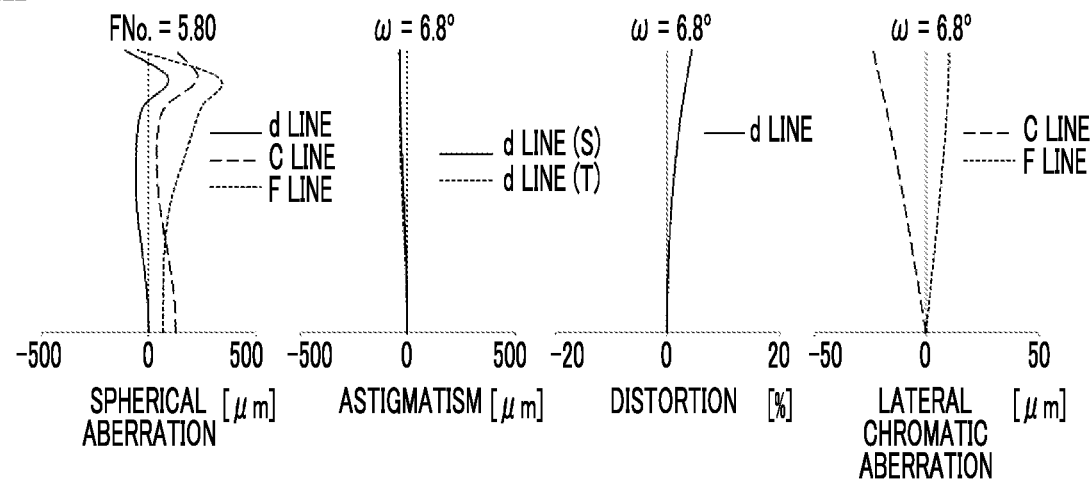

Regarding the zoom lens of Example 2, Table 4 shows basic lens data, Table 5 shows specifications and variable surface spacings, and Table 6 shows aspherical coefficients thereof. FIG. 7 shows aberration diagrams.

TABLE 4

| | | Example 2 | | |
|---|---|---|---|---|
| Sn | R | D | Nd | νd |
| 1 | 94.2986 | 1.4176 | 1.89286 | 20.36 |
| 2 | 63.3654 | 4.5098 | 1.59522 | 67.73 |
| 3 | 373.8168 | 0.0998 | | |
| 4 | 98.4414 | 2.8091 | 1.80400 | 46.53 |
| 5 | 332.3682 | DD[5] | | |
| *6 | 116.8746 | 1.3459 | 1.83481 | 42.74 |
| *7 | 18.1975 | 5.9032 | | |
| 8 | -97.6485 | 0.8292 | 1.82721 | 47.38 |
| 9 | 45.6157 | 0.0998 | | |
| 10 | 31.4850 | 4.5832 | 1.85896 | 22.73 |
| 11 | -68.4772 | 2.0809 | | |
| 12 | -30.1543 | 0.8516 | 1.82502 | 47.61 |
| 13 | -2870.4505 | DD[13] | | |
| 14(St) | ∞ | 1.5002 | | |
| *15 | 47.7458 | 2.1969 | 1.49700 | 81.54 |
| *16 | -263.2799 | 2.9472 | | |
| 17 | 40.7280 | 2.5484 | 1.49700 | 81.54 |
| 18 | -818.8158 | 0.2323 | | |
| 19 | 25.2301 | 0.8582 | 1.60242 | 66.81 |
| 20 | 22.1342 | 0.7926 | | |
| 21 | 33.0430 | 5.5534 | 1.51823 | 58.90 |
| 22 | -25.6413 | 0.0998 | | |
| 23 | -28.0069 | 0.8643 | 1.76047 | 39.33 |
| 24 | 92.5896 | DD[24] | | |
| 25 | 70.1476 | 5.1409 | 1.43875 | 94.66 |
| 26 | -21.4621 | 0.8486 | 1.88032 | 41.69 |
| 27 | -77.6100 | 2.0795 | | |
| *28 | -39.7424 | 1.0898 | 1.87570 | 42.29 |
| *29 | -34.5887 | 0.0998 | | |
| *30 | 128.6415 | 7.5100 | 1.48749 | 70.24 |
| *31(A) | -19.5233 | 0.9946 | | |

TABLE 4-continued

Example 2

| Sn | R | D | Nd | vd |
|---|---|---|---|---|
| 32 | 133.5257 | 3.1265 | 1.90191 | 39.55 |
| 33 | −56.5553 | 0.8458 | 1.73923 | 56.60 |
| 34 | 41.3995 | DD[34] | | |
| 35 | −19.8870 | 1.5002 | 1.62923 | 62.55 |
| 36 | −55.7871 | | | |

TABLE 5

Example 2

| | WIDE | MIDDLE | TELE |
|---|---|---|---|
| Zr | 1.0 | 2.6 | 6.7 |
| f | 25.87 | 67.38 | 174.53 |
| BF | 21.0195 | 46.8049 | 56.6225 |
| FNo. | 3.5 | 5.05 | 5.80 |
| 2ω(°) | 85.6 | 34.6 | 13.6 |
| DD[5] | 0.9766 | 20.7270 | 54.9698 |
| DD[13] | 23.5239 | 9.1717 | 1.4737 |
| DD[24] | 9.4594 | 3.5609 | 1.2093 |
| DD[34] | 13.6205 | 16.8386 | 18.9876 |

TABLE 6

Example 2

| Sn | 6 | 7 | 15 | 16 |
|---|---|---|---|---|
| KA | 1.0000000 E+00 | 1.0000000 E+00 | 1.0000000 E+00 | 1.0000000 E+00 |
| A3 | 0.0000000 E+00 | 0.0000000 E+00 | 0.0000000 E+00 | 0.0000000 E+00 |
| A4 | −5.0854245 E−06 | −7.7702130 E−06 | −1.4990912 E−05 | −1.4995166 E−05 |
| A5 | 0.0000000 E+00 | 0.0000000 E+00 | 0.0000000 E+00 | 0.0000000 E+00 |
| A6 | 4.7329307 E−08 | −7.1725961 E−09 | −1.9992757 E−07 | −1.7162613 E−07 |
| A7 | 0.0000000 E+00 | 0.0000000 E+00 | 0.0000000 E+00 | 0.0000000 E+00 |
| A8 | −2.2317953 E−10 | 1.0581109 E−09 | −1.9672269 E−09 | −2.0005583 E−09 |
| A9 | 0.0000000 E+00 | 0.0000000 E+00 | 0.0000000 E+00 | 0.0000000 E+00 |
| A10 | 1.3935294 E−13 | −1.9120690 E−11 | 2.3349735 E−12 | 4.9436422 E−13 |
| A11 | 0.0000000 E+00 | 0.0000000 E+00 | 0.0000000 E+00 | 0.0000000 E+00 |
| A12 | 2.6437173 E−15 | 1.4890578 E−13 | 3.2549821 E−14 | 3.0798971 E−15 |
| A13 | 0.0000000 E+00 | 0.0000000 E+00 | 0.0000000 E+00 | 0.0000000 E+00 |
| A14 | −9.5124017 E−18 | −6.1043050 E−16 | −1.6308454 E−15 | −5.0060094 E−16 |
| A15 | 0.0000000 E+00 | 0.0000000 E+00 | 0.0000000 E+00 | 0.0000000 E+00 |
| A16 | 1.0513469 E−20 | 1.0104097 E−18 | 1.6538290 E−18 | −3.2764146 E−18 |

| Sn | 28 | 29 | 30 | 31 |
|---|---|---|---|---|
| KA | 1.0000000 E+00 | 1.0000000 E+00 | 1.0000000 E+00 | 1.0000000 E+00 |
| A3 | 0.0000000 E+00 | 0.0000000 E+00 | 0.0000000 E+00 | 0.0000000 E+00 |
| A4 | −5.7484792 E−05 | −2.5522568 E−05 | 7.4579686 E−06 | −4.9045419 E−06 |
| A5 | 0.0000000 E+00 | 0.0000000 E+00 | 0.0000000 E+00 | 0.0000000 E+00 |
| A6 | 4.7243437 E−08 | 9.8159108 E−08 | 7.1531359 E−09 | −7.8896578 E−09 |
| A7 | 0.0000000 E+00 | 0.0000000 E+00 | 0.0000000 E+00 | 0.0000000 E+00 |
| A8 | −1.0536171 E−09 | −7.5077137 E−10 | 1.0694491 E−10 | 1.9017398 E−10 |
| A9 | 0.0000000 E+00 | 0.0000000 E+00 | 0.0000000 E+00 | 0.0000000 E+00 |
| A10 | 9.2135585 E−12 | 9.4462274 E−12 | 4.2732218 E−13 | −4.1903558 E−13 |
| A11 | 0.0000000 E+00 | 0.0000000 E+00 | 0.0000000 E+00 | 0.0000000 E+00 |
| A12 | −3.7046484 E−14 | −4.1512455 E−14 | −3.5921816 E−15 | 5.3383347 E−15 |
| A13 | 0.0000000 E+00 | 0.0000000 E+00 | 0.0000000 E+00 | 0.0000000 E+00 |
| A14 | 0.0000000 E+00 | 0.0000000 E+00 | 1.1487541 E−18 | −5.7859996 E−20 |
| A15 | 0.0000000 E+00 | 0.0000000 E+00 | 0.0000000 E+00 | 0.0000000 E+00 |
| A16 | 0.0000000 E+00 | 0.0000000 E+00 | 3.3684259 E−20 | 2.0859008 E−20 |

Figure 8:
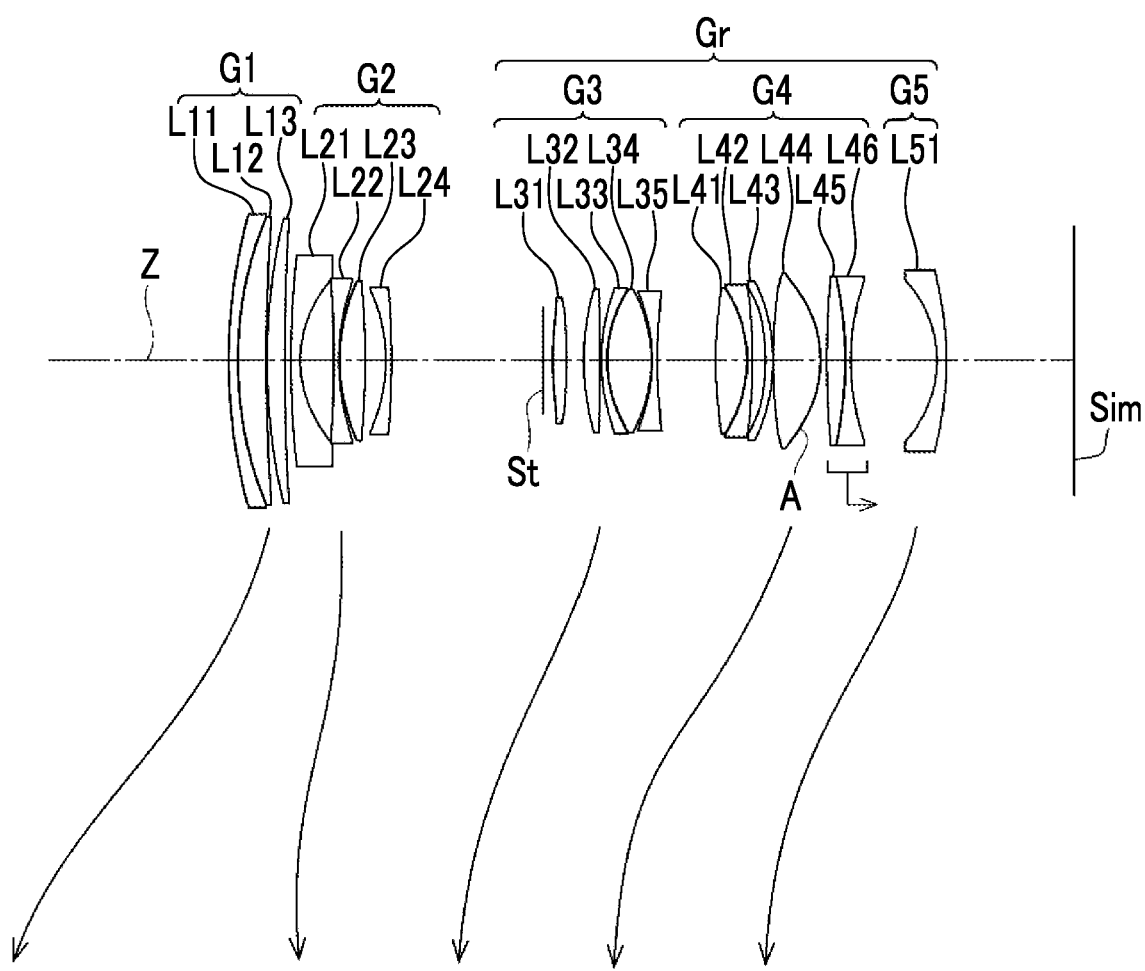
FIG. 8 is a diagram showing a cross-sectional configuration and movement loci of the zoom lens of Example 3.

FIG. 8 is a diagram showing a cross-sectional view and movement loci of the configuration at the wide angle end in a state in which the zoom lens of Example 3 is in a state in which the infinite distance object is in focus. The zoom lens of Example 3 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power, a fourth lens group G4 that has a positive refractive power, and a fifth lens group G5 that has a negative refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of six lenses L41 to L46 in order from the object side to the image side. The fifth lens group G5 consists of one lens L51. The focus group consists of two lenses L45 and L46.

Figure 9:
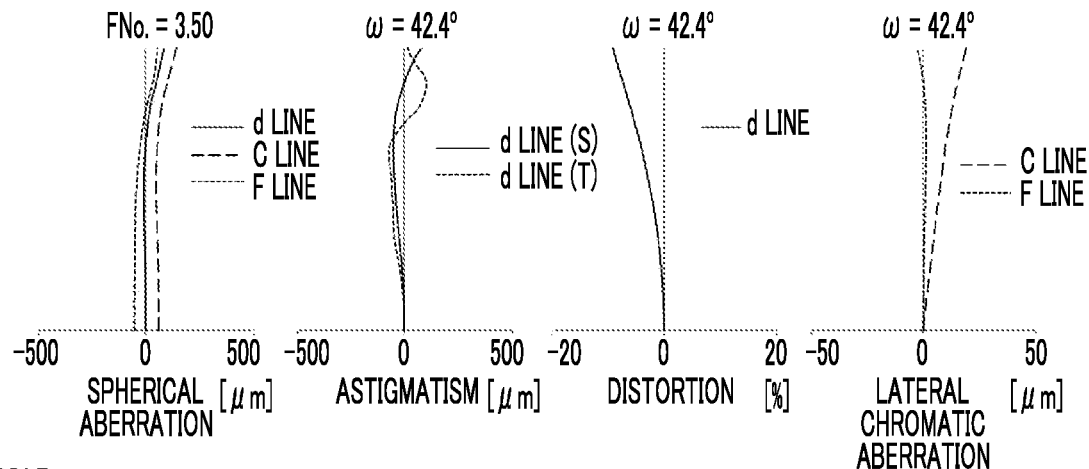
FIG. 9 is a diagram showing aberrations of the zoom lens of Example 3.
Figure 9:
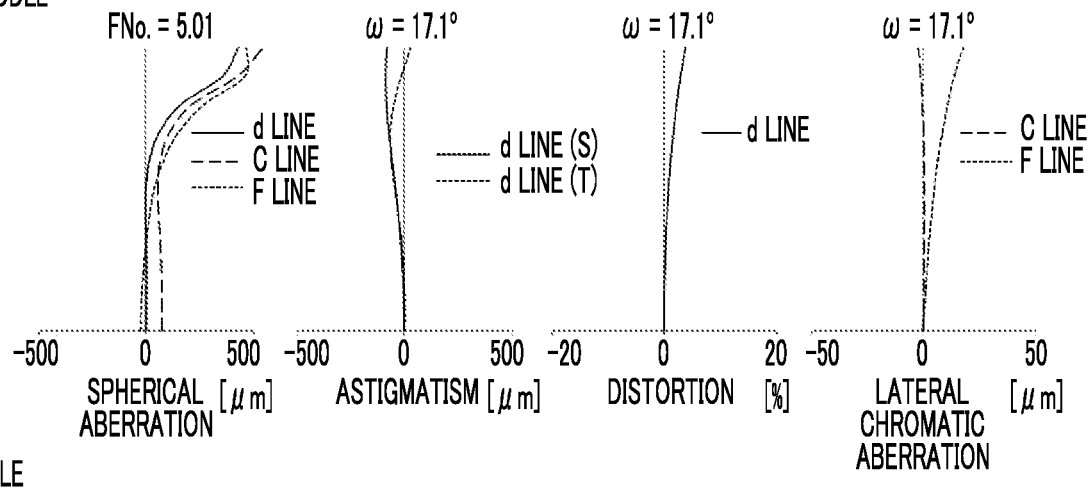
Figure 9:
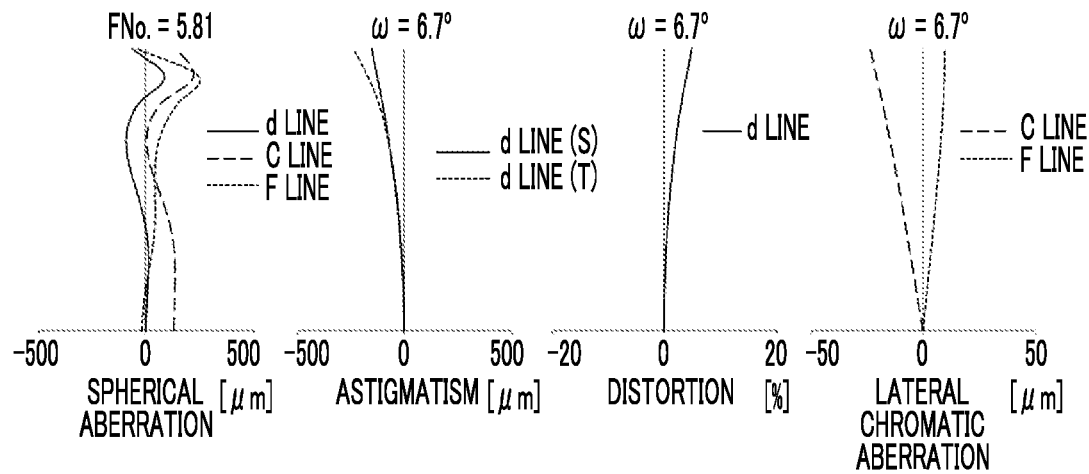

Regarding the zoom lens of Example 3, Table 7 shows basic lens data, Table 8 shows specifications and variable surface spacings, and Table 9 shows aspherical coefficients thereof. FIG. 9 shows aberration diagrams.

TABLE 7

Example 3

| Sn | R | D | Nd | vd |
|---|---|---|---|---|
| 1 | 91.3282 | 1.4284 | 1.89286 | 20.36 |
| 2 | 61.9165 | 4.5100 | 1.59522 | 67.73 |
| 3 | 325.4496 | 6.0998 | | |
| 4 | 101.4041 | 2.8345 | 1.80400 | 46.53 |
| 5 | 384.8026 | DD[5] | | |
| *6 | 177.4449 | 1.4529 | 1.84289 | 45.73 |
| *7 | 19.4415 | 5.3265 | | |
| 8 | −191.8075 | 0.8339 | 1.77104 | 53.27 |
| 9 | 39.8527 | 0.0998 | | |
| 10 | 31.1364 | 4.0268 | 1.85446 | 22.28 |
| 11 | −147.6059 | 3.3001 | | |
| 12 | −27.5174 | 0.8557 | 1.77149 | 53.22 |
| 13 | −150.6664 | DD[13] | | |
| 14(St) | ∞ | 1.5002 | | |
| *15 | 50.6217 | 2.1761 | 1.49700 | 81.54 |

TABLE 7-continued

Example 3

| Sn | R | D | Nd | vd |
|---|---|---|---|---|
| *16 | −145.7703 | 2.6260 | | |
| 17 | 42.6124 | 2.5526 | 1.48999 | 83.93 |
| 18 | −357.4670 | 0.2323 | | |
| 19 | 33.4495 | 0.8537 | 1.72974 | 36.99 |
| 20 | 21.3700 | 0.1002 | | |
| 21 | 21.3700 | 6.9548 | 1.49001 | 59.70 |
| 22 | −24.5126 | 0.1000 | | |
| 23 | −28.9882 | 0.8581 | 1.73962 | 54.52 |
| 24 | 92.5909 | DD[24] | | |
| 25 | 74.8207 | 4.9864 | 1.43875 | 94.66 |
| 26 | −21.4817 | 0.8488 | 1.89217 | 32.36 |
| 27 | −91.2085 | 2.0449 | | |
| *28 | −41.7574 | 1.1892 | 1.88356 | 38.38 |
| *29 | −34.5054 | 0.1000 | | |
| *30 | 117.7191 | 7.4485 | 1.49001 | 56.87 |
| *31(A) | −19.8258 | 0.9900 | | |
| 32 | 143.3168 | 2.9565 | 1.95733 | 30.87 |
| 33 | −61.9237 | 0.8457 | 1.74704 | 43.40 |
| 34 | 39.9659 | DD[34] | | |
| 35 | −19.3181 | 1.5002 | 1.57417 | 71.26 |
| 36 | −56.9740 | | | |

TABLE 8

Example 3

| | WIDE | MIDDLE | TELE |
|---|---|---|---|
| Zr | 1.0 | 2.6 | 6.7 |
| f | 26.11 | 67.99 | 176.12 |
| BF | 20.2616 | 44.6536 | 54.8744 |
| FNo. | 3.5 | 5.01 | 5.81 |
| 2ω(°) | 84.8 | 34.2 | 13.4 |
| DD[5] | 0.9883 | 22.3838 | 54.7510 |
| DD[13] | 24.0519 | 9.7002 | 1.4824 |
| DD[24] | 9.2299 | 3.0117 | 0.9801 |
| DD[34] | 13.6551 | 16.9137 | 19.3537 |

TABLE 9

Example 3

| Sn | 6 | 7 | 15 | 16 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.7520703E−06 | −6.6555103E−06 | −1.4351117E−05 | −1.0642509E−05 |
| A5 | 0.0000000E+00 | 0.0000000E+00 | 0.0000000E+00 | 0.0000000E+00 |
| A6 | 5.0719388E−08 | 7.0202052E−09 | −9.6200249E−08 | −8.7417248E−08 |
| A7 | 0.0000000E+00 | 0.0000000E+00 | 0.0000000E+00 | 0.0000000E+00 |
| A8 | −2.2246578E−10 | 1.0626091E−09 | −1.6772998E−09 | −1.4745334E−09 |
| A9 | 0.0000000E+00 | 0.0000000E+00 | 0.0000000E+00 | 0.0000000E+00 |
| A10 | 1.2475921E−13 | −1.8567018E−11 | 1.9661601E−12 | 2.7011696E−12 |
| A11 | 0.0000000E+00 | 0.0000000E+00 | 0.0000000E+00 | 0.0000000E+00 |
| A12 | 2.5922454E−15 | 1.4963842E−13 | 5.5997309E−14 | −2.4022057E−14 |
| A13 | 0.0000000E+00 | 0.0000000E+00 | 0.0000000E+00 | 0.0000000E+00 |
| A14 | −9.5905620E−18 | −6.2890987E−16 | −1.6920000E−15 | −4.4423933E−16 |
| A15 | 0.0000000E+00 | 0.0000000E+00 | 0.0000000E+00 | 0.0000000E+00 |
| A16 | 1.1099154E−20 | 1.0605909E−18 | 8.8397107E−18 | 2.9172231E−18 |

TABLE 9-continued

Example 3

| Sn | 30 | 31 |
|---|---|---|
| KA | 1.0000000E+00 | 1.0000000E+00 |
| A3 | 0.0000000E+00 | 0.0000000E+00 |
| A4 | 7.1510381E−06 | −5.3385345E−06 |
| A5 | 0.0000000E+00 | 0.0000000E+00 |
| A6 | 6.0440286E−09 | −8.7836339E−09 |
| A7 | 0.0000000E+00 | 0.0000000E+00 |
| A8 | 1.0472543E−10 | 2.0721547E−10 |
| A9 | 0.0000000E+00 | 0.0000000E+00 |
| A10 | 4.3006004E−13 | −3.9425982E−13 |
| A11 | 0.0000000E+00 | 0.0000000E+00 |
| A12 | −3.4899393E−15 | 5.3052749E−15 |
| A13 | 0.0000000E+00 | 0.0000000E+00 |
| A14 | 2.0601858E−18 | −5.4434840E−19 |
| A15 | 0.0000000E+00 | 0.0000000E+00 |
| A16 | 3.0437374E−20 | 1.9122186E−20 |

Figure 10:
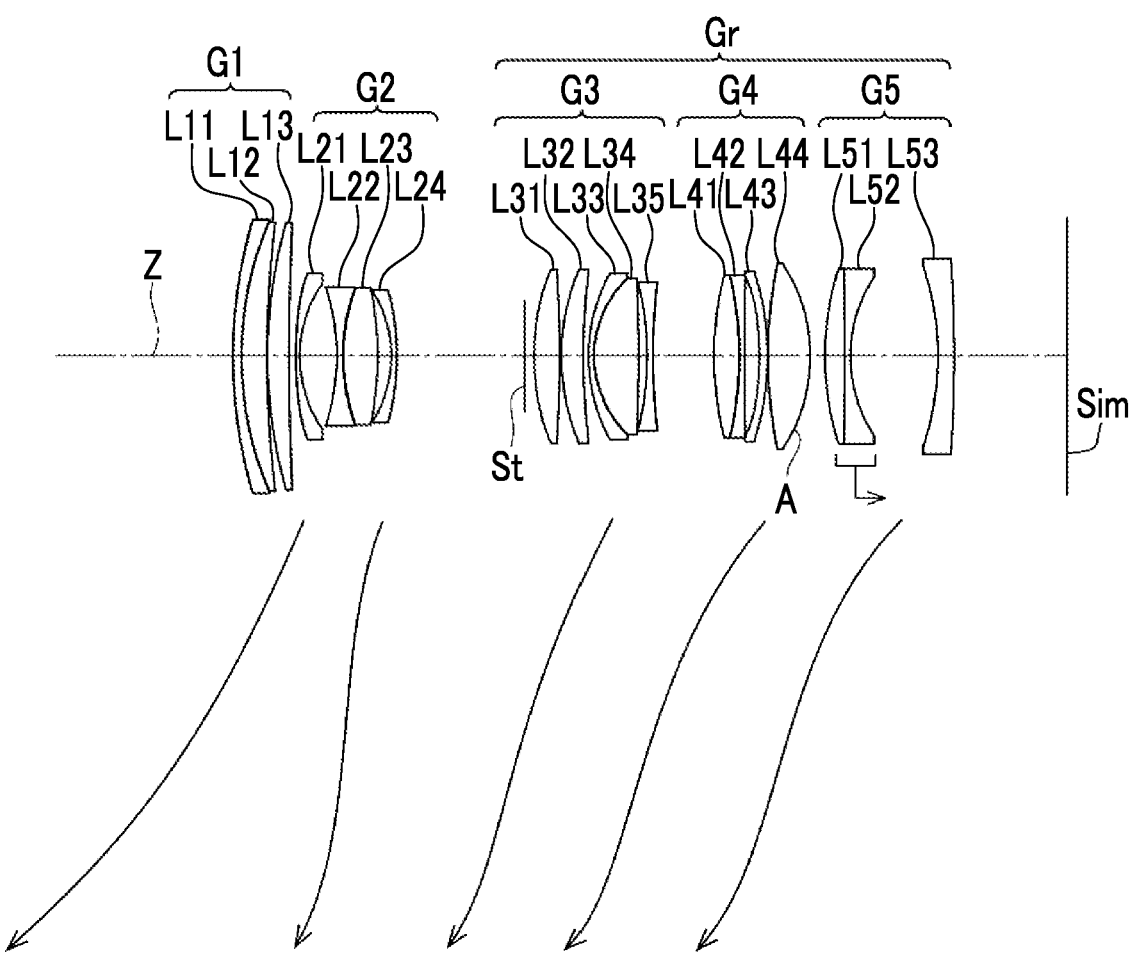
FIG. 10 is a diagram showing a cross-sectional configuration and movement loci of the zoom lens of Example 4.

FIG. 10 is a diagram showing a cross-sectional view of the configuration and movement loci of the zoom lens of Example 4 at the wide angle end in a state where the infinite distance object is in focus. The zoom lens of Example 4 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power, a fourth lens group G4 that has a positive refractive power, and a fifth lens group G5 that has a negative refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of four lenses L41 to L44, in order from the object side to the image side. The fifth lens group G5 consists of three lenses L51 to L53, in order from the object side to the image side. The focus group consists of two lenses L51 and L52.

Figure 11:
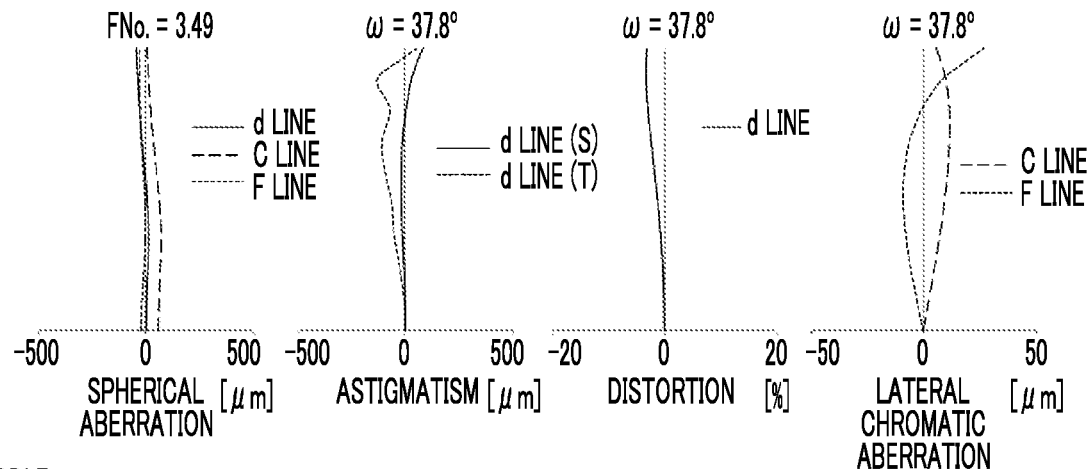
FIG. 11 is a diagram showing aberrations of the zoom lens of Example 4.
Figure 11:
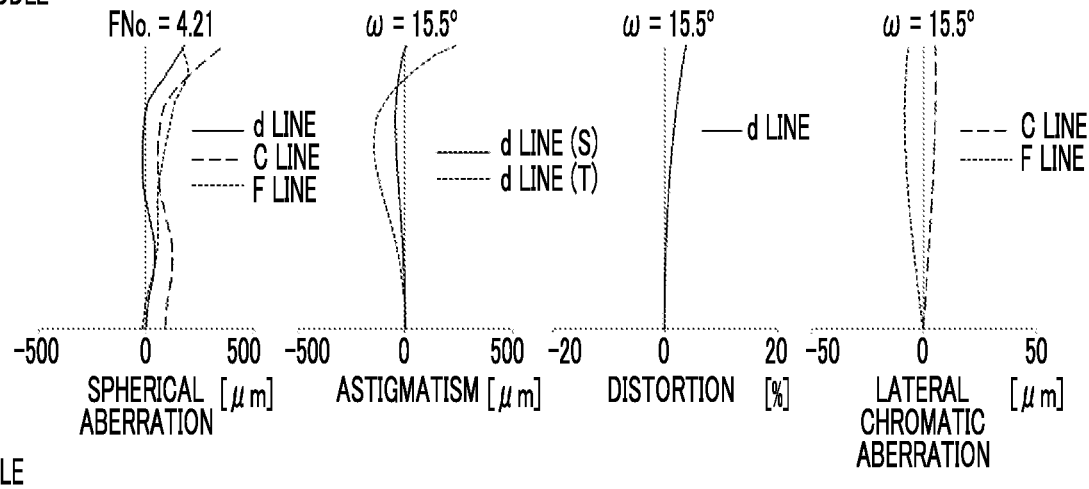
Figure 11:
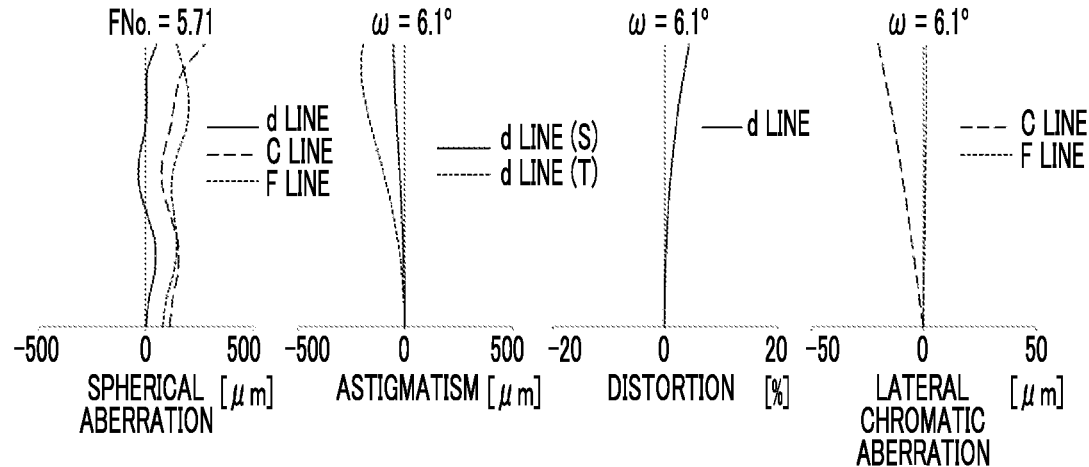

Regarding the zoom lens of Example 4, Table 10 shows basic lens data, Table 11 shows specifications and variable surface spacings, and Table 12 shows aspherical coefficients thereof. FIG. 11 shows aberration diagrams.

TABLE 10

Example 4

| Sn | R | D | Nd | vd |
|---|---|---|---|---|
| 1 | 76.8011 | 1.3135 | 1.85478 | 24.80 |
| 2 | 54.0634 | 3.9199 | 1.49700 | 81.54 |
| 3 | 173.9810 | 0.1000 | | |
| 4 | 78.4547 | 3.3337 | 1.67599 | 56.51 |
| 5 | 512.2216 | DD[5] | | |
| *6 | 66.7802 | 0.6249 | 1.95375 | 32.32 |
| *7 | 21.3969 | 5.6912 | | |
| 8 | −34.8672 | 0.9109 | 1.74790 | 55.69 |
| 9 | 31.5092 | 0.0999 | | |
| 10 | 31.0062 | 5.2412 | 1.84666 | 23.78 |
| 11 | −53.1642 | 2.1059 | | |

TABLE 10-continued

Example 4

| Sn | R | D | Nd | vd |
|---|---|---|---|---|
| 12 | −19.2919 | 0.8701 | 1.69691 | 59.22 |
| 13 | −39.3029 | DD[13] | | |
| 14(St) | ∞ | 1.5002 | | |
| *15 | 40.0266 | 3.9563 | 1.61239 | 64.39 |
| *16 | −139.8115 | 0.2480 | | |
| 17 | 35.7093 | 3.2235 | 1.49700 | 81.54 |
| 18 | 117.6130 | 0.7828 | | |
| 19 | 27.2537 | 0.8344 | 1.89214 | 40.57 |
| 20 | 16.8772 | 6.8805 | 1.49700 | 81.54 |
| 21 | −259.8917 | 1.3002 | | |
| 22 | −47.5312 | 0.8474 | 1.74492 | 56.01 |
| 23 | 92.4817 | DD[23] | | |
| 24 | 51.9548 | 3.8604 | 1.49700 | 81.54 |
| 25 | −55.4556 | 0.8433 | 1.93840 | 19.79 |
| 26 | 906.5318 | 2.2491 | | |
| *27 | −69.1040 | 1.2628 | 1.84258 | 40.37 |

TABLE 10-continued

Example 4

| Sn | R | D | Nd | vd |
|---|---|---|---|---|
| *28 | −50.3927 | 0.1002 | | |
| *29 | 74.1626 | 6.4522 | 1.66308 | 53.29 |
| *30(A) | −28.0967 | DD[30] | | |
| 31 | 45.3043 | 3.0828 | 1.91478 | 19.26 |
| 32 | −632.4399 | 0.8369 | 1.94097 | 35.45 |
| 33 | 22.9727 | 13.4509 | | |
| 34 | −44.4821 | 2.5002 | 1.70937 | 58.60 |
| 35 | −220.7101 | | | |

TABLE 11

Example 4

| | WIDE | MIDDLE | TELE |
|---|---|---|---|
| Zr | 1.0 | 2.6 | 6.7 |
| f | 28.81 | 75.03 | 194.36 |
| BF | 17.3401 | 46.4248 | 65.0606 |
| FNo. | 3.49 | 4.21 | 5.71 |
| 2ω(°) | 75.6 | 31.0 | 12.2 |
| DD[5] | 0.9961 | 18.1647 | 54.2307 |
| DD[13] | 19.5855 | 6.7824 | 1.6671 |
| DD[23] | 9.4304 | 2.3350 | 0.9915 |
| DD[30] | 2.2849 | 3.2393 | 0.9975 |

TABLE 12

Example 4

| Sn | 6 | 7 | 15 | 16 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 9.2029669E−06 | 4.8473432E−06 | 5.5131401E−06 | 6.5202376E−06 |
| A5 | 0.0000000E+00 | 0.0000000E+00 | 0.0000000E+00 | 0.0000000E+00 |
| A6 | 9.7282928E−08 | 9.0764089E−08 | 2.0768593E−08 | −1.3672107E−09 |
| A7 | 0.0000000E+00 | 0.0000000E+00 | 0.0000000E+00 | 0.0000000E+00 |
| A8 | −1.2940229E−09 | 6.1781382E−10 | −3.1110859E−10 | 1.8313518E−10 |
| A9 | 0.0000000E+00 | 0.0000000E+00 | 0.0000000E+00 | 0.0000000E+00 |
| A10 | 1.3634021E−11 | −3.9966969E−11 | 1.3619354E−12 | −4.9102808E−12 |
| A11 | 0.0000000E+00 | 0.0000000E+00 | 0.0000000E+00 | 0.0000000E+00 |
| A12 | −6.9599360E−14 | 7.1964354E−13 | 3.6679622E−15 | 4.8113603E−14 |
| A13 | 0.0000000E+00 | 0.0000000E+00 | 0.0000000E+00 | 0.0000000E+00 |
| A14 | 1.3176501E−16 | −5.5017541E−15 | −5.0782568E−17 | −2.1652307E−16 |
| A15 | 0.0000000E+00 | 0.0000000E+00 | 0.0000000E+00 | 0.0000000E+00 |
| A16 | 9.5440166E−20 | 1.5831148E−17 | 1.5354112E−19 | 4.1016274E−19 |

| Sn | 27 | 28 | 29 | 30 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.5818320E−05 | −2.3551824E−05 | 4.3504970E−06 | −6.3973755E−06 |
| A5 | 0.0000000E+00 | 0.0000000E+00 | 0.0000000E+00 | 0.0000000E+00 |
| A6 | 9.0022274E−08 | 8.7742289E−08 | −3.4779428E−08 | −8.1191081E−09 |
| A7 | 0.0000000E+00 | 0.0000000E+00 | 0.0000000E+00 | 0.0000000E+00 |
| A8 | −9.1436181E−10 | −7.5067163E−10 | 3.2460015E−11 | 1.8673881E−10 |
| A9 | 0.0000000E+00 | 0.0000000E+00 | 0.0000000E+00 | 0.0000000E+00 |
| A10 | 1.2071908E−11 | 1.0179525E−11 | 2.5306137E−13 | −1.0958144E−12 |
| A11 | 0.0000000E+00 | 0.0000000E+00 | 0.0000000E+00 | 0.0000000E+00 |
| A12 | −3.9955451E−14 | −3.2395123E−14 | −1.5025806E−15 | 2.2170398E−15 |
| A13 | 0.0000000E+00 | 0.0000000E+00 | 0.0000000E+00 | 0.0000000E+00 |
| A14 | 0.0000000E+00 | 0.0000000E+00 | 9.5339743E−18 | 2.9230242E−19 |
| A15 | 0.0000000E+00 | 0.0000000E+00 | 0.0000000E+00 | 0.0000000E+00 |
| A16 | 0.0000000E+00 | 0.0000000E+00 | −1.6280576E−20 | 1.1684252E−20 |

Example 5

Figure 12:
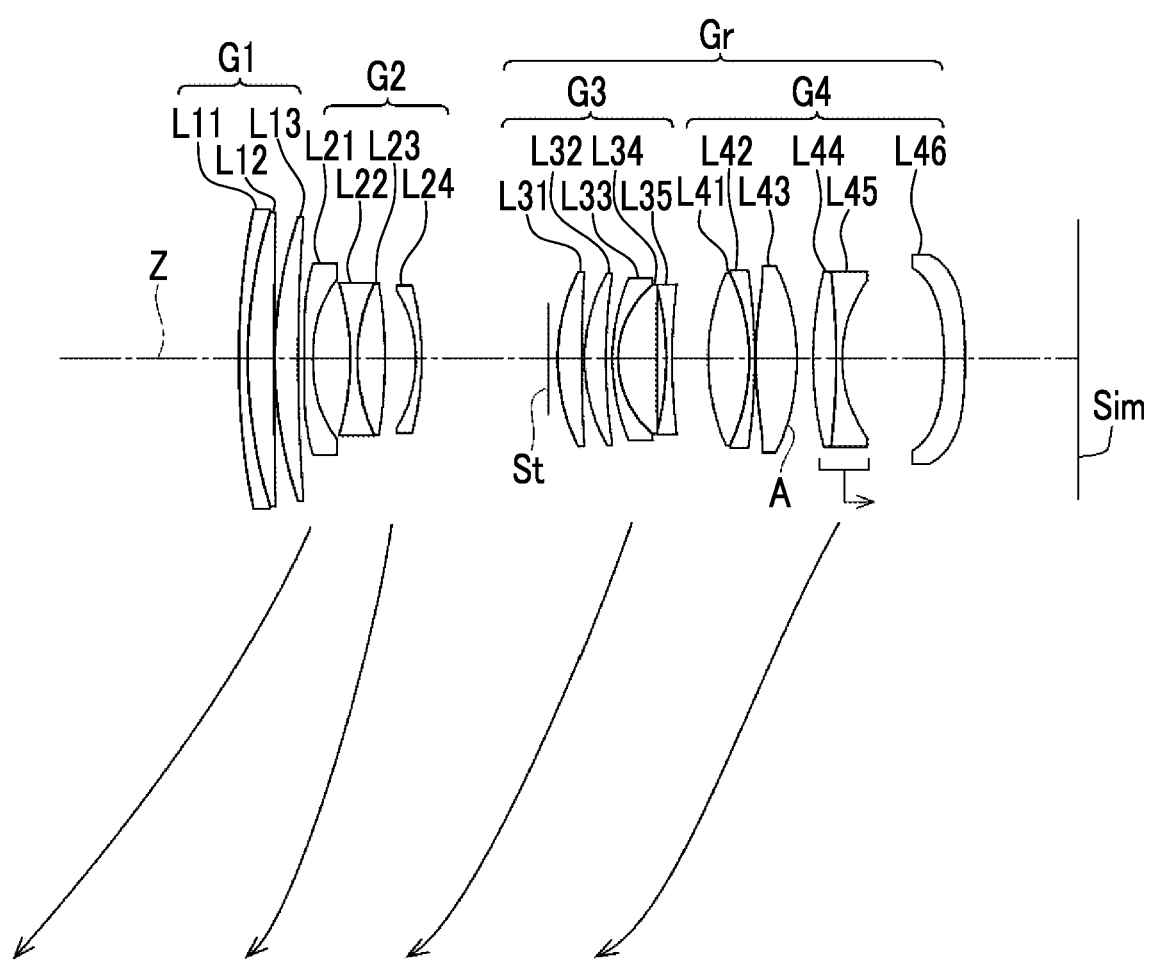
FIG. 12 is a diagram showing a cross-sectional configuration and movement loci of the zoom lens of Example 5.

FIG. 12 is a diagram showing a cross-sectional view of the configuration and movement loci of the zoom lens of Example 5 at the wide angle end in a state where the infinite distance object is in focus. The zoom lens of Example 5 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power and a fourth lens group G4 that has a positive refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of six lenses L41 to L46 in order from the object side to the image side. The focus group consists of two lenses L44 and L45.

Figure 13:
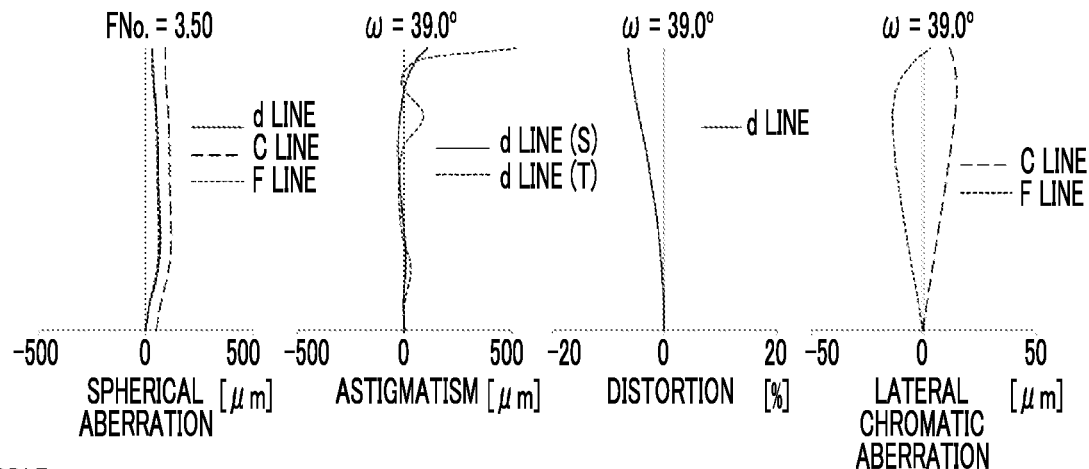
FIG. 13 is a diagram showing aberrations of the zoom lens of Example 5.
Figure 13:
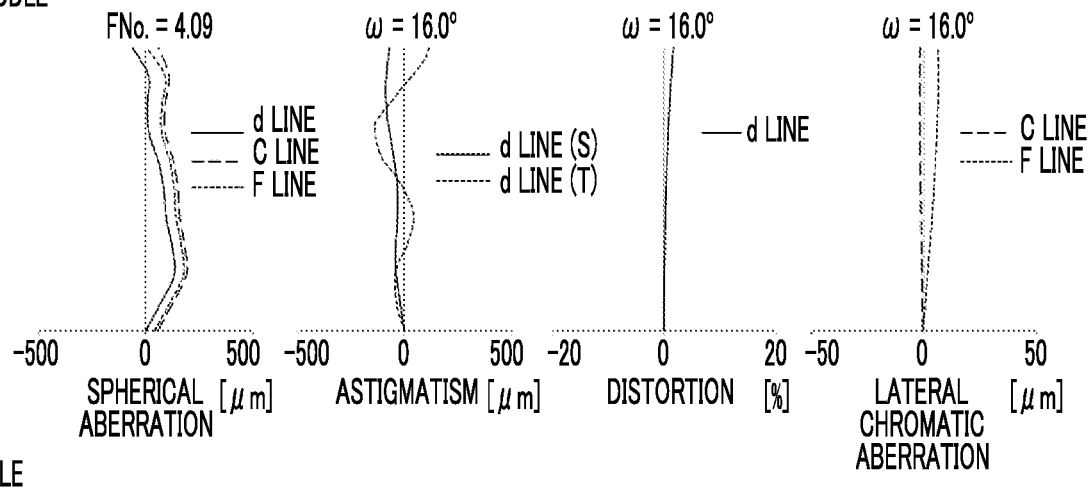
Figure 13:
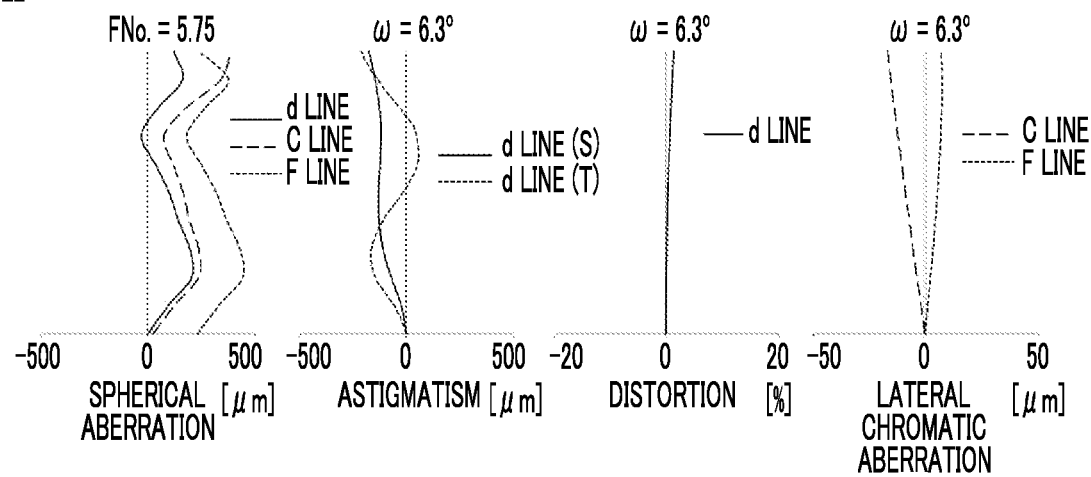

Regarding the zoom lens of Example 5, Table 13 shows basic lens data, Table 14 shows specifications and variable surface spacings, and Table 15 shows aspherical coefficients thereof. FIG. 13 shows aberration diagrams.

TABLE 13

Example 5

| Sn | R | D | Nd | υd |
|---|---|---|---|---|
| 1 | 120.8544 | 1.4084 | 1.84666 | 23.78 |
| 2 | 78.7720 | 4.0098 | 1.52841 | 76.45 |
| 3 | 1178.9254 | 0.0999 | | |
| 4 | 69.8826 | 3.5357 | 1.52841 | 76.45 |
| 5 | 274.9872 | DD[5] | | |
| *6 | −79.1876 | 1.3146 | 1.85400 | 40.38 |
| *7 | 44.8021 | 5.6689 | | |
| 8 | −41.0337 | 1.0886 | 1.66304 | 60.84 |
| 9 | 27.8964 | 4.2081 | 1.84666 | 23.78 |
| 10 | −73.6110 | 4.7367 | | |
| 11 | −20.8709 | 0.8672 | 1.76352 | 54.06 |
| 12 | −44.9746 | DD[12] | | |
| 13(St) | ∞ | 1.5001 | | |
| *14 | 31.3766 | 3.5544 | 1.77533 | 33.14 |
| *15 | 439.3222 | 0.4180 | | |
| 16 | 27.7954 | 3.2273 | 1.55032 | 75.50 |
| 17 | 85.6611 | 1.0081 | | |

TABLE 13-continued

Example 5

| Sn | R | D | Nd | υd |
|---|---|---|---|---|
| 18 | 32.7718 | 0.8482 | 1.97387 | 26.95 |
| 19 | 15.2287 | 5.9718 | 1.48999 | 57.95 |
| 20 | 4836.1549 | 1.4183 | | |
| 21 | −43.3262 | 0.8631 | 1.83806 | 23.79 |
| 22 | 91.5792 | DD[22] | | |
| 23 | 33.9611 | 6.2775 | 1.49700 | 81.54 |
| 24 | −31.5544 | 0.8444 | 1.96003 | 33.45 |
| 25 | −94.7461 | 0.0998 | | |
| *26 | 51.2884 | 6.3571 | 1.78124 | 36.32 |
| *27(A) | −33.1512 | 2.4529 | | |
| 28 | 58.2270 | 3.5591 | 1.97735 | 21.70 |
| 29 | −108.9392 | 0.8509 | 1.91163 | 38.53 |
| 30 | 20.9832 | 15.6002 | | |
| *31 | −49.8976 | 3.1649 | 1.51001 | 63.47 |
| *32 | −131.3096 | | | |

TABLE 14

Example 5

| | WIDE | MIDDLE | TELE |
|---|---|---|---|
| Zr | 1.0 | 2.6 | 6.7 |
| f | 28.53 | 74.30 | 192.46 |
| BF | 17.3235 | 43.3374 | 73.2919 |
| FNo. | 3.5 | 4.09 | 5.75 |
| 2ω(°) | 78 | 32.0 | 12.6 |
| DD[5] | 0.9940 | 26.9753 | 54.4024 |
| DD[12] | 19.2782 | 8.4771 | 1.4872 |
| DD[22] | 5.5083 | 2.2657 | 0.9998 |

TABLE 15

Example 5

| Sn | 6 | 7 | 14 | 15 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.4589350E−04 | 2.4350307E−04 | 5.5712322E−07 | 6.4337565E−06 |
| A5 | −2.4513510E−06 | 3.6544495E−06 | 8.0335468E−08 | −1.0842651E−06 |
| A6 | −3.6922105E−06 | −5.3938036E−06 | 1.9158322E−07 | 3.3059380E−07 |
| A7 | 4.3236972E−08 | 3.9191979E−07 | −2.7010346E−08 | −6.4517780E−08 |
| A8 | 6.2460880E−08 | 1.1357783E−08 | −2.7244082E−09 | 3.2875282E−08 |
| A9 | −5.7534252E−09 | −7.8583864E−10 | 4.7842471E−10 | −1.3371233E−08 |
| A10 | 1.8460870E−10 | −2.0813309E−10 | 4.8790774E−11 | 2.9755526E−09 |
| A11 | −2.3491868E−11 | 2.0778393E−11 | −9.2415441E−12 | −3.9657778E−10 |
| A12 | 3.5232180E−12 | −4.7261390E−13 | 3.2659693E−14 | 3.3764626E−11 |
| A13 | −1.5499269E−13 | −1.7869498E−13 | 4.4929083E−14 | −1.8857632E−12 |
| A14 | −3.7225619E−15 | 3.3580100E−14 | −8.2525714E−16 | 6.8494956E−14 |
| A15 | 4.5742890E−16 | −2.3269081E−15 | −1.2331717E−16 | −1.5123928E−15 |
| A16 | −9.5025188E−18 | 5.7012314E−17 | 4.4807943E−18 | 1.5886399E−17 |

| Sn | 26 | 27 | 31 | 32 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.9490732E−05 | 8.8404673E−06 | −3.6889097E−05 | −4.5124313E−05 |
| A5 | −3.5575686E−07 | −1.0526549E−06 | −6.0497515E−06 | −3.7222445E−06 |
| A6 | 2.9061581E−07 | 1.9036179E−07 | 1.1463129E−06 | 8.5350455E−07 |
| A7 | −5.3572390E−08 | −9.7785111E−09 | −7.6210504E−08 | −5.2729281E−08 |
| A8 | 3.3482667E−09 | −1.0469664E−09 | −3.0371168E−09 | −5.5039115E−09 |
| A9 | −1.6486957E−11 | 1.0152556E−11 | 9.5225976E−10 | 8.1518507E−10 |
| A10 | 2.8507031E−11 | 1.9256934E−11 | −1.6723948E−10 | −1.0106683E−11 |
| A11 | −7.7225782E−12 | −1.3094559E−12 | 1.4828393E−11 | −2.3121063E−12 |
| A12 | 5.6556435E−13 | −1.7416538E−14 | 1.1936109E−12 | 7.3614270E−14 |
| A13 | 9.3127657E−15 | 3.7829161E−15 | −3.3874214E−13 | −6.3349472E−15 |
| A14 | −3.6596332E−15 | −2.0679251E−16 | 2.4596591E−14 | 1.0356282E−15 |
| A15 | 2.0422965E−16 | 1.5366434E−17 | −6.9688623E−16 | −4.9353887E−17 |
| A16 | −3.9317101E−18 | −5.2727592E−19 | 5.0456996E−18 | 6.6359189E−19 |

Figure 14:
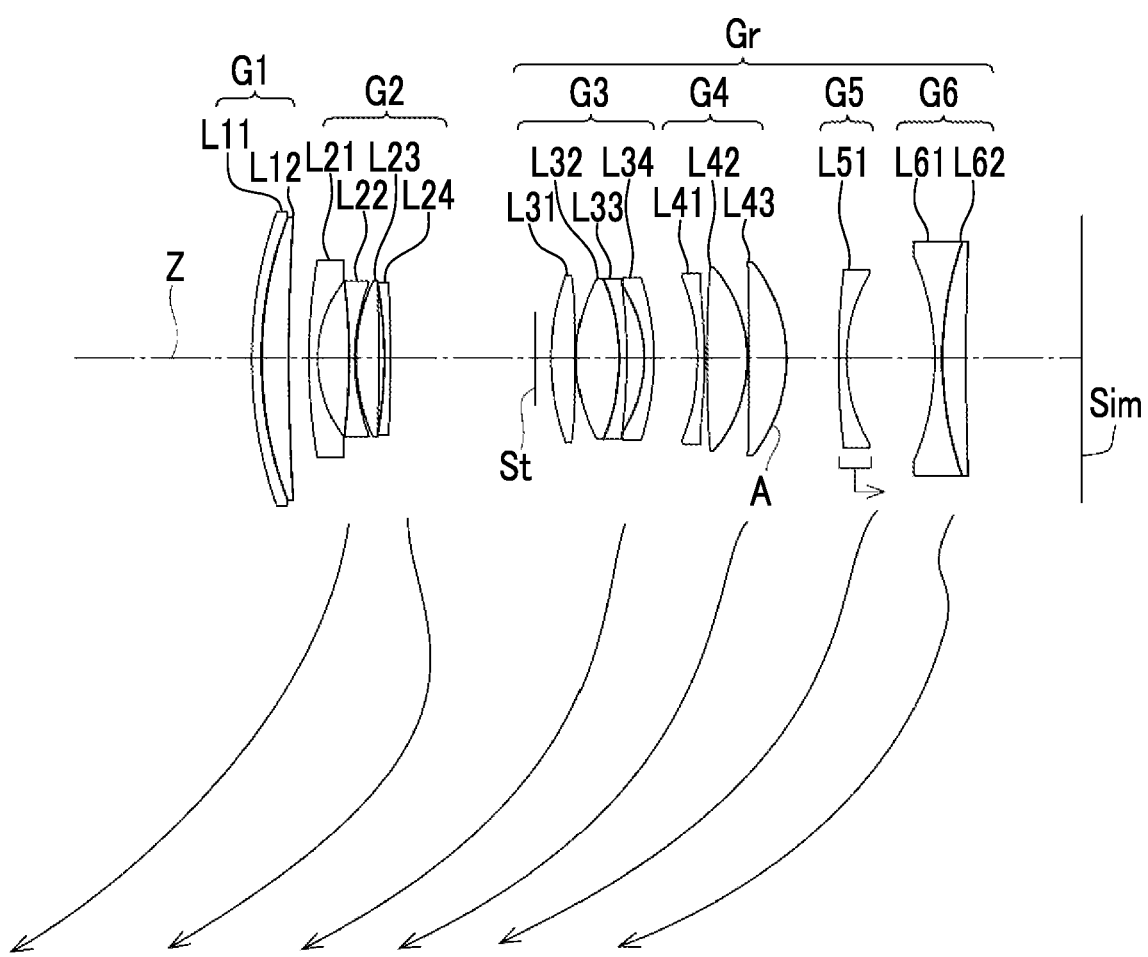
FIG. 14 is a diagram showing a cross-sectional configuration and movement loci of the zoom lens of Example 6.

FIG. 14 is a diagram showing a cross-sectional view of the configuration and movement loci of the zoom lens of Example 6 at the wide angle end in a state where the infinite distance object is in focus. The zoom lens of Example 6 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power, a fourth lens group G4 that has a positive refractive power, a fifth lens group G5 that has a negative refractive power, and a sixth lens group G6 that has a negative refractive power, in order from the object side to the image side.

The first lens group G1 consists of two lenses L11 and L12, in order from the object side to the image side. The second lens group G2 consists of four lenses L21 to L24, in order from the object side to the image side. The third lens group G3 consists of the aperture stop St and four lenses L31 to L34, in order from the object side to the image side. The fourth lens group G4 consists of three lenses L41 to L43, in order from the object side to the image side. The fifth lens group G5 consists of one lens L51. The sixth lens group G6 consists of two lenses L61 and L62, in order from the object side to the image side. The focus group consists of one lens L51.

Figure 15:
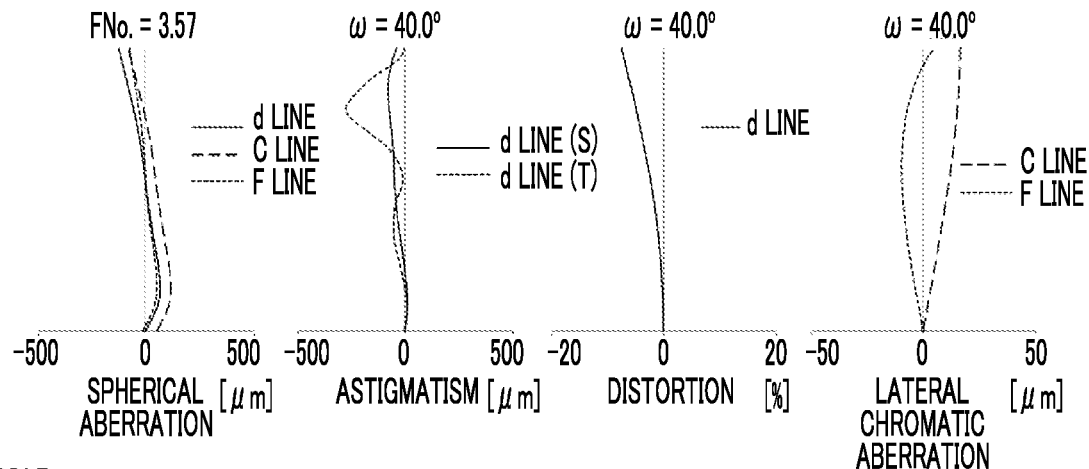
FIG. 15 is a diagram showing aberrations of the zoom lens of Example 6.
Figure 15:
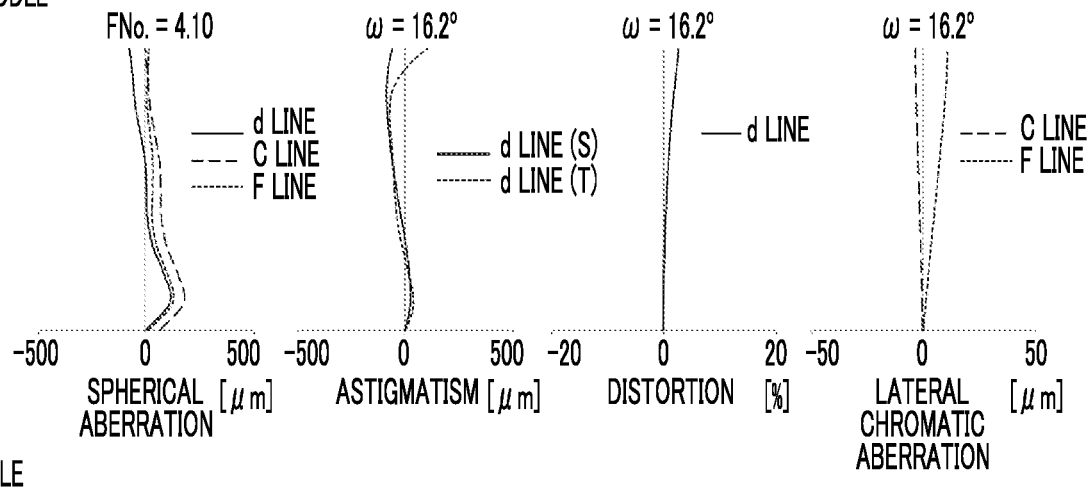
Figure 15:
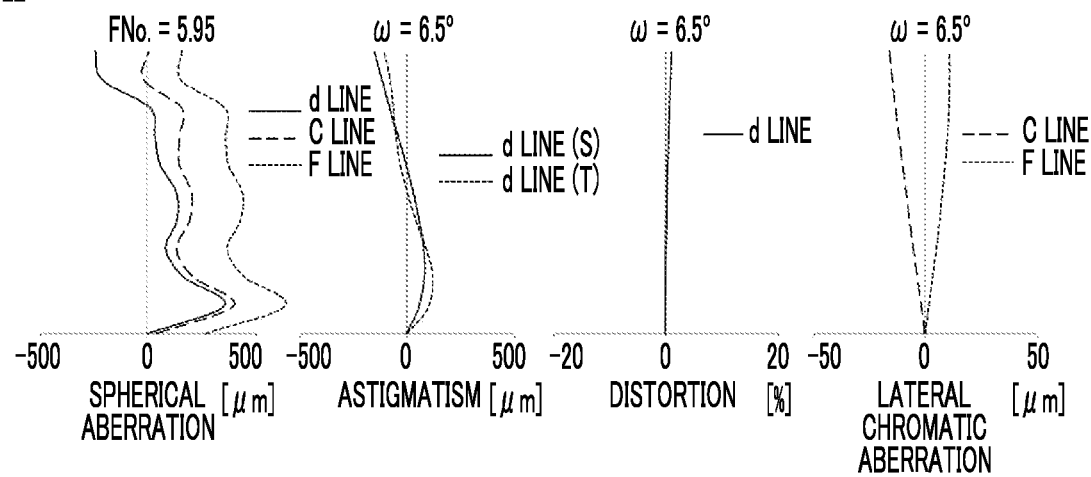

Regarding the zoom lens of Example 6, Table 16 shows basic lens data, Table 17 shows specifications and variable surface spacings, and Table 18 shows aspherical coefficients thereof. FIG. 15 shows aberration diagrams.

TABLE 16

Example 6

| Sn | R | D | Nd | νd |
|---|---|---|---|---|
| 1 | 68.9522 | 1.3711 | 2.10420 | 17.02 |
| 2 | 59.8272 | 0.1625 | | |
| 3 | 62.1092 | 3.9515 | 1.74309 | 56.20 |
| 4 | 323.0079 | DD[4] | | |
| *5 | 110.3686 | 1.3102 | 1.72916 | 54.68 |
| *6 | 20.6634 | 4.6707 | | |
| 7 | −94.9541 | 0.8647 | 1.75799 | 54.64 |

TABLE 16-continued

Example 6

| Sn | R | D | Nd | νd |
|---|---|---|---|---|
| 8 | 33.2125 | 0.1498 | | |
| 9 | 28.5682 | 3.3818 | 1.80809 | 22.76 |
| 10 | −618.9637 | 0.8510 | | |
| 11 | −65.2670 | 0.8706 | 1.89425 | 38.05 |
| 12 | −230.3568 | DD[12] | | |
| 13(St) | ∞ | 2.3641 | | |
| *14 | 43.4819 | 3.5359 | 1.70343 | 38.81 |
| *15 | −284.5752 | 0.0998 | | |
| 16 | 26.0556 | 6.3024 | 1.43875 | 94.66 |
| 17 | −32.7600 | 1.1180 | 1.95375 | 32.32 |
| 18 | −92.8030 | 2.5928 | | |
| 19 | −20.4593 | 1.4531 | 2.00100 | 29.14 |
| 20 | −40.2354 | DD[20] | | |
| *21 | −40.3994 | 1.1009 | 1.83481 | 42.74 |
| *22 | −57.5298 | 0.3345 | | |
| 23 | 216.1291 | 6.0259 | 1.49700 | 81.54 |
| 24 | −21.6837 | 0.1999 | | |
| 25 | −569.5860 | 5.6054 | 1.59522 | 67.73 |
| 26(A) | −23.5710 | DD[26] | | |
| *27 | 199.4222 | 1.2238 | 1.76450 | 49.10 |
| *28 | 28.5358 | DD[28] | | |
| 29 | −39.4070 | 1.0968 | 1.49700 | 81.54 |
| 30 | 53.4970 | 3.5469 | 2.00330 | 28.27 |
| 31 | 548.7050 | | | |

TABLE 17

Example 6

| | WIDE | MIDDLE | TELE |
|---|---|---|---|
| Zr | 1.0 | 2.6 | 6.7 |
| f | 27.83 | 72.48 | 187.76 |
| BF | 17.2042 | 27.5828 | 94.0172 |
| FNo. | 3.57 | 4.10 | 5.95 |
| 2ω(°) | 80 | 32.4 | 13.0 |
| DD[4] | 2.9998 | 32.6307 | 54.4028 |
| DD[12] | 21.5726 | 4.4738 | 2.2954 |
| DD[20] | 6.4399 | 2.1094 | 1.1094 |
| DD[26] | 7.7323 | 7.6408 | 0.9780 |
| DD[28] | 13.0818 | 22.4570 | 23.1482 |

TABLE 18

Example 6

| Sn | 5 | 6 | 14 | 15 |
|---|---|---|---|---|
| KA | 1.0000000E+00 | 1.0000000E+00 | 1.0000000E+00 | 1.0000000E+00 |
| A3 | 0.0000000E+00 | −6.4249018E−21 | −7.1967845E−06 | 9.6162431E−06 |
| A4 | 2.1026947E−05 | 2.0761744E−05 | 1.4468207E−05 | −5.9867173E−06 |
| A5 | −1.4114432E−07 | 1.9562647E−06 | −1.6269960E−07 | 6.5258772E−07 |
| A6 | −9.8386607E−08 | −3.1931032E−07 | −3.2381520E−08 | 8.5121697E−08 |
| A7 | −9.1672421E−09 | −2.8613068E−08 | 5.1702675E−09 | −3.6300337E−08 |
| A8 | −7.4307947E−10 | 4.0916326E−09 | 8.5867673E−10 | 8.8186207E−10 |
| A9 | 2.3238618E−10 | 3.3331082E−10 | −4.1726342E−11 | 5.7160245E−10 |
| A10 | 7.5349156E−12 | −4.8526734E−11 | −1.4395286E−11 | −3.8720225E−11 |
| A11 | −2.0599610E−12 | −2.2413528E−12 | 4.1436200E−13 | −3.8268722E−12 |
| A12 | −1.3021207E−15 | 3.7479941E−13 | 7.8834817E−14 | 3.1568904E−13 |
| A13 | 8.0142807E−15 | 7.7466528E−15 | −2.0379720E−15 | 1.1723515E−14 |
| A14 | −1.4372652E−16 | −1.4402879E−15 | −2.0655696E−16 | −1.0980583E−15 |
| A15 | −1.1580371E−17 | −1.0837261E−17 | 2.8321841E−18 | −1.3835591E−17 |
| A16 | 3.4113539E−19 | 2.0765419E−18 | 2.0102878E−19 | 1.4275833E−18 |

| Sn | 21 | 22 | 27 | 28 |
|---|---|---|---|---|
| KA | 1.0000000E+00 | 1.0000000E+00 | 1.0000000E+00 | 1.0000000E+00 |
| A3 | −2.9217084E−05 | −2.2340815E−05 | 1.0842022E−20 | 3.2526065E−20 |
| A4 | −1.5126058E−05 | 2.7221651E−05 | 3.4176984E−05 | 3.4632508E−05 |
| A5 | −1.0430132E−06 | −7.4493367E−07 | −8.7119831E−07 | −4.8914551E−07 |
| A6 | 1.0550829E−07 | 2.2261181E−07 | −2.8331271E−07 | −3.2177171E−07 |

TABLE 18-continued

| | | | | |
|---|---|---|---|---|
| A7 | 1.8182278E−08 | 2.5842665E−09 | 8.8305298E−09 | 7.0884935E−09 |
| A8 | −1.8393033E−09 | −1.5658859E−09 | 1.5975322E−09 | 1.8717949E−09 |
| A9 | −1.1816726E−10 | −3.0537621E−12 | −2.4218835E−11 | −1.1489588E−11 |
| A10 | 1.1156753E−11 | 5.7152018E−12 | −7.6106217E−12 | −8.7400382E−12 |
| A11 | 2.7832804E−13 | −6.0948003E−15 | −2.9586987E−14 | −6.1158631E−14 |
| A12 | −2.0790051E−14 | −8.4689739E−15 | 2.8523108E−14 | 2.8232902E−14 |
| A13 | | | 2.4154602E−16 | 2.9693494E−16 |
| A14 | | | −6.0791539E−17 | −4.6591881E−17 |
| A15 | | | −3.0121437E−19 | −3.5582887E−19 |
| A16 | | | 5.0894324E−20 | 2.7835806E−20 |

Figure 16:
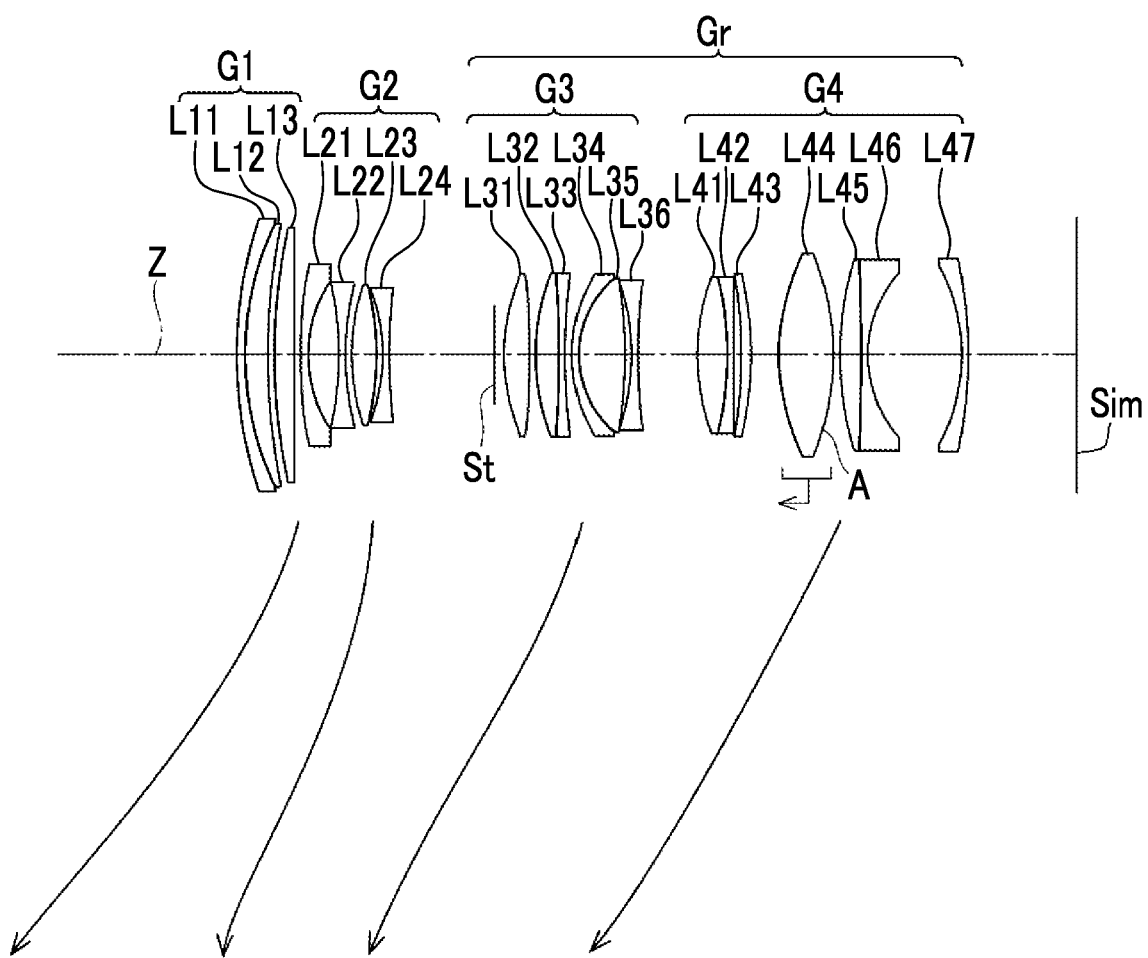
FIG. 16 is a diagram showing a cross-sectional configuration and movement loci of the zoom lens of Example 7.

FIG. 16 is a diagram showing a cross-sectional view of the configuration and movement loci of the zoom lens of Example 7 at the wide angle end in a state where the infinite distance object is in focus. The zoom lens of Example 7 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power and a fourth lens group G4 that has a positive refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and six lenses L31 to L36, in order from the object side to the image side. The fourth lens group G4 consists of seven lenses L41 to L47, in order from the object side to the image side. The focus group consists of one lens L44. Unlike Example 1, the focus group of Example 7 moves to the object side during focusing from the infinite distance object to the close range object.

Figure 17:
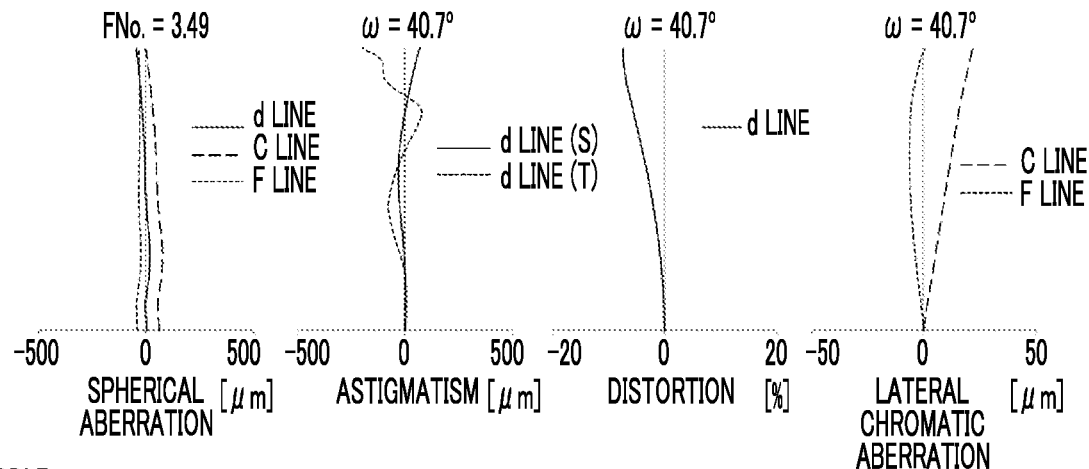
FIG. 17 is a diagram showing aberrations of the zoom lens of Example 7.
Figure 17:
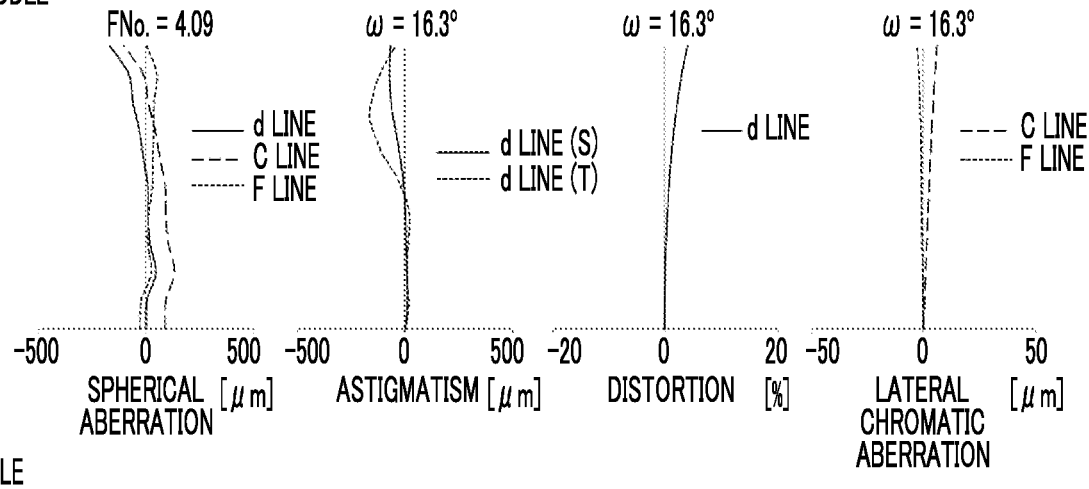
Figure 17:
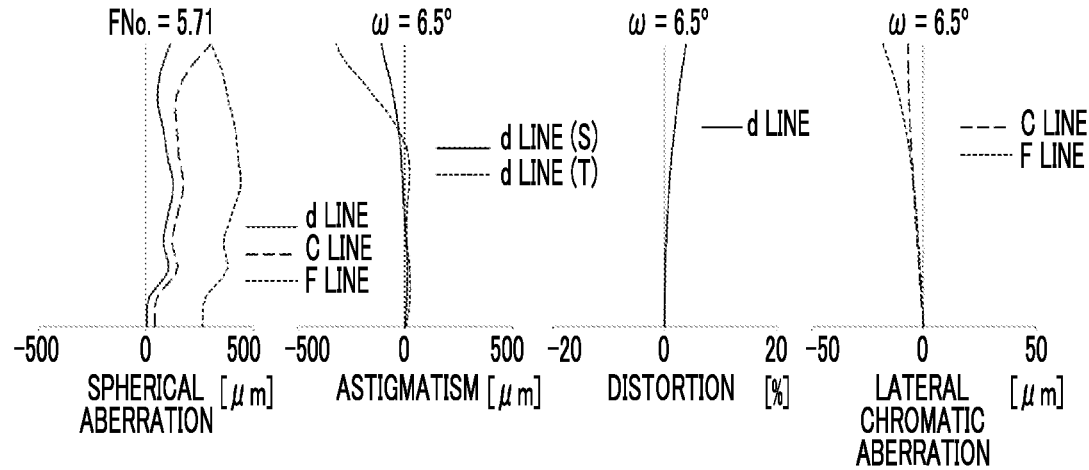

Regarding the zoom lens of Example 7, Table 19 shows basic lens data, Table 20 shows specifications and variable surface spacings, and Table 21 shows aspherical coefficients thereof. FIG. 17 shows aberration diagrams.

TABLE 19

Example 7

| Sn | R | D | Nd | νd |
|---|---|---|---|---|
| 1 | 68.3456 | 1.3162 | 2.00069 | 25.46 |
| 2 | 48.8445 | 3.5186 | 1.55032 | 75.50 |
| 3 | 106.8906 | 0.9998 | | |
| 4 | 94.5686 | 3.1070 | 1.75510 | 54.94 |
| 5 | 5632.8687 | DD[5] | | |
| *6 | 165.5878 | 1.1780 | 1.83481 | 42.74 |
| *7 | 24.3971 | 4.7370 | | |
| 8 | −51.1304 | 0.9998 | 1.78787 | 51.50 |
| 9 | 44.4537 | 1.0000 | | |
| 10 | 34.9852 | 3.8064 | 1.82115 | 24.06 |
| 11 | −45.3969 | 1.0002 | | |

TABLE 19-continued

Example 7

| Sn | R | D | Nd | νd |
|---|---|---|---|---|
| 12 | −28.4552 | 0.9998 | 1.72658 | 57.74 |
| 13 | 92.5386 | DD[13] | | |
| 14(St) | ∞ | 1.5001 | | |
| *15 | 31.5760 | 3.9074 | 1.56864 | 47.76 |
| *16 | −181.9429 | 0.9999 | | |
| 17 | 35.9428 | 3.5575 | 1.49700 | 81.61 |
| 18 | −223.6162 | 1.0001 | 2.00101 | 29.16 |
| 19 | 104.1650 | 1.0000 | | |
| 20 | 25.0132 | 0.9998 | 1.83282 | 46.79 |
| 21 | 16.0514 | 7.1517 | 1.48749 | 70.44 |
| 22 | −75.0865 | 1.0000 | | |
| 23 | −36.8829 | 1.0002 | 1.69210 | 59.45 |
| 24 | 92.5905 | DD[24] | | |
| 25 | 35.1963 | 4.6500 | 1.45860 | 90.19 |
| 26 | −52.2763 | 1.0002 | 1.99064 | 25.37 |
| 27 | 1034.9395 | 1.1261 | | |
| *28 | −109.2029 | 1.5763 | 1.81302 | 34.21 |
| *29 | −55.2880 | 4.2752 | | |
| *30 | 32.3701 | 8.5104 | 1.61953 | 64.09 |
| *31(A) | −39.0916 | 1.0001 | | |
| 32 | 52.9140 | 3.2925 | 1.95928 | 33.53 |
| 33 | −345.1503 | 1.0100 | 1.76154 | 54.26 |
| 34 | 19.7524 | 14.5739 | | |
| 35 | −30.0149 | 1.0002 | 1.73014 | 57.56 |
| 36 | −73.1071 | | | |

TABLE 20

Example 7

| | WIDE | MIDDLE | TELE |
|---|---|---|---|
| Zr | 1.0 | 2.6 | 6.7 |
| f | 27.22 | 70.88 | 183.61 |
| BF | 16.7938 | 45.0036 | 73.5282 |
| FNo. | 3.49 | 4.09 | 5.71 |
| 2ω(°) | 81.4 | 32.6 | 13.0 |
| DD[5] | 0.9998 | 24.5915 | 54.4017 |
| DD[13] | 16.3023 | 6.7787 | 1.5449 |
| DD[24] | 9.2205 | 3.8323 | 0.9888 |

TABLE 21

Example 7

| Sn | 6 | 7 | 15 | 16 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 5.1877887E−05 | 5.7032160E−05 | 1.7134069E−05 | 1.1896888E−06 |
| A5 | 6.5670426E−07 | −2.9287919E−07 | −2.5279610E−05 | 7.8055330E−07 |
| A6 | −9.9499668E−07 | −5.1575089E−07 | 1.6326617E−05 | −6.7261373E−08 |
| A7 | 6.5220992E−08 | −1.6622123E−08 | −5.6067274E−06 | −5.0009412E−08 |
| A8 | 7.1902265E−10 | 1.2720389E−09 | 1.1016895E−06 | 6.2986394E−09 |
| A9 | 4.7907508E−10 | 1.6707789E−09 | −1.1798063E−07 | 2.3514008E−09 |

TABLE 21-continued

| | | | | |
|---|---|---|---|---|
| A10 | −8.3524058E−11 | −1.3415373E−10 | 4.3471104E−09 | −6.1085209E−10 |
| A11 | −3.4844914E−12 | −6.5140834E−12 | 3.8183498E−10 | 1.6908350E−11 |
| A12 | 1.1793441E−12 | −5.1024330E−13 | −3.7210273E−11 | 9.3206438E−12 |
| A13 | −5.2327471E−14 | 2.0360666E−13 | −1.1944104E−12 | −1.2728207E−12 |
| A14 | −1.9069886E−15 | −2.0496203E−15 | 2.9439535E−13 | 6.2361398E−14 |
| A15 | 1.9982285E−16 | −1.1783024E−15 | −1.4423102E−14 | −7.2136846E−16 |
| A16 | −4.1101368E−18 | 4.9619108E−17 | 2.3767074E−16 | −2.0587200E−17 |

| Sn | 28 | 29 | 30 | 31 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.3955976E−05 | −1.5249651E−05 | −6.9287301E−06 | 3.8362374E−06 |
| A5 | 1.1274565E−05 | 4.5174356E−06 | −4.2973757E−07 | 1.2002836E−07 |
| A6 | −4.3420571E−06 | −6.5937278E−07 | −7.6976844E−08 | −6.2756622E−08 |
| A7 | 1.2386666E−06 | −4.7392381E−08 | 2.3891788E−08 | −6.1862009E−11 |
| A8 | −2.7461856E−07 | 2.1737316E−08 | −5.3572276E−10 | 1.5770236E−09 |
| A9 | 4.4473735E−08 | −6.7476934E−10 | −3.7230339E−10 | −5.8959514E−11 |
| A10 | −4.7758380E−09 | −2.7182627E−10 | 5.4872335E−11 | −1.8861749E−11 |
| A11 | 3.1176973E−10 | 2.2461096E−11 | −3.9086131E−12 | 1.4074700E−12 |
| A12 | −1.3199123E−11 | −1.9445621E−13 | 1.3039265E−13 | 6.4075572E−14 |
| A13 | 8.8527890E−13 | 1.9203389E−13 | 6.8281587E−15 | −6.3344389E−15 |
| A14 | −9.0142326E−14 | −3.8923481E−14 | −1.1830366E−15 | −3.3111279E−16 |
| A15 | 4.9666166E−15 | 2.4841208E−15 | 6.0439716E−17 | 3.9527993E−17 |
| A16 | −1.0244251E−16 | −5.3990374E−17 | −1.1039294E−18 | −9.2151824E−19 |

Example 8

Figure 18:
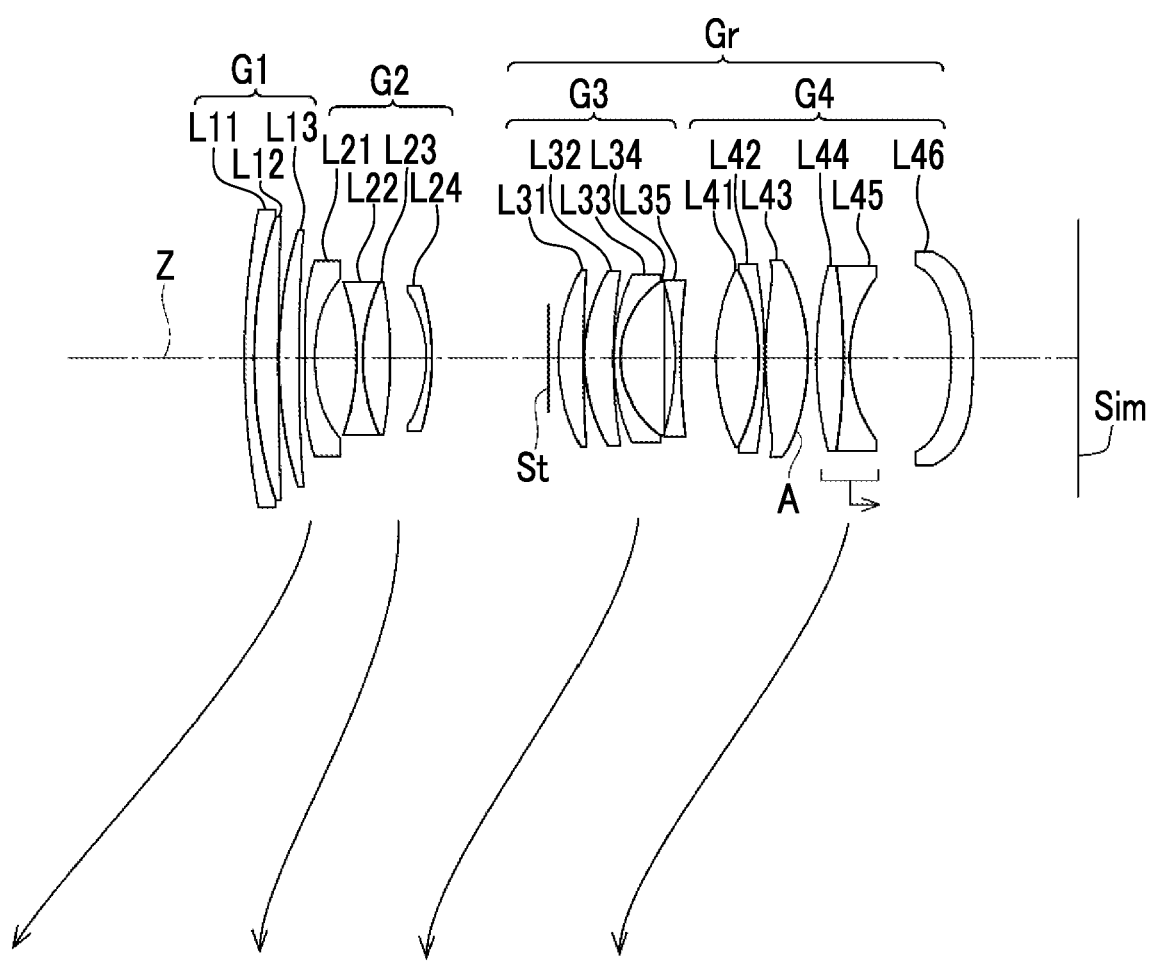
FIG. 18 is a diagram showing a cross-sectional configuration and movement loci of the zoom lens of Example 8.

FIG. 18 is a diagram showing a cross-sectional view of the configuration and movement loci of the zoom lens of Example 8 at the wide angle end in a state where the infinite distance object is in focus. The zoom lens of Example 8 consists of a first lens group G1 that has a positive refractive power, a second lens group G2 that has a negative refractive power, and a subsequent group Gr, in order from the object side to the image side. The subsequent group Gr consists of a third lens group G3 that has a positive refractive power and a fourth lens group G4 that has a positive refractive power, in order from the object side to the image side.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of six lenses L41 to L46 in order from the object side to the image side. The focus group consists of two lenses L44 and L45.

Figure 19:
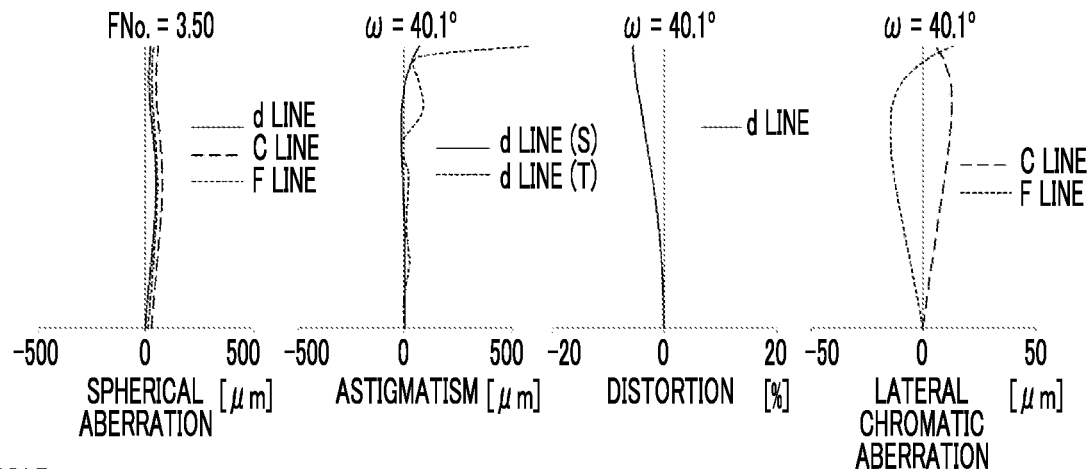
FIG. 19 is a diagram showing aberrations of the zoom lens of Example 8.
Figure 19:
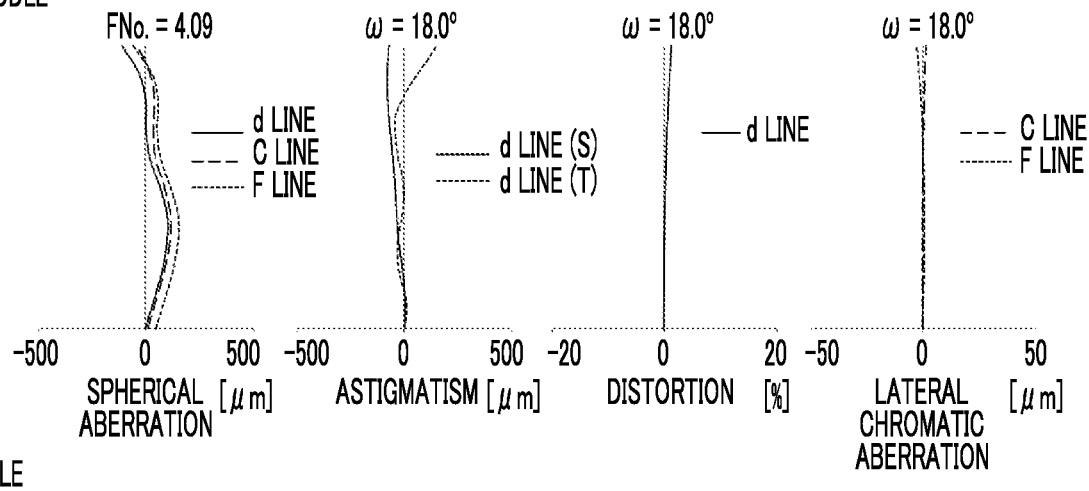
Figure 19:
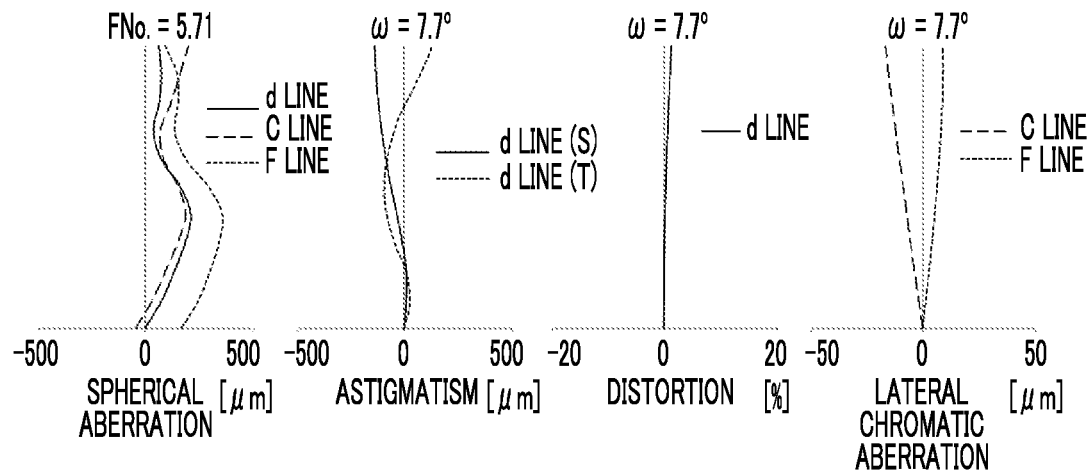

Regarding the zoom lens of Example 8, Table 22 shows basic lens data, Table 23 shows specifications and variable surface spacings, and Table 24 shows aspherical coefficients thereof. FIG. 19 shows aberration diagrams.

TABLE 22

Example 8

| Sn | R | D | Nd | νd |
|---|---|---|---|---|
| 1 | 128.9392 | 1.4289 | 1.84666 | 23.78 |
| 2 | 75.8357 | 3.7290 | 1.52841 | 76.45 |
| 3 | 579.7203 | 0.1002 | | |
| 4 | 70.4460 | 3.0496 | 1.63995 | 54.13 |
| 5 | 268.1538 | DD[5] | | |
| *6 | −91.6351 | 1.4882 | 1.88202 | 37.22 |
| *7 | 39.7641 | 6.3984 | | |
| 8 | −35.5668 | 0.9711 | 1.65480 | 61.24 |
| 9 | 29.2320 | 4.2153 | 1.84666 | 23.78 |
| 10 | −67.5262 | 5.5435 | | |
| 11 | −20.7318 | 0.8791 | 1.77224 | 53.14 |
| 12 | −39.0867 | DD[12] | | |

TABLE 22-continued

Example 8

| Sn | R | D | Nd | νd |
|---|---|---|---|---|
| 13(St) | ∞ | 1.4998 | | |
| *14 | 30.9632 | 3.7210 | 1.78487 | 47.90 |
| *15 | 394.8815 | 0.1002 | | |
| 16 | 27.3611 | 4.4143 | 1.57260 | 71.49 |
| 17 | 82.2648 | 0.1145 | | |
| 18 | 32.6139 | 1.0024 | 1.98420 | 28.25 |
| 19 | 14.7907 | 6.7826 | 1.49000 | 56.88 |
| 20 | −81939.3504 | 1.6201 | | |
| 21 | −41.7290 | 0.8581 | 1.83069 | 46.29 |
| 22 | 92.2691 | DD[22] | | |
| 23 | 33.3917 | 6.6373 | 1.50349 | 81.90 |
| 24 | −31.5654 | 0.8837 | 1.94697 | 33.90 |
| 25 | −91.9956 | 0.0998 | | |
| *26 | 52.2276 | 6.5463 | 1.77614 | 52.73 |
| *27(A) | −33.6763 | 1.3060 | | |
| 28 | 57.6224 | 4.1762 | 1.98956 | 21.84 |
| 29 | −94.2052 | 0.9518 | 1.93352 | 36.23 |
| 30 | 21.6482 | 15.6002 | | |
| *31 | −48.3506 | 3.3645 | 1.51633 | 64.06 |
| *32 | −113.3578 | | | |

TABLE 23

Example 8

| | WIDE | MIDDLE | TELE |
|---|---|---|---|
| Zr | 1.0 | 2.4 | 5.8 |
| f | 27.27 | 65.82 | 158.14 |
| BF | 16.2223 | 42.3725 | 68.8554 |
| FNo. | 3.5 | 4.09 | 5.71 |
| 2ω(°) | 80.2 | 36.0 | 15.4 |
| DD[5] | 0.9973 | 21.3287 | 49.8494 |
| DD[12] | 17.9529 | 7.4497 | 1.4898 |
| DD[22] | 5.3857 | 2.2104 | 0.9966 |

TABLE 24

Example 8

| Sn | 6 | 7 | 14 | 15 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.0645694E−04 | 2.1722228E−04 | 2.7383011E−06 | 8.4498736E−06 |
| A5 | 1.1133536E−05 | 5.6892667E−06 | −1.2003285E−07 | −1.8903756E−06 |
| A6 | −9.8551481E−06 | −6.6432828E−06 | −7.1613485E−08 | 5.3922288E−07 |
| A7 | 1.8325493E−06 | 1.0830564E−06 | 4.7866771E−08 | −7.2789796E−08 |
| A8 | −2.0648927E−07 | −1.4376382E−07 | −1.2040299E−08 | 2.2084039E−09 |
| A9 | 1.1961611E−08 | 1.9373033E−08 | 1.6182252E−09 | 5.1984767E−10 |
| A10 | 4.3585542E−10 | −2.0779092E−09 | −1.2831347E−10 | −3.6871169E−11 |
| A11 | −1.2564221E−10 | 1.6102768E−10 | 1.1047386E−11 | −2.3769924E−12 |
| A12 | 5.8443660E−12 | −9.7109616E−12 | −1.7460898E−12 | 1.5823043E−13 |
| A13 | 3.1440881E−13 | 5.0888495E−13 | 2.0553776E−13 | 1.7117526E−14 |
| A14 | −4.4337613E−14 | −2.3269420E−14 | −1.3002413E−14 | −1.0079318E−15 |
| A15 | 1.7823159E−15 | 7.9085890E−16 | 4.0488604E−16 | −3.3778985E−17 |
| A16 | −2.5683728E−17 | −1.3702066E−17 | −4.7635459E−18 | 2.1742752E−18 |

| Sn | 26 | 27 | 31 | 32 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.6316232E−05 | 9.7614767E−06 | −4.7682149E−05 | −4.6378152E−05 |
| A5 | −2.0392103E−06 | −1.9028949E−06 | −1.6469488E−06 | −3.9449178E−06 |
| A6 | 5.0573049E−07 | 4.3725090E−07 | −2.5485254E−07 | 9.1921917E−07 |
| A7 | −6.9662086E−08 | −8.1361261E−08 | 2.3501599E−07 | −5.8313375E−08 |
| A8 | 4.6335441E−09 | 1.1136256E−08 | −4.3985894E−08 | −4.0193222E−09 |
| A9 | 1.5102016E−10 | −8.8152244E−10 | 3.0183602E−09 | 6.2062123E−10 |
| A10 | −6.0614961E−11 | 1.2445456E−11 | 3.4043528E−11 | −1.7443976E−12 |
| A11 | 4.3123332E−12 | 2.6252836E−12 | −1.3817648E−11 | −1.6220335E−12 |
| A12 | −8.7270345E−14 | −2.9628136E−14 | 3.0201114E−13 | −1.1558761E−13 |
| A13 | 1.2402659E−14 | −1.4494018E−14 | 3.7899487E−14 | 1.3593337E−14 |
| A14 | −2.4979974E−15 | 5.2279038E−16 | −4.0606498E−15 | 6.1724864E−18 |
| A15 | 1.5882642E−16 | 1.8187197E−17 | 2.5042581E−16 | −2.6266586E−17 |
| A16 | −3.3947965E−18 | −9.0637881E−19 | −6.8852908E−18 | 5.3414769E−19 |

Tables 25 and 26 show corresponding values of Conditional Expressions (1) to (23) of the zoom lenses of Examples 1 to 8.

TABLE 25

| Expression | Conditional | Example 1 | Example 2 | Example 3 | Example 4 |
|---|---|---|---|---|---|
| (1) | fw/Denw | 1.0979 | 1.0195 | 1.0032 | 1.1631 |
| (2) | fw/Dexw | 0.5077 | 0.4462 | 0.4593 | 0.5195 |
| (3) | D1/TLt | 0.0483 | 0.0445 | 0.0450 | 0.0430 |
| (4) | ft/fw | 6.7460 | 6.7460 | 6.7460 | 6.7460 |
| (5) | 1/βA | 0.09009 | 0.03173 | 0.05946 | −0.04274 |
| (6) | HAt/HSt | 1.0182 | 1.1930 | 1.1521 | 0.9797 |
| (7) | ft/fpAt | 6.6383 | 6.3534 | 6.4079 | 7.3657 |
| (8) | HAt/HAw | 0.9335 | 0.9636 | 0.9444 | 0.9368 |
| (9) | DSAt/DSLt | 0.2832 | 0.3024 | 0.3063 | 0.2914 |
| (10) | dA/Yt | 0.0458 | 0.0460 | 0.0458 | 0.0461 |
| (11) | TLt/ft | 1.1115 | 1.1380 | 1.1190 | 1.0361 |
| (12) | BFw/Yw | 0.6714 | 0.9718 | 0.9367 | 0.8017 |
| (13) | υ1 | 24.11 | 20.36 | 20.36 | 24.80 |
| (14) | N1 | 1.96300 | 1.89286 | 1.89286 | 1.85478 |
| (15) | N2n | 1.85135 | 1.83481 | 1.84289 | 1.95375 |
| (16) | N2p | 1.82115 | 1.85896 | 1.85446 | 1.84666 |
| (17) | υnL | 81.54 | 62.55 | 71.26 | 58.60 |
| (18) | Mp/TLt | −0.2046 | −0.1647 | −0.1627 | −0.1887 |
| (19) | fp/2 | −2.0758 | −2.3380 | −2.2215 | −2.2138 |
| (20) | D1pt/TLt | 0.3564 | 0.3707 | 0.3736 | 0.3622 |
| (21) | fw/fBw | −0.7655 | −0.7706 | −0.7721 | −0.9918 |
| (22) | fw × tanωw/Yw | 1.0822 | 1.1073 | 1.1027 | 1.0338 |
| (23) | f2/f1 | −0.1708 | −0.1539 | −0.1566 | −0.1645 |

TABLE 26

| Expression | Conditional | Example 5 | Example 6 | Example 7 | Example 8 |
|---|---|---|---|---|---|
| (1) | fw/Denw | 1.0748 | 1.0610 | 1.1529 | 1.0763 |
| (2) | fw/Dexw | 0.4907 | 0.4129 | 0.4332 | 0.4653 |
| (3) | D1/TLt | 0.0421 | 0.0238 | 0.0412 | 0.0398 |
| (4) | ft/fw | 6.7460 | 6.7460 | 6.7460 | 5.8000 |
| (5) | 1/βA | 0.09258 | −0.06928 | −0.32583 | 0.08323 |
| (6) | HAt/HSt | 1.0059 | 1.2988 | 1.1296 | 0.9705 |
| (7) | ft/fpAt | 7.5436 | 7.3947 | 6.3280 | 6.0899 |
| (8) | HAt/HAw | 1.1893 | 1.2362 | 0.8143 | 1.0474 |
| (9) | DSAt/DSLt | 0.2523 | 0.2043 | 0.3191 | 0.2723 |
| (10) | dA/Yt | 0.1134 | 0.0452 | 0.0462 | 0.0604 |
| (11) | TLt/ft | 1.1178 | 1.2257 | 1.1833 | 1.3195 |
| (12) | BFw/Yw | 0.8009 | 0.7954 | 0.7764 | 0.7500 |
| (13) | υ1 | 23.78 | 17.02 | 25.46 | 23.78 |
| (14) | N1 | 1.84666 | 2.10420 | 2.00069 | 1.84666 |
| (15) | N2n | 1.85400 | 1.72916 | 1.83481 | 1.88202 |
| (16) | N2p | 1.84666 | 1.80809 | 1.82115 | 1.84666 |
| (17) | υnL | 63.47 | 28.27 | 57.56 | 64.06 |
| (18) | Mp/TLt | −0.2392 | −0.3250 | −0.2232 | −0.2312 |
| (19) | fp/2 | −2.9251 | −3.1878 | −2.5696 | −2.7892 |
| (20) | D1pt/TLt | 0.3499 | 0.3092 | 0.3276 | 0.3466 |
| (21) | fw/fBw | −0.9309 | −0.8129 | −0.9682 | −0.8495 |
| (22) | fw × tanωw/Yw | 1.0682 | 1.0802 | 1.0816 | 1.0603 |
| (23) | f2/f1 | −0.1527 | −0.1776 | −0.1381 | −0.1489 |

As can be seen from the data described above, the zoom lenses of Examples 1 to 8 have a zoom ratio of 5.5 times or more and are configured to be small-size and lightweight while achieving a high zoom ratio.

Figure 20:
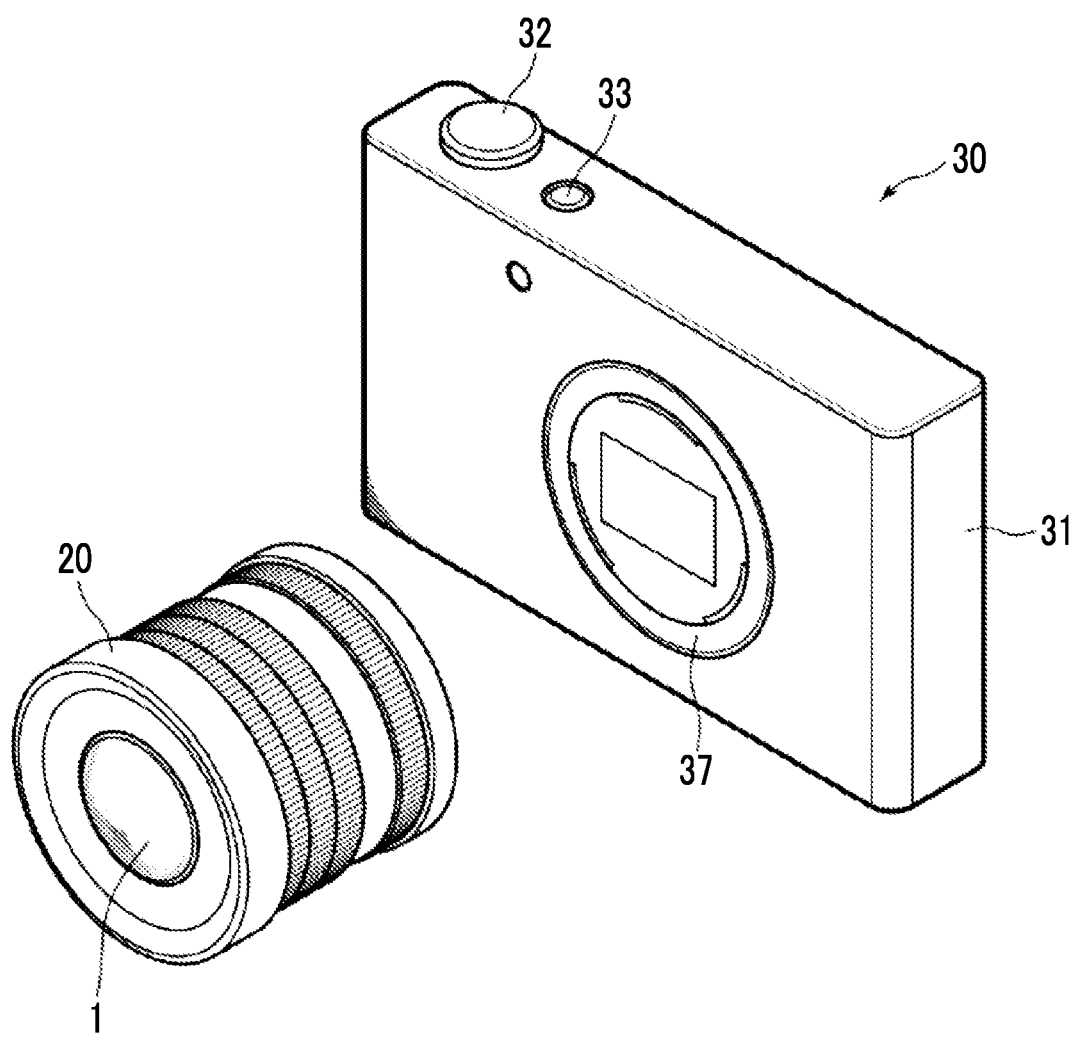
FIG. 20 is a perspective view of the front side of the imaging apparatus according to an embodiment.
Figure 21:
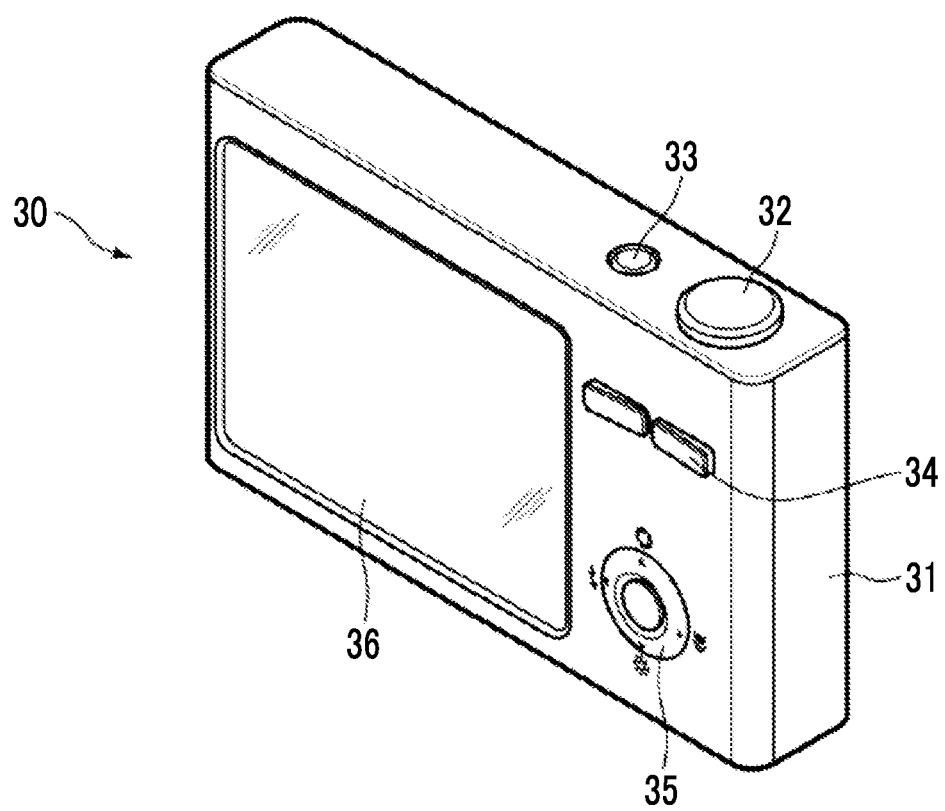
FIG. 21 is a perspective view of the rear side of the imaging apparatus according to the embodiment.

Next, an imaging apparatus according to an embodiment of the present disclosure will be described. FIGS. 20 and 21 are external views of a camera 30 which is the imaging apparatus according to the embodiment of the present disclosure. FIG. 20 is a perspective view of the camera 30 viewed from a front side, and FIG. 21 is a perspective view of the camera 30 viewed from a rear side. The camera 30 is a so-called mirrorless type digital camera, and the interchangeable lens 20 can be removably attached thereto. The interchangeable lens 20 is configured to include a zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens consisting of, in order from an object side to an image side:
   a first lens group that has a positive refractive power;
   a second lens group that has a negative refractive power; and
   a subsequent group that has a plurality of lens groups, wherein:
   the zoom lens includes an aperture stop at a position closer to the image side than a lens surface closest to the image side in the second lens group,
   a lens group closest to the image side in the subsequent group includes at least one negative lens of which an object side lens surface is a concave surface being in contact with air,
   during zooming, a spacing between the first lens group and the second lens group changes, a spacing between the second lens group and the subsequent group changes, and spacings between all adjacent lens groups in the subsequent group change,
   during zooming, lens spacings inside the first lens group, the second lens group, and the plurality of lens groups in the subsequent group are unchanged,
   the second lens group consists of, in order from the object side to the image side:
   a negative meniscus lens having a convex surface facing toward the object side,
   a negative lens,
   a positive lens, and
   a negative meniscus lens having a convex surface facing toward the image side,
   a lens group closest to the object side in the subsequent group is defined as a third lens group,
   the third lens group has a positive refractive power,
   a lens closest to the object side of the third lens group and a second lens from the object side of the third lens group are uncemented positive lenses,
   an uncemented biconcave lens is arranged closest to the image side of the third lens group,
   the lens group closest to the image side in the subsequent group has a negative refractive power,
   the subsequent group includes two or three cemented lenses, each formed by a positive lens and a negative lens cemented together, and a negative lens cemented together,
   in a case in which
   a focal length of the zoom lens at a wide angle end in a state in which an infinite distance object is in focus is fw,
   a distance on an optical axis from a lens surface closest to the object side in the first lens group to a paraxial entrance pupil position at the wide angle end in a state in which the infinite distance object is in focus is Denw, and
   a sign of Denw is positive in a case where the paraxial entrance pupil position is closer to the image side than the lens surface closest to the object side in the first lens group, and is negative in a case where the paraxial entrance pupil position is closer to the object side than the lens surface closest to the object side in the first lens group,
   Conditional Expression (1) is satisfied, which is represented by $0.7 < fw/Denw < 1.5$ (1), and in a case in which
   a focal length of a lens group closest to the object side among lens groups that have positive refractive powers and that are included in the subsequent group in a state in which the infinite distance object is in focus is fp,
   a focal length of the second lens group is f2, and
   a focal length of the first lens group is f1,
   Conditional Expressions (19-3) and (23-3) are satisfied, which are represented by $-2.338 \le fp/f2 < -1.5$ (19-3), and $-0.3 < f2/f1 < -0.1539$ (23-3).

2. The zoom lens according to claim 1, wherein in a case in which
   a distance on the optical axis from the lens surface closest to the object side in the first lens group to a lens surface closest to the image side in the first lens group is D1, and a sum of a back focal length in terms of an air conversion distance and a distance on the optical axis from the lens surface closest to the object side in the first lens group to a lens surface closest to the image side in the subsequent group, at a telephoto end in a state in which the infinite distance object is in focus is $TL_t$, Conditional Expression (3) is satisfied, which is represented by $$0.01 < D1/TLt < 0.1 \tag{3}$$

3. The zoom lens according to claim 1, wherein in a case in which a focal length of the zoom lens at a telephoto end in a state in which the infinite distance object is in focus is ft, Conditional Expression (4) is satisfied, which is represented by $$4.9 < ft/fw < 12 \tag{4}$$

4. The zoom lens according to claim 1, wherein:

the subsequent group includes at least one Lx lens of which an image side lens surface is a convex surface being in contact with air, and in a case in which a lateral magnification in an A optical system, which minimizes an absolute value of an inverse of a lateral magnification at the wide angle end in a case where the aperture stop is used as an object point in a state in which the infinite distance object is in focus, in at least one optical system configured to range from a lens surface adjacent to the image side of the aperture stop to an image side lens surface of the Lx lens is βA, Conditional Expression (5) is satisfied, which is represented by $$-0.5 < 1/\beta A < 0.5 \tag{5}$$

5. The zoom lens according to claim 4, wherein in a case in which a height of an on-axis marginal ray on a lens surface closest to the image side in the A optical system from the optical axis at a telephoto end in a state in which the infinite distance object is in focus is HAt, and a height of the on-axis marginal ray in the aperture stop from the optical axis at the telephoto end in a state in which the infinite distance object is in focus is HSt, Conditional Expression (6) is satisfied, which is represented by $$0.73 < HAt/HSt < 2.3 \tag{6}$$

6. The zoom lens according to claim 4, wherein in a case in which a focal length of the zoom lens at a telephoto end in a state in which the infinite distance object is in focus is ft, and a combined focal length from a lens surface closest to the object side in the subsequent group to a lens surface closest to the image side in the A optical system at the telephoto end in a state in which the infinite distance object is in focus is fpAt, Conditional Expression (7) is satisfied, which is represented by $$3 < ft/fpAt < 15 \tag{7}$$

7. The zoom lens according to claim 4, wherein in a case in which a height of an on-axis marginal ray on a lens surface closest to the image side in the A optical system from the optical axis at a telephoto end in a state in which the infinite distance object is in focus is HAt, and a height of a principal ray with a maximum image height on the lens surface closest to the image side in the A optical system from the optical axis at the wide angle end in a state in which the infinite distance object is in focus is HAW, Conditional Expression (8) is satisfied, which is represented by $$0.35 < HAt/HAw < 1.6 \tag{8}$$

8. The zoom lens according to claim 4, wherein the subsequent group includes a lens surface, which is a concave surface being in contact with air and which is an image side surface, between a lens surface closest to the image side in the A optical system and a lens surface which is a concave surface being in contact with air and which is an object side surface included in the lens group closest to the image side in the subsequent group.

9. The zoom lens according to claim 4, wherein in a case in which a distance on the optical axis from the aperture stop to a lens surface closest to the image side in the A optical system at a telephoto end in a state in which the infinite distance object is in focus is DSAt, and a sum of a back focal length in terms of an air conversion distance and a distance on the optical axis from the aperture stop to a lens surface closest to the image side in the subsequent group, at the telephoto end in a state in which the infinite distance object is in focus is DSLt, Conditional Expression (9) is satisfied, which is represented by $$0.1 < DSAt/DSLt < 0.54 \tag{9}$$

10. The zoom lens according to claim 4, wherein in a case in which a spacing on the optical axis between a lens surface closest to the image side in the A optical system and a lens surface adjacent to the image side of the lens surface closest to the image side in the A optical system at a telephoto end in a state in which the infinite distance object is in focus is dA, and a maximum image height at the telephoto end is Yt, Conditional Expression (10) is satisfied, which is represented by $$0.015 < dA/Yt < 0.35 \tag{10}$$

11. The zoom lens according to claim 1, wherein in a case in which a sum of a back focal length in terms of an air conversion distance and a distance on the optical axis from the lens surface closest to the object side in the first lens group to a lens surface closest to the image side in the subsequent group at a telephoto end in a state in which the infinite distance object is in focus is TLt, a difference in an optical axis direction between a position at the wide angle end and a position at the telephoto end of a lens group closest to the object side among lens groups that have positive refractive powers and that are included in the subsequent group in a state in which the infinite distance object is in focus is Mp, and a sign of Mp is positive in a case where the lens group closest to the object side moves from the object side to the image side, and is negative in a case where the lens group closest to the object side moves from the image side to the object side, during zooming from the wide angle end to the telephoto end, Conditional Expression (18) is satisfied, which is represented by $$-0.45 < Mp/TLt < -0.06 \tag{18}$$

12. The zoom lens according to claim 1, wherein the first lens group includes a negative lens and a positive lens, in order from a position closest to the object side to the image side.

13. The zoom lens according to claim 1, wherein in a case in which
a back focal length in terms of an air conversion distance at the wide angle end in a state in which the infinite distance object is in focus is BFw, and
a maximum image height at the wide angle end is Yw,
Conditional Expression (12) is satisfied, which is represented by $$0.38 < BFw/Yw < 1.5 \tag{12}$$

14. The zoom lens according to claim 1, wherein in a case in which
an Abbe number of a lens closest to the object side in the first lens group based on a d line is ν1,
Conditional Expression (13) is satisfied, which is represented by $$10 < \nu1 < 50 \tag{13}$$

15. The zoom lens according to claim 1, wherein in a case in which
a refractive index of a lens closest to the object side in the first lens group at a d line is N1,
Conditional Expression (14) is satisfied, which is represented by $$1.7 < N1 < 2.3 \tag{14}$$

16. The zoom lens according to claim 1, wherein in a case in which
a refractive index of a negative lens closest to the object side at a d line among negative lenses included in the second lens group is N2n,
Conditional Expression (15) is satisfied, which is represented by $$1.6 < N2n < 2.2 \tag{15}$$

17. The zoom lens according to claim 1, wherein in a case in which
a refractive index of a positive lens that has a strongest refractive power at a d line among positive lenses included in the second lens group is N2p,
Conditional Expression (16) is satisfied, which is represented by $$1.65 < N2p < 2 \tag{16}$$

18. The zoom lens according to claim 1, wherein in a case in which
an Abbe number of a negative lens closest to the image side based on a d line among negative lenses included in the subsequent group is νnL,
Conditional Expression (17) is satisfied, which is represented by $$27 < \nu nL < 102 \tag{17}$$

19. The zoom lens according to claim 1, wherein the subsequent group includes at least one lens group that has a positive refractive power.

20. The zoom lens according to claim 19, wherein in a case in which
a sum of a back focal length in terms of an air conversion distance and a distance on the optical axis from the lens surface closest to the object side in the first lens group to a lens surface closest to the image side in the subsequent group at a telephoto end in a state in which the infinite distance object is in focus is $TL_t$,
a difference in an optical axis direction between a position at the wide angle end and a position at the telephoto end of a lens group closest to the object side among lens groups that have positive refractive powers and that are included in the subsequent group in a state in which the infinite distance object is in focus is Mp, and
a sign of Mp is positive in a case where the lens group closest to the object side moves from the object side to the image side, and is negative in a case where the lens group closest to the object side moves from the image side to the object side, during zooming from the wide angle end to the telephoto end,
Conditional Expression (18) is satisfied, which is represented by $$-0.45 < Mp/TL_t < -0.06 \tag{18}$$

21. The zoom lens according to claim 19, wherein in a case in which
a distance on the optical axis from a lens surface closest to the image side in the first lens group to a lens surface closest to the object side in a lens group closest to the object side among lens groups that have positive refractive powers and that are included in the subsequent group at a telephoto end in a state in which the infinite distance object is in focus is D1pt, and
a sum of a back focal length in terms of an air conversion distance and a distance on the optical axis from the lens surface closest to the object side in the first lens group to a lens surface closest to the image side in the subsequent group, at the telephoto end in a state in which the infinite distance object is in focus is TLt,
Conditional Expression (20) is satisfied, which is represented by $$0.2 < D1pt/TLt < 0.5 \tag{20}$$

22. The zoom lens according to claim 1, wherein:
the subsequent group includes at least one Lx lens of which an image side lens surface is a convex surface being in contact with air,
an optical system, which minimizes an absolute value of an inverse of a lateral magnification at the wide angle end in a case where the aperture stop is used as an object point in a state in which the infinite distance object is in focus, in at least one optical system configured to range from a lens surface adjacent to the image side of the aperture stop to an image side lens surface of the Lx lens is an A optical system, and
in a case in which
a combined focal length at the wide angle end in a state in which the infinite distance object is in focus from a lens surface adjacent to the image side of a lens surface closest to the image side in the A optical system to a lens surface closest to the image side in the subsequent group is fBw,
Conditional Expression (21) is satisfied, which is represented by $$-1.6 < fw/fBw < -0.25 \tag{21}$$

23. The zoom lens according to claim 1, wherein in a case in which
a maximum half angle of view at the wide angle end in a state in which the infinite distance object is in focus is ωw, and a maximum image height at the wide angle end is Yw,
Conditional Expression (22) is satisfied, which is represented by $$0.97 < fw \times \tan \omega w / Yw < 1.3 \qquad (22).$$

24. The zoom lens according to claim 1, wherein the subsequent group includes a focus group that moves along the optical axis during focusing.

25. The zoom lens according to claim 24, wherein the focus group consists of two or fewer lenses.

26. The zoom lens according to claim 24, wherein the focus group has a negative refractive power.

27. The zoom lens according to claim 1, wherein in a case in which
Conditional Expression (23-4) is satisfied, which is represented by $$-0.23 < f2/f1 \le -0.1539 \qquad (23\text{-}4).$$

28. An imaging apparatus comprising the zoom lens according to claim 1.

29. The zoom lens according to claim 1, wherein in a case in which
a distance on the optical axis from a paraxial exit pupil position to an image plane at the wide angle end in a state in which the infinite distance object is in focus is Dexw, and
a sign of Dexw is positive in a case where the paraxial exit pupil position is closer to the object side than the image plane, and is negative in a case where the paraxial exit pupil position is closer to the image side than the image plane,
Conditional Expression (2) is satisfied, which is represented by $$0.25 < fw/Dexw < 1 \qquad (2).$$

30. The zoom lens according to claim 1, wherein
the subsequent group includes only two cemented lenses, each formed by a positive lens and a negative lens cemented together.

\* \* \* \* \*